US012562877B2

(12) United States Patent　　　(10) Patent No.:　US 12,562,877 B2
Gan et al.　　　　　　　　　　　　(45) Date of Patent:　　Feb. 24, 2026

(54) PPDU UPLINK BANDWIDTH INDICATION METHOD AND RELATED APPARATUS

(71) Applicant: HUAWEI TECHNOLOGIES CO., LTD., Shenzhen (CN)

(72) Inventors: Ming Gan, Shenzhen (CN); Yiqing Li, Shenzhen (CN); Chenchen Liu, Shenzhen (CN); Yunbo Li, Shenzhen (CN); Yuchen Guo, Shenzhen (CN); Jian Yu, Shenzhen (CN); Xun Yang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 354 days.

(21) Appl. No.: 18/308,454

(22) Filed: Apr. 27, 2023

(65) Prior Publication Data

US 2023/0354284 A1　Nov. 2, 2023

Related U.S. Application Data

(63) Continuation of application No. PCT/CN2021/127202, filed on Oct. 28, 2021.

(30) Foreign Application Priority Data

Oct. 28, 2020　(CN) ......................... 202011174703.8
Dec. 7, 2020　(CN) ......................... 202011420634.4
Dec. 14, 2020　(CN) ......................... 202011469254.X

(51) Int. Cl.
H04L 5/00　　　(2006.01)
H04W 28/20　　(2009.01)
(Continued)

(52) U.S. Cl.
CPC .......... H04L 5/0092 (2013.01); H04L 5/0044 (2013.01); H04W 28/20 (2013.01);
(Continued)

(58) Field of Classification Search
CPC ............... H04L 5/0092; H04L 5/0044; H04W 72/0457; H04W 52/0216
See application file for complete search history.

(56) References Cited

U.S. PATENT DOCUMENTS

2017/0303268 A1　10/2017　Ghosh et al.
2019/0124556 A1*　4/2019　Verma ................... H04L 5/0044
(Continued)

FOREIGN PATENT DOCUMENTS

CN　　110730050 A　　1/2020
CN　　110768757 A　　2/2020
(Continued)

OTHER PUBLICATIONS

Shellhammer et al., "Enhanced Trigger Frame for EHT Support," Qualcomm, IEEE 802.11-20/1429r2, IEEE, Institute of Electrical and Electronics Engineers, New York, New York, Total 31 pages (Oct. 13, 2020).
(Continued)

*Primary Examiner* — Shukri Taha
(74) *Attorney, Agent, or Firm* — Leydig, Voit & Mayer, Ltd.

(57)　　　　ABSTRACT

A method and related apparatus for physical layer protocol data unit (PPDU) uplink bandwidth indication are provided. The method relates to the wireless communications field, for example, is applicable to a wireless local area network supporting the 802.11be standard. The method includes: An AP generates and sends a trigger frame. The trigger frame carries first indication information, where the first indication information is directly used to indicate or jointly indicate an EHT TB PPDU bandwidth or an uplink PPDU total transmission bandwidth. The trigger frame carries second indication information, where the second indication information is used to indicate distribution of an HE TB PPDU and/or an EHT TB PPDU in the uplink PPDU total transmission
(Continued)

bandwidth, or directly indicate whether an EHT station transmits an HE TB PPDU or an EHT TB PPDU.

20 Claims, 17 Drawing Sheets

(51) Int. Cl.

| | | |
|---|---|---|
| *H04W 72/0453* | (2023.01) | |
| *H04W 72/0457* | (2023.01) | |
| *H04W 72/23* | (2023.01) | |
| *H04W 84/12* | (2009.01) | |

(52) U.S. Cl.
CPC ... *H04W 72/0453* (2013.01); *H04W 72/0457* (2023.01); *H04W 72/23* (2023.01); *H04W 84/12* (2013.01)

(56) References Cited

U.S. PATENT DOCUMENTS

| | | | |
|---|---|---|---|
| 2019/0238301 A1 | 8/2019 | Verma et al. | |
| 2019/0289612 A1 | 9/2019 | Chen et al. | |
| 2019/0364555 A1 | 11/2019 | Huang et al. | |
| 2020/0015219 A1 | 1/2020 | Asterjadhi et al. | |
| 2020/0107393 A1 | 4/2020 | Chu et al. | |
| 2020/0177425 A1 | 6/2020 | Chen et al. | |
| 2020/0213933 A1 | 7/2020 | Patil et al. | |
| 2020/0228380 A1 | 7/2020 | Yang et al. | |
| 2020/0288439 A1* | 9/2020 | Seok | H04L 5/0094 |
| 2021/0045151 A1* | 2/2021 | Chen | H04W 74/004 |
| 2021/0211221 A1 | 7/2021 | Cao et al. | |
| 2021/0321243 A1* | 10/2021 | Patil | H04W 8/005 |
| 2021/0360525 A1* | 11/2021 | Park | H04W 72/1268 |
| 2021/0360628 A1 | 11/2021 | Kim et al. | |
| 2022/0030572 A1 | 1/2022 | Shellhammer et al. | |
| 2022/0030604 A1 | 1/2022 | Noh et al. | |
| 2022/0393792 A1* | 12/2022 | Lim | H04W 80/02 |

FOREIGN PATENT DOCUMENTS

| | | |
|---|---|---|
| CN | 111096044 A | 5/2020 |
| CN | 111279646 A | 6/2020 |
| CN | 111654867 A | 9/2020 |
| CN | 114080005 A | 2/2022 |
| JP | 2013541248 A | 11/2013 |
| TW | 202002550 A | 1/2020 |
| TW | 202027469 A | 7/2020 |
| TW | 202034712 A | 9/2020 |
| WO | 2020027847 A1 | 2/2020 |
| WO | 2020111638 A1 | 6/2020 |

OTHER PUBLICATIONS

Ko et al., "TB PPDU Format Signaling in Trigger Frame", Wilus, IEEE 802.11-20/1192r1, Total 17 pages,Institute of Electrical and Electronics Engineers, New York, New York (Aug. 6, 2020).

Porat et al., "BW320 Signaling", Broadcom, IEEE 802.11-20/1467r0, Total 6 pages,Institute of Electrical and Electronics Engineers, New York, New York (Sep. 14, 2020).

Li et al., "BW indication of 320MHz for non-HT and non-HT duplicate frames," Huawei, IEEE 802.11-20/0616r0, IEEE, Total 11 pages, Institute of Electrical and Electronics Engineers, New York, New York (Apr. 10, 2020).

Gan et al., "Backward compatible EHT trigger frame follow up," IEEE 802.11-20/1808-01-00be, Total 20 pages, Institute of Electrical and Electronics Engineers, New York, New York (Nov. 2020).

Kim et al., "RU Allocation Subfield Design for EHT Trigger Frame," IEEE 802.11-20/0828r1, Total 28 pages, Institute of Electrical Electronics Engineers, New York, New York (May 2020).

Gan et al., "Backward compatible EHT trigger frame," IEEE 802.11-20/0840-01-00be, Total 10 pages, Institute of Electrical Electronics Engineers, New York, New York (Jun. 2020).

P. Thubert et al, "Reliable and Available Wireless Technologies," draft-thubert-raw-technologies-05, Total 53 pages, IETF, Internet Engineering Task Force, Reston, Virginia (Published: May 18, 2020).

"IEEE P802.11ax/D6.0, Draft Standard for Information technology—Tele-communications and information exchange between systems Local and metropolitan area networks—Specific requirements, Part 11: Wireless LAN Medium Access Control (MAC) and Physical Layer (PHY) Specifications," Total 780 pages, Institute of Electrical Engineers, New York, New York (Nov. 2019).

Intel Corporation, "Channel access mechanism for NR-unlicensed," 3GPP TSG RAN WG1 Meeting #99, Reno, USA, R1-1912197, Total 30 pages, 3rd Generation Partnership Project, Valbonne, France (Nov. 18-22, 2019).

"IEEE Standard for Information technology—Telecommunications and information exchange between systems Local and metropolitan area networks—Specific requirements, Part 11: Wireless LAN Medium Access Control (MAC) and Physical Layer (PHY) Specifications," IEEE Std 802.11-2016, Total 3534 pages, Institute of Electrical Engineers, New York, New York (Approved Dec. 7, 2016).

* cited by examiner

| High efficiency short training field (HE-STF) | High efficiency long training field (HE-LTF) | Data (data) (STA 1) |
|---|---|---|
| High efficiency short training field (HE-STF) | High efficiency long training field (HE-LTF) | Data (data) (STA 1) |
| High efficiency short training field (HE-STF) | High efficiency long training field (HE-LTF) | Data (data) (STA 1) |

High efficiency signal field A (HE-SIG A)

Repeated legacy signal field (RL-SIG)

Legacy signal field (L-SIG)

Legacy long training field (L-LTF)

Legacy short training field (L-STF)

Trigger frame (trigger frame)

Acknowledgment frame (OFDMA/ non-HT duplicate)

Time (time)

FIG. 4

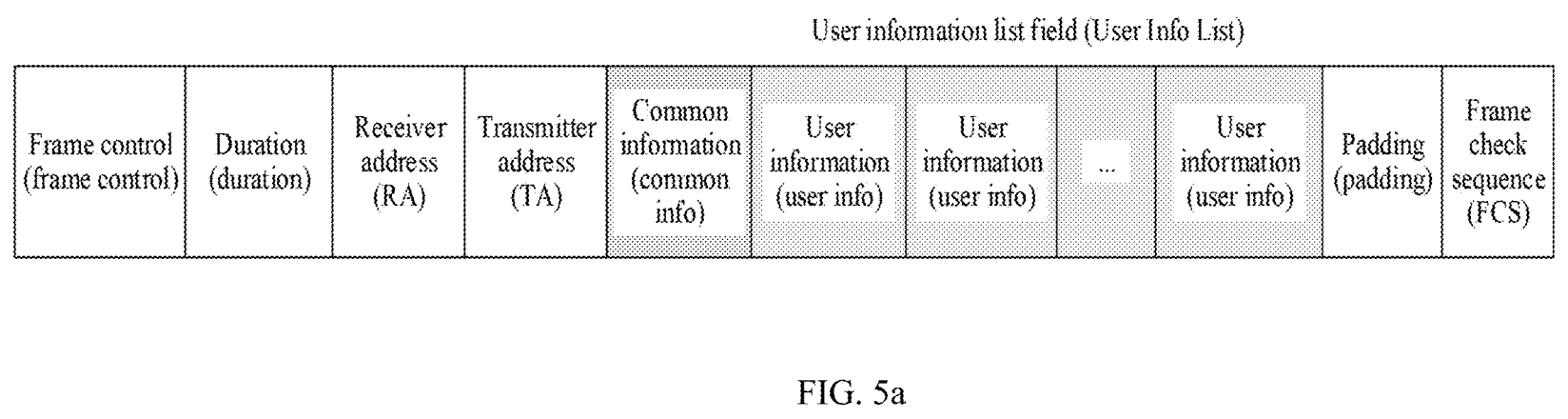

User information list field (User Info List)

| Frame control (frame control) | Duration (duration) | Receiver address (RA) | Transmitter address (TA) | Common information (common info) | User information (user info) | User information (user info) | ... | User information (user info) | Padding (padding) | Frame check sequence (FCS) |
|---|---|---|---|---|---|---|---|---|---|---|

FIG. 5a

Common information field

| 4 bits | 8 bits | 1 bit | 1 bit | 2 bits | 2 bits | 1 bit | 3 bits | 1 bit |
|---|---|---|---|---|---|---|---|---|
| Trigger Type Trigger type | UL Length Uplink length | More TF More trigger frame | CS Required Carrier sense required | UL Bandwidth Uplink bandwidth | GI And EHT-LTF Type Guard interval + EHT long training field type | MU-MIMO EHT-LTF Mode Mode | Number of EHT-LTF Symbols And Midamble Periodicity Number of EHT-LTFs and midamble periodicity | UL STBC Uplink space-time block coding |

| 1 bit | 1 bit | 2 bits | 1 bit | 16 bits | 1 bit | 9 bits | Variable |
|---|---|---|---|---|---|---|---|
| LDPC Extra Symbol Segment | AP TX Power AP transmit power | Pre-FEC Padding Factor Pre-FEC padding factor | PE Disambiguity Package extension disambiguity | UL Spatial Reuse Uplink spatial reuse | Doppler Doppler | UL U-SIG Reserved Uplink U-SIG Reserved | Trigger dependent user information (Trigger Dependent User Info) |
| | | | | | | ... | |

| 12 bits | 2 bits or 3 bits | X bits | Remaining bits of 40 bits | Variable |
|---|---|---|---|---|
| AID12 (Association identifier 12) | Uplink bandwidth extension | EHT/HE indication | Reserved Reserved | Trigger dependent station information (Trigger Dependent User Info) |

FIG. 7

Secondary 80 MHz channel

| Legacy short training field | Legacy long training field | Legacy signal field | Repeated legacy signal field | Universal signal field | | | |
|---|---|---|---|---|---|---|---|
| | | | | | Extremely high throughput short training field | Extremely high throughput long training field | Data |
| | | | | | Extremely high throughput short training field | Extremely high throughput long training field | Data |
| | | | | | ... | | |
| | | | | | Extremely high throughput short training field | Extremely high throughput long training field | Data |
| Legacy short training field | Legacy long training field | Legacy signal field | Repeated legacy signal field | Universal signal field | Extremely high throughput short training field | Extremely high throughput long training field | Data |
| | | | | | Extremely high throughput short training field | Extremely high throughput long training field | Data |
| | | | | | ... | | |
| | | | | | Extremely high throughput short training field | Extremely high throughput long training field | Data |
| Legacy short training field | Legacy long training field | Legacy signal field | Repeated legacy signal field | Universal signal field | Extremely high throughput short training field | Extremely high throughput long training field | Data |
| | | | | | Extremely high throughput short training field | Extremely high throughput long training field | Data |
| | | | | | ... | | |
| | | | | | Extremely high throughput short training field | Extremely high throughput long training field | Data |
| Legacy short training field | Legacy long training field | Legacy signal field | Repeated legacy signal field | Universal signal field | Extremely high throughput short training field | Extremely high throughput long training field | Data |
| | | | | | Extremely high throughput short training field | Extremely high throughput long training field | Data |
| | | | | | ... | | |
| | | | | | Extremely high throughput short training field | Extremely high throughput long training field | Data |

Primary 80 MHz channel

| Legacy short training field | Legacy long training field | Legacy signal field | Repeated legacy signal field | High efficiency signal field A | | | |
|---|---|---|---|---|---|---|---|
| | | | | | High efficiency short training field | High efficiency long training field | Data |
| | | | | | High efficiency short training field | High efficiency long training field | Data |
| | | | | | ... | | |
| | | | | | High efficiency short training field | High efficiency long training field | Data |
| Legacy short training field | Legacy long training field | Legacy signal field | Repeated legacy signal field | High efficiency signal field A | High efficiency short training field | High efficiency long training field | Data |
| | | | | | High efficiency short training field | High efficiency long training field | Data |
| | | | | | ... | | |
| | | | | | High efficiency short training field | High efficiency long training field | Data |
| Legacy short training field | Legacy long training field | Legacy signal field | Repeated legacy signal field | High efficiency signal field A | High efficiency short training field | High efficiency long training field | Data |
| | | | | | High efficiency short training field | High efficiency long training field | Data |
| | | | | | ... | | |
| | | | | | High efficiency short training field | High efficiency long training field | Data |
| Legacy short training field | Legacy long training field | Legacy signal field | Repeated legacy signal field | High efficiency signal field A | High efficiency short training field | High efficiency long training field | Data |
| | | | | | High efficiency short training field | High efficiency long training field | Data |
| | | | | | ... | | |
| | | | | | High efficiency short training field | High efficiency long training field | Data |

FIG. 8

| UNII 5 | | | | | | UNII 6 | UNII 6/7 | UNII 7 | | | | UNII 7/8 | UNII 8 | |
|---|---|---|---|---|---|---|---|---|---|---|---|---|---|---|
| 80 | 80 | 80 | 80 | 80 | 80 | 80 | 80 | 80 | 80 | 80 | 80 | | 80 | 80 |
| 160 | | 160 | | 160 | | 160 | | 160 | | 160 | | | 160 | |
| 320-1 | | | | 320-1 | | | | 320-1 | | | | | | |
| | | 320-2 | | | | 320-2 | | | | 320-2 | | | | |

FIG. 9

PPDU UPLINK BANDWIDTH INDICATION METHOD AND RELATED APPARATUS

CROSS-REFERENCE TO RELATED APPLICATIONS

This application is a continuation of International Application No. PCT/CN2021/127202, filed on Oct. 28, 2021, which claims priority to Chinese Patent Application No. 202011174703.8, filed on Oct. 28, 2020, Chinese Patent Application No. 202011420634.4, filed on Dec. 7, 2020, and Chinese Patent Application No. 202011469254.X, filed on Dec. 14, 2020. All of the aforementioned patent applications are hereby incorporated by reference in their entireties.

TECHNICAL FIELD

Embodiments of this application relate to the field of wireless communications technologies, and in particular, to a physical layer protocol data unit (PPDU) uplink bandwidth indication method and a related apparatus.

BACKGROUND

With the development of the mobile Internet and the popularization of smart terminals, data traffic increases rapidly, and users have higher requirements on communication service quality. The Institute of Electrical and Electronics Engineers (IEEE) 802.11ax standard no longer meets user requirements on large throughput, low jitter, and low delay. Therefore, there is an urgent need to develop a next-generation wireless local area network (WLAN) technology, that is, the IEEE 802.11be standard, the extremely high throughput (EHT) standard, or the Wi-Fi 7 standard. Different from the IEEE 802.11ax, the IEEE 802.11be uses an ultra-large bandwidth, for example, 320 MHz, to achieve ultra-high transmission rates and support scenarios with ultra-high user density. In the following, a station that supports the 802.11ax standard but does not support the 802.11be standard is referred to as a high efficient (HE) station for short, and a station that supports the 802.11be standard is referred to as an EHT station for short.

Generally, before uplink data transmission, a station (STA) needs to obtain a transmission opportunity (TXOP) through channel contention. For example, the station (STA) performs channel contention based on an enhanced distributed channel access (EDCA) manner to obtain the transmission opportunity. A trigger frame-based uplink scheduling transmission method is introduced in the IEEE 802.11ax. A trigger frame sent by an access point (AP) is used to schedule one or more stations to transmit uplink data. For example, a station is scheduled to send a high efficiency (HE) physical layer protocol data unit (PPDU). The trigger frame-based uplink scheduling transmission method in the IEEE 802.11ax is still used in the IEEE 802.11be standard. Therefore, for compatibility, the trigger frame should be able to trigger both an HE station and an EHT station to simultaneously perform uplink data transmission. Because a maximum transmission bandwidth supported in the 802.11ax standard is 160 MHz, a maximum bandwidth indicated by an uplink bandwidth field in the trigger frame is also 160 MHz. A maximum transmission bandwidth supported in the 802.11be standard is 320 MHz. Therefore, to implement transmission on a larger bandwidth, the trigger frame in the 802.11be standard should be capable of triggering an EHT station to perform uplink data transmission on a bandwidth greater than 160 MHz.

In view of this, how to enable the trigger frame to have a capability of triggering the EHT station to perform uplink data transmission on the bandwidth greater than 160 MHz while ensuring compatibility of the trigger frame is an urgent problem to be resolved in the industry.

SUMMARY

Embodiments of this application provide a PPDU uplink bandwidth indication method and a related apparatus. A trigger frame in the 802.11ax may be reused to trigger an EHT station to perform uplink data transmission on a bandwidth greater than 160 MHz. Receiving of the trigger frame by an HE station is not affected, and therefore it is not necessary to design a new trigger frame to schedule the EHT station to perform uplink data transmission. In this way, the trigger frame has a capability of triggering the EHT station to perform uplink data transmission on the bandwidth greater than 160 MHz while ensuring compatibility of the trigger frame, and further complexity and signaling overheads are reduced.

The following describes this application from different aspects. It should be understood that mutual reference may be made to the following implementations and beneficial effects of the different aspects.

According to a first aspect, this application provides a PPDU uplink bandwidth indication method. The method includes: An AP generates and sends a trigger frame. The trigger frame includes first indication information. The first indication information and an uplink bandwidth field in a common information field in the trigger frame jointly indicate an uplink physical layer protocol data unit PPDU total transmission bandwidth. The trigger frame further includes second indication information. The second indication information is used to indicate distribution of an HE TB PPDU and/or an EHT TB PPDU in the uplink PPDU total transmission bandwidth.

According to a second aspect, this application provides a PPDU uplink bandwidth indication method. The method includes: An AP generates and sends a trigger frame. The trigger frame includes first indication information. The first indication information and an uplink bandwidth field in a common information field in the trigger frame jointly indicate an uplink physical layer protocol data unit PPDU total transmission bandwidth. The trigger frame further includes second indication information. The second indication information is used to indicate whether a station transmits an HE TB PPDU or an EHT TB PPDU.

With reference to the first aspect or the second aspect, in a possible design, the method further includes: The AP receives an HE TB PPDU or an EHT TB PPDU. A bandwidth field in a universal signal field in a preamble of the EHT TB PPDU is determined based on one or more of the first indication information, the uplink bandwidth field, and the second indication information.

According to a third aspect, this application provides a PPDU uplink bandwidth indication method. The method includes: A STA receives and parses a trigger frame. The trigger frame includes first indication information. The first indication information and an uplink bandwidth field in a common information field in the trigger frame jointly indicate an uplink PPDU total transmission bandwidth. The trigger frame further includes second indication information. The second indication information is used to indicate distribution of a trigger-based high efficiency physical layer protocol data unit HE TB PPDU and/or an extremely high throughput physical layer protocol data unit EHT TB PPDU in the uplink PPDU total transmission bandwidth.

According to a fourth aspect, this application provides a PPDU uplink bandwidth indication method. The method includes: A STA receives and parses a trigger frame. The trigger frame includes first indication information. The first indication information and an uplink bandwidth field in a common information field in the trigger frame jointly indicate an uplink PPDU total transmission bandwidth. The trigger frame further includes second indication information. The second indication information is used to indicate whether a station transmits an HE TB PPDU or an EHT TB PPDU.

With reference to the third or fourth aspect, in a possible design, the method further includes: The STA generates an HE TB PPDU or an EHT TB PPDU. A bandwidth field in a universal signal field in a preamble of the EHT TB PPDU is determined based on one or more of the first indication information, the uplink bandwidth field, and the second indication information. The STA sends the generated HE TB PPDU or the generated EHT TB PPDU based on an indication of the second indication information.

According to a fifth aspect, this application provides a communication apparatus. The communication apparatus is an AP or a chip in the AP, for example, a Wi-Fi chip. The communication apparatus includes a processing unit and a transceiver unit.

In a possible design, the processing unit is configured to generate a trigger frame. The trigger frame includes first indication information, and an uplink bandwidth field in a common information field in the trigger frame and the first indication information jointly indicate an uplink physical layer protocol data unit PPDU total transmission bandwidth. The trigger frame further includes second indication information. The second indication information is used to indicate distribution of a trigger based high efficiency physical layer protocol data unit HE TB PPDU and/or an extremely high throughput physical layer protocol data unit EHT TB PPDU in the uplink PPDU total transmission bandwidth. The transceiver unit is configured to send the trigger frame.

In a possible design, the processing unit is configured to generate a trigger frame. The trigger frame includes first indication information. The first indication information and an uplink bandwidth field in a common information field in the trigger frame jointly indicate an uplink physical layer protocol data unit PPDU total transmission bandwidth. The trigger frame further includes second indication information. The second indication information is used to indicate whether a station transmits an HE TB PPDU or an EHT TB PPDU. The transceiver unit is configured to send the trigger frame.

In any one of the foregoing possible designs, the transceiver unit is further configured to receive an HE TB PPDU or an EHT TB PPDU. A bandwidth field in a universal signal field in a preamble of the EHT TB PPDU is determined based on one or more of the first indication information, the uplink bandwidth field, and the second indication information.

In a possible design, the processing unit is configured to generate a trigger frame. The trigger frame includes first indication information. The first indication information and an uplink bandwidth field in a common information field in the trigger frame jointly indicate an extremely high throughput physical layer protocol data unit EHT TB PPDU bandwidth. The uplink bandwidth field indicates an HE TB PPDU bandwidth. The trigger frame further includes second indication information. The second indication information is used to indicate a frequency segment for an EHT TB PPDU and/or a frequency segment for an HE TB PPDU. A bandwidth of the EHT TB PPDU is a bandwidth jointly indicated by the first indication information and the uplink bandwidth field, and a bandwidth of the HE TB PPDU is a bandwidth of the uplink bandwidth field. The transceiver unit is configured to send the trigger frame.

In a possible design, the processing unit is configured to generate a trigger frame. The trigger frame includes first indication information. The first indication information and an uplink bandwidth field in a common information field in the trigger frame jointly indicate an EHT TB PPDU bandwidth. The uplink bandwidth field indicates an HE TB PPDU bandwidth. The trigger frame further includes second indication information. The second indication information is used to indicate whether a station transmits an HE TB PPDU or an EHT TB PPDU. The transceiver unit is configured to send the trigger frame.

Optionally, the transceiver unit is further configured to receive an HE TB PPDU or an EHT TB PPDU. A bandwidth field in a universal signal field in a preamble of the EHT TB PPDU is set to a value jointly indicated by the first indication information and the uplink bandwidth field.

According to a sixth aspect, this application provides a communication apparatus. The communication apparatus is a STA or a chip in the STA, for example, a Wi-Fi chip. The communication apparatus includes a transceiver unit and a processing unit.

In a possible design, the transceiver unit is configured to receive a trigger frame. The trigger frame includes first indication information. An uplink bandwidth field in a common information field in the trigger frame and the first indication information jointly indicate an uplink PPDU total transmission bandwidth. The trigger frame further includes second indication information. The second indication information is used to indicate distribution of a trigger based high efficiency physical layer protocol data unit HE TB PPDU and/or an extremely high throughput physical layer protocol data unit EHT TB PPDU in the uplink PPDU total transmission bandwidth. The processing unit is configured to parse the trigger frame.

In a possible design, the transceiver unit is configured to receive a trigger frame. The trigger frame includes first indication information. The first indication information and an uplink bandwidth field in a common information field in the trigger frame jointly indicate an uplink PPDU total transmission bandwidth. The trigger frame further includes second indication information. The second indication information is used to indicate whether a station transmits an HE TB PPDU or an EHT TB PPDU. The processing unit is configured to parse the trigger frame.

In any one of the foregoing possible designs, the processing unit is further configured to generate an HE TB PPDU or an EHT TB PPDU. A bandwidth field in a universal signal field in a preamble of the EHT TB PPDU is determined based on one or more of the first indication information, the uplink bandwidth field, and the second indication information. The transceiver unit is further configured to send the generated HE TB PPDU or the generated EHT TB PPDU based on an indication of the second indication information.

In a possible design, the transceiver unit is configured to receive a trigger frame. The trigger frame includes first indication information. An uplink bandwidth field in a common information field in the trigger frame and the first indication information jointly indicate an EHT TB PPDU bandwidth. The uplink bandwidth field indicates an HE TB PPDU bandwidth. The trigger frame further includes second indication information. The second indication information is used to indicate a frequency segment for an EHT TB PPDU and/or a frequency segment for an HE TB PPDU. A bandwidth of the EHT TB PPDU is a bandwidth jointly indicated by the first indication information and the uplink bandwidth field. A bandwidth of the HE TB PPDU is a bandwidth of the uplink bandwidth field. The processing unit is configured to parse the trigger frame.

In a possible design, the transceiver unit is configured to receive a trigger frame. The trigger frame includes first indication information. The first indication information and an uplink bandwidth field in a common information field in the trigger frame jointly indicate an EHT TB PPDU bandwidth. The uplink bandwidth field indicates an HE TB PPDU bandwidth. The trigger frame further includes second indication information. The second indication information is used to indicate whether a station transmits an HE TB PPDU or an EHT TB PPDU. The processing unit is configured to parse the trigger frame.

Optionally, the foregoing processing unit is further configured to generate an HE TB PPDU or an EHT TB PPDU. A bandwidth field in a universal signal field in a preamble of the EHT TB PPDU is set to a value jointly indicated by the first indication information and the uplink bandwidth field. The transceiver unit is further configured to send the generated HE TB PPDU or the generated EHT TB PPDU based on an indication of the second indication information.

According to a seventh aspect, this application provides a PPDU uplink bandwidth indication method. The method includes: An AP generates and sends a trigger frame. The trigger frame includes first indication information. The first indication information and an uplink bandwidth field in a common information field in the trigger frame jointly indicate an extremely high throughput physical layer protocol data unit EHT TB PPDU bandwidth. The uplink bandwidth field indicates an HE TB PPDU bandwidth. The trigger frame further includes second indication information. The second indication information is used to indicate a frequency segment for an EHT TB PPDU and/or a frequency segment for an HE TB PPDU. A bandwidth of the EHT TB PPDU is a bandwidth jointly indicated by the first indication information and the uplink bandwidth field. A bandwidth of the HE TB PPDU is a bandwidth of the uplink bandwidth field.

According to an eighth aspect, this application provides a PPDU uplink bandwidth indication method. The method includes: An AP generates and sends a trigger frame. The trigger frame includes first indication information. The first indication information and an uplink bandwidth field in a common information field in the trigger frame jointly indicate an extremely high throughput physical layer protocol data unit EHT TB PPDU bandwidth. The uplink bandwidth field indicates an HE TB PPDU bandwidth. The trigger frame further includes second indication information. The second indication information is used to indicate whether a station transmits an HE TB PPDU or an EHT TB PPDU.

With reference to the seventh or eighth aspect, in a possible design, the method further includes: The AP receives an HE TB PPDU or an EHT TB PPDU. A bandwidth field in a universal signal field in a preamble of the EHT TB PPDU is set to a value jointly indicated by the first indication information and the uplink bandwidth field.

According to a ninth aspect, this application provides a PPDU uplink bandwidth indication method. The method includes: A STA receives and parses a trigger frame. The trigger frame includes first indication information. The first indication information and an uplink bandwidth field in a common information field in the trigger frame jointly indicate an EHT TB PPDU bandwidth. The uplink bandwidth field indicates an HE TB PPDU bandwidth. The trigger frame further includes second indication information. The second indication information is used to indicate a frequency segment for an EHT TB PPDU and/or a frequency segment for an HE TB PPDU. A bandwidth of the EHT TB PPDU is the bandwidth jointly indicated by the first indication information and the uplink bandwidth field. A bandwidth of the HE TB PPDU is the bandwidth of the uplink bandwidth field.

According to a tenth aspect, this application provides a PPDU uplink bandwidth indication method. The method includes: A STA receives and parses a trigger frame. The trigger frame includes first indication information. The first indication information and an uplink bandwidth field in a common information field in the trigger frame jointly indicate an EHT TB PPDU bandwidth. The uplink bandwidth field indicates an HE TB PPDU bandwidth. The trigger frame further includes second indication information. The second indication information is used to indicate whether a station transmits an HE TB PPDU or an EHT TB PPDU.

With reference to the ninth or tenth aspect, in a possible design, the method further includes: The STA generates an HE TB PPDU or an EHT TB PPDU. A bandwidth field in a universal signal field in a preamble of the EHT TB PPDU is set to a value jointly indicated by the first indication information and the uplink bandwidth field. The STA sends the generated HE TB PPDU or the generated EHT TB PPDU based on an indication of the second indication information.

According to an eleventh aspect, this application provides a communication apparatus. The communication apparatus is specifically an AP, and includes a processor and a transceiver. The processor and the transceiver are configured to perform the method according to the first aspect, the second aspect, the seventh aspect, or the eighth aspect.

According to a twelfth aspect, this application provides a communication apparatus. The communication apparatus is specifically a STA, and includes a processor and a transceiver. The processor and the transceiver are configured to perform the method according to the third aspect, the fourth aspect, the ninth aspect, or the tenth aspect.

According to a thirteenth aspect, this application provides a communication apparatus. The communication apparatus may exist in a product form of a chip, and a structure of the communication apparatus includes an input/output interface and a processing circuit. The input/output interface and the processing circuit are configured to perform the method according to any one of the first aspect to the fourth aspect or any one of the seventh aspect to the tenth aspect.

According to a fourteenth aspect, this application provides a computer-readable storage medium, where the computer-readable storage medium stores program instructions. When the program instructions are run on a computer, the computer is enabled to perform the method according to any one of the first aspect to the fourth aspect or any one of the seventh aspect to the tenth aspect.

According to a fifteenth aspect, this application provides a computer program product including program instructions. When the computer program product runs on a computer, the computer is enabled to perform the method according to any one of the first aspect to the fourth aspect or any one of the seventh aspect to the tenth aspect.

When embodiments of this application is implemented, the trigger frame in the 802.11ax can be reused to trigger the EHT station to perform uplink data transmission on a bandwidth greater than 160 MHz, so that the trigger frame has a capability of triggering the EHT station to perform uplink data transmission on the bandwidth greater than 160 MHz while ensuring compatibility of the trigger frame. In addition, receiving of the trigger frame by an HE station is not affected, and therefore it is not necessary to design a new trigger frame to schedule the EHT station to perform uplink data transmission, and complexity and signaling overheads are reduced.

BRIEF DESCRIPTION OF DRAWINGS

To describe technical solutions in embodiments of this application more clearly, the following briefly describes accompanying drawings for describing embodiments.

FIG. 4 is a schematic flowchart of a trigger frame-based uplink scheduling transmission method in the 802.11ax standard;

FIG. 5a is a schematic diagram of a frame format of a trigger frame in the 802.11ax standard;

FIG. 5b-1 and FIG. 5b-2 are schematic diagrams of frame formats of a common information field and a user information field in a trigger frame in the 802.11ax standard;

FIG. 7 is a schematic diagram of a frame structure of a first user information field according to an embodiment of this application;

FIG. 8 is a schematic diagram of a structure of an uplink multi-user PPDU according to an embodiment of this application;

FIG. 9 is a schematic diagram of division into 320 MHz channels on a 6 GHz frequency band;

DESCRIPTION OF EMBODIMENTS

The following clearly and completely describes technical solutions in embodiments of this application with reference to accompanying drawings in embodiments of this application.

For ease of understanding the method provided in embodiments of this application, the following describes a system architecture and/or an application scenario of the method provided in embodiments of this application. It may be understood that the system architecture and/or the scenario described in the embodiments of this application are/is intended to describe the technical solutions in the embodiments of this application more clearly, and do/does not constitute a limitation on the technical solutions provided in the embodiments of this application.

Embodiments of this application provide a PPDU uplink bandwidth indication method. A trigger frame in the 802.11ax may be reused to trigger an EHT station to perform uplink data transmission on a bandwidth greater than 160 MHz. Receiving of the trigger frame by an HE station is not affected, and therefore, it is not necessary to design a new trigger frame to schedule the EHT station to perform uplink data transmission. In this way, the trigger frame has a capability of triggering the EHT station to perform uplink data transmission on the bandwidth greater than 160 MHz while ensuring compatibility of the trigger frame, and further complexity and signaling overheads are reduced. The PPDU uplink bandwidth indication method is applicable to a wireless communication system, for example, a wireless local area network system. The PPDU uplink bandwidth indication method may be implemented by a communication device in the wireless communication system or a chip or a processor in the communication device. The communication device may be an access point device or a station device. Alternatively, the communication device may be a wireless communication device that supports concurrent transmission on a plurality of links. For example, the communication device may be referred to as a multi-link device (MLD) or a multi-band device. Compared with a communication device that supports only single-link transmission, the multi-link device has higher transmission efficiency and a higher throughput.

Figure 1:
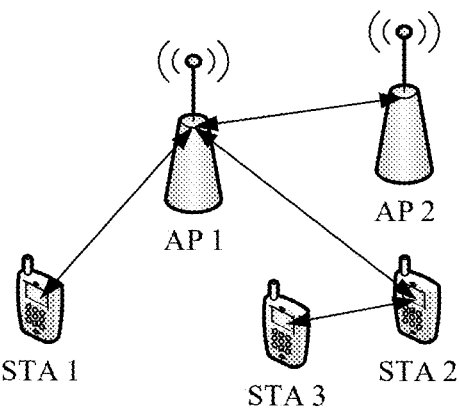
FIG. 1 is a schematic architectural diagram of a wireless communication system according to an embodiment of this application.

The PPDU uplink bandwidth indication method provided in embodiments of this application may be applied to a scenario in which an AP communicates with one or more STAs, may be alternatively applied to a scenario in which an AP communicates with another AP, and is also applicable to a scenario in which a STA communicates with another STA. The following uses a communication scenario between an AP and a STA as an example. FIG. 1 is a schematic diagram of an architecture of a wireless communication system according to an embodiment of this application. As shown in FIG. 1, the wireless communication system may include one or more APs (for example, an AP 1 or an AP 2 in FIG. 1) and one or more STAs (for example, a STA 1, a STA 2, or a STA 3 in FIG. 1). The AP and the STA support a WLAN communication protocol. The communication protocol may include the IEEE 802.11be (or referred to as Wi-Fi 7, EHT protocol), and may further include protocols such as the IEEE 802.11ax and the IEEE 802.11ac. Certainly, the communication protocol may further include a next-generation protocol of IEEE 802.11be and the like with continuous evolution and development of communication technologies. A WLAN is used as an example. An apparatus for implementing the method in this application may be an AP or a STA in the WLAN, or a chip or a processing system disposed in the AP or the STA.

An access point (for example, the AP 1 or the AP 2 in FIG. 1) is an apparatus having a wireless communication function, supports communication by using a WLAN protocol, has a function of communicating with another device (for example, a station or another access point) in a WLAN network, and certainly, may further have a function of communicating with another device. In a WLAN system, an access point may be referred to as an access point station (AP STA). The apparatus having the wireless communication function may be an entire device, or may be a chip or a processing system installed in the entire device. The device in which the chip or the processing system is installed may implement the method and the function in embodiments of this application under control of the chip or the processing system. The AP in embodiments of this application is an apparatus providing a service for a STA, and may support 802.11 series protocols. For example, the AP may be a communication entity, for example, a communication server, a router, a switch, or a bridge. The AP may include a macro base station, a micro base station, a relay station, and the like in various forms. Certainly, the AP may alternatively be a chip or a processing system in these devices in various forms, to implement the method and function in embodiments of this application.

A station (for example, the STA 1, the STA 2, or the STA 3 in FIG. 1) is an apparatus having a wireless communication function, supports communication by using a WLAN protocol, and has a capability of communicating with another station or an access point in a WLAN network. In the WLAN system, a station may be referred to as a non-access point station (non-AP STA). For example, the STA is any user communication device that allows a user to communicate with an AP and further communicate with a WLAN. The apparatus having a wireless communication function may be an entire device, or may be a chip or a processing system disposed in the entire device. The device in which the chip or the processing system is disposed may implement the method and the function in embodiments of this application under control of the chip or the processing system. For example, the STA may be a user device that can connect to the internet, for example, a tablet computer, a desktop computer, a laptop computer, a notebook computer, an ultra-mobile personal computer (UMPC), a handheld computer, a netbook, a personal digital assistant (PDA), or a mobile phone. Alternatively, the STA may be an internet of things node in the internet of things, an in-vehicle communication apparatus in the internet of vehicles, an entertainment device, a game device or system, a global positioning system device, or the like. The STA may alternatively be a chip and a processing system in the foregoing terminals.

The WLAN system can provide high-speed and low-latency transmission. With continuous evolution of WLAN application scenarios, the WLAN system is to be applied to more scenarios or industries, for example, the internet of things industry, the internet of vehicles industry, the banking industry, enterprise offices, exhibition halls of stadiums, concert halls, hotel rooms, dormitories, wards, classrooms, supermarkets, squares, streets, production workshops and warehousing. Certainly, a device (such as an access point or a station) that supports WLAN communication may be a sensor node (for example, a smart water meter, a smart electricity meter, or a smart air detection node) in a smart city, a smart device (for example, a smart camera, a projector, a display, a television, a stereo, a refrigerator, or a washing machine) in a smart home, a node in the internet of things, an entertainment terminal (for example, an AR, a VR, or another wearable device), a smart device in smart office (for example, a printer, a projector, a loudspeaker, or a stereo), an internet of vehicle device in the internet of vehicle, an infrastructure (for example, a vending machine, a self-service navigation station of a supermarket, a self-service cash register device, or a self-service ordering machine) in daily life scenarios, a device in a large sports and music venue, and the like. Specific forms of the multi-link STA and the multi-link AP are not limited in embodiments of this application, and are merely examples for description herein.

Figure 2A:
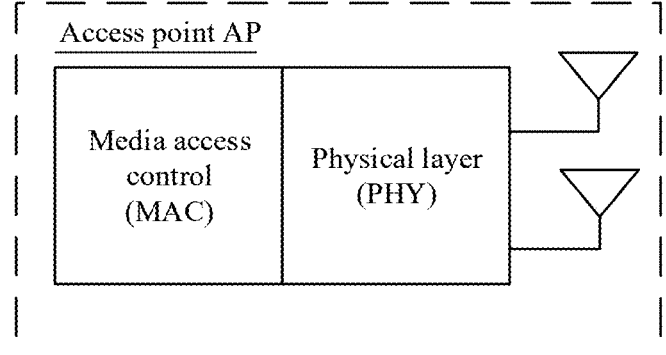
FIG. 2a is a schematic diagram of a structure of an access point according to an embodiment of this application.
Figure 2B:
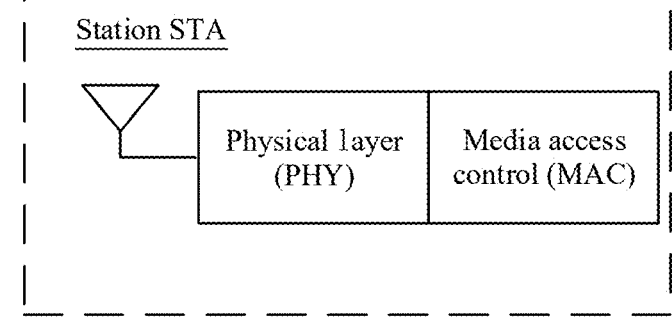
FIG. 2b is a schematic diagram of a structure of a station according to an embodiment of this application.

Optionally, refer to FIG. 2*a*. FIG. 2*a* is a schematic diagram of a structure of an access point according to an embodiment of this application. The AP may have a plurality of antennas, or may have a single antenna. In FIG. 2*a*, the AP includes a physical layer (PHY) processing circuit and a media access control (MAC) processing circuit. The physical layer processing circuit may be configured to process a physical layer signal, and the MAC layer processing circuit may be configured to process a MAC layer signal. The 802.11 standard focuses on the PHY and MAC parts. FIG. 2*b* is a schematic diagram of a structure of a station according to an embodiment of this application. FIG. 2*b* is a schematic diagram of a structure of a STA with a single antenna. In an actual scenario, the STA may alternatively have a plurality of antennas, and may be a device with more than two antennas. In FIG. 2*b*, the STA may include a PHY processing circuit and a MAC processing circuit. The physical layer processing circuit may be configured to process a physical layer signal, and the MAC layer processing circuit may be configured to process a MAC layer signal.

The foregoing content briefly describes the system architecture in embodiments of this application. To better understand the technical solutions in embodiments of this application, the following describes content related to embodiments of this application.

1. Frequency Segment

In the WLAN, channels are usually classified into a primary channel and a secondary channel, and the secondary channel may include one or more sub-channels. If division is performed with a basic bandwidth unit of 20 MHz, a 320 MHz channel may be divided into 16 sub-channels. The 16 sub-channels are sequentially numbered as a channel 1 to a channel 16, where each number represents a 20 MHz channel.

Figure 3:
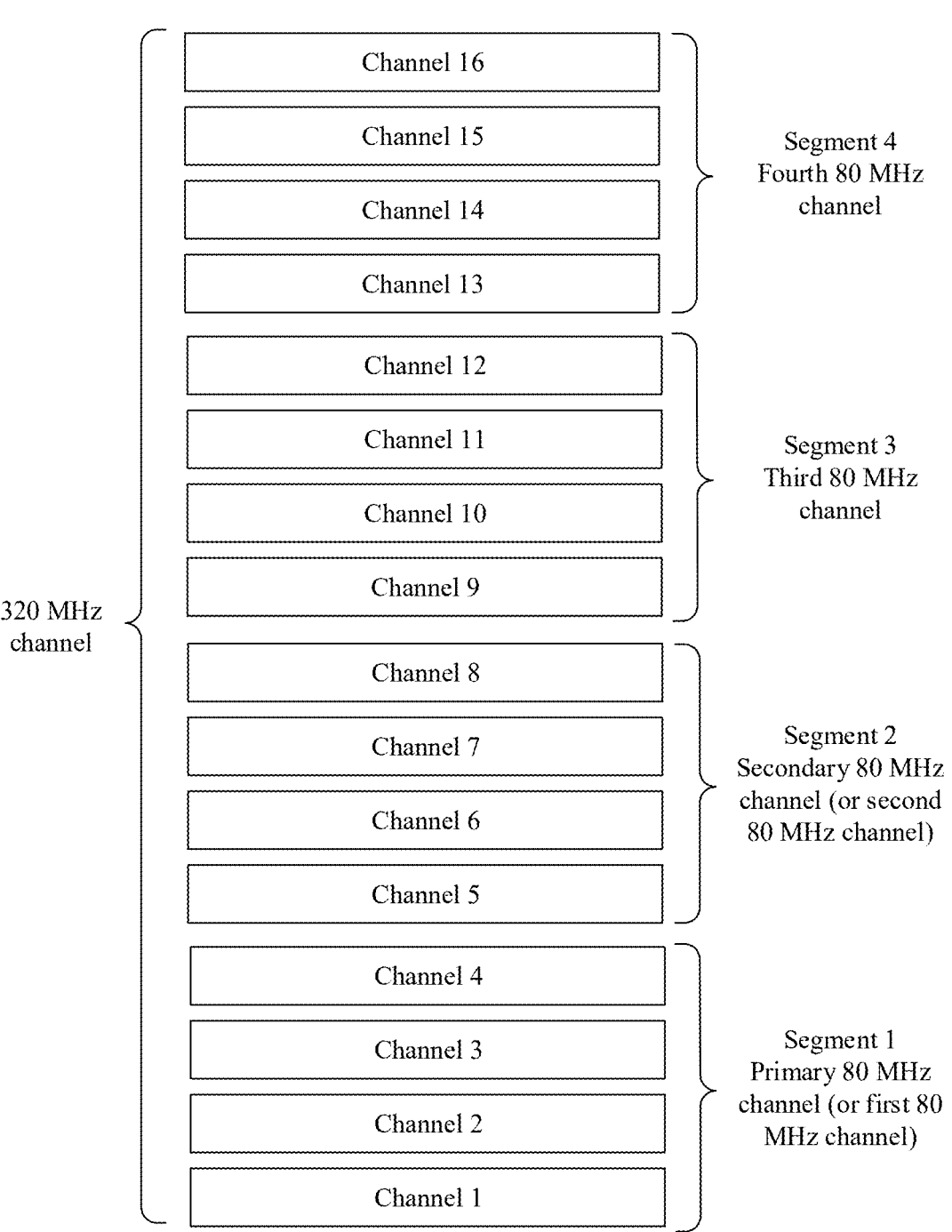
FIG. 3 is a schematic diagram of division into frequency segments on a 320 MHz channel according to an embodiment of this application.

In a WLAN, a contiguous spectrum block for transmission may be referred to as a frequency slice (frequency segment). One WLAN channel may include a plurality of frequency segments, and a bandwidth of each frequency segment may be 80 MHz, 40 MHz, 20 MHz, or 160 MHz. FIG. 3 is a schematic diagram of division into frequency segments on a 320 MHz channel according to an embodiment of this application. As shown in FIG. 3, for example, a bandwidth of a frequency segment is 80 MHz, and a 320 MHz channel shown in FIG. 3 may be divided into four frequency segments. The frequency segment may alternatively be referred to as a frequency domain segment, or referred to as a segment for short.

2. Trigger Frame-Based Uplink Scheduling Transmission Method in the IEEE 802.11ax Standard FIG. 4 is a schematic flowchart of a trigger frame-based uplink scheduling transmission method in the 802.11ax standard. As shown in FIG. 4, the trigger frame-based uplink scheduling transmission method specifically includes the following steps.

(1) An AP sends a trigger frame, where the trigger frame is used to schedule one or more STAs to send an uplink trigger-based HE PPDU (generally speaking, the PPDU may also be referred to as a data packet or a packet). The trigger-based HE PPDU may be abbreviated as HE TB PPDU (High Efficient Trigger Based Physical layer Protocol Data Unit). The trigger frame includes resource scheduling information and another parameter that are used by the one or more stations to send an uplink sub-PPDU.

(2) After receiving the trigger frame, the STA parses the trigger frame to obtain a user information field that matches an association identifier (association identification, AID) of the STA, and then sends the HE TB PPDU on an RU indicated by a resource unit allocation subfield in the user information field. If the station does not receive the user information field that matches the AID of the station, but receives an AID for random contention, the station may still perform orthogonal frequency division multiple access (OFDMA) random contention on a resource block indicated in the corresponding user information field, to transmit the uplink TB PPDU. AIDs for random contention are classified into two types. One type is an AID for random contention of an associated station, for example, "0", and the other type is an AID for random contention of an unassociated station, for example, "2045".

Optionally, for meanings and functions of fields that may be included in the HE TB PPDU, refer to the following Table 1.

TABLE 1

| Acronyms and Abbreviations | Short for | Item | Description |
|---|---|---|---|
| L-STF | Legacy Short Training Field | Legacy short training field | For PPDU discovery, coarse synchronization, and automatic gain control |
| L-LTF | Legacy Long Training Field | Legacy long training field | For fine synchronization and channel estimation |
| L-SIG | Legacy Signal Field A | Legacy signal field | Carrying signaling information related to a PPDU length, to ensure coexistence |
| HE-SIG-A | High Efficient Signal Field A/B | High efficient signal field A | Carrying signaling for demodulating subsequent data |
| HE-STF | High Efficient Short Training Field | High efficient short training field | For automatic gain control of a subsequent field |
| HE-LTF | High Efficient Long Training Field | High efficient long training field | For channel estimation |
| Data | | Data | Carrying data information |

(3) The AP receives an uplink multi-user PPDU, where the uplink multi-user PPDU includes uplink sub-PPDUs sent by one or more stations. Then, the AP returns an acknowledgment frame. The acknowledgment frame sent to the one or more stations may be sent in a form of downlink orthogonal frequency division multiple access (OFDMA), or may be sent in a form of non-high throughput (non-HT) duplicate transmission. The acknowledgment frame includes an Ack frame and a block acknowledgment (Block Ack) frame. The block Ack frame includes a compressed block Ack frame and a multi-station block acknowledgment (Multi-STA Block Ack) frame. The Ack frame and the block Ack frame are acknowledgments of information sent to one station. The multi-STA block Ack frame is an acknowledgment of information sent to one or more stations.

FIG. 5a is a schematic diagram of a frame format of a trigger frame in the 802.11ax standard. As shown in FIG. 5a, the trigger frame includes a common information field and a user information list field. The common information field includes common information to be read by all STAs, the user information list field includes one or more user information fields, and one user information field includes information to be read by one STA.

Figures 2, 5B:
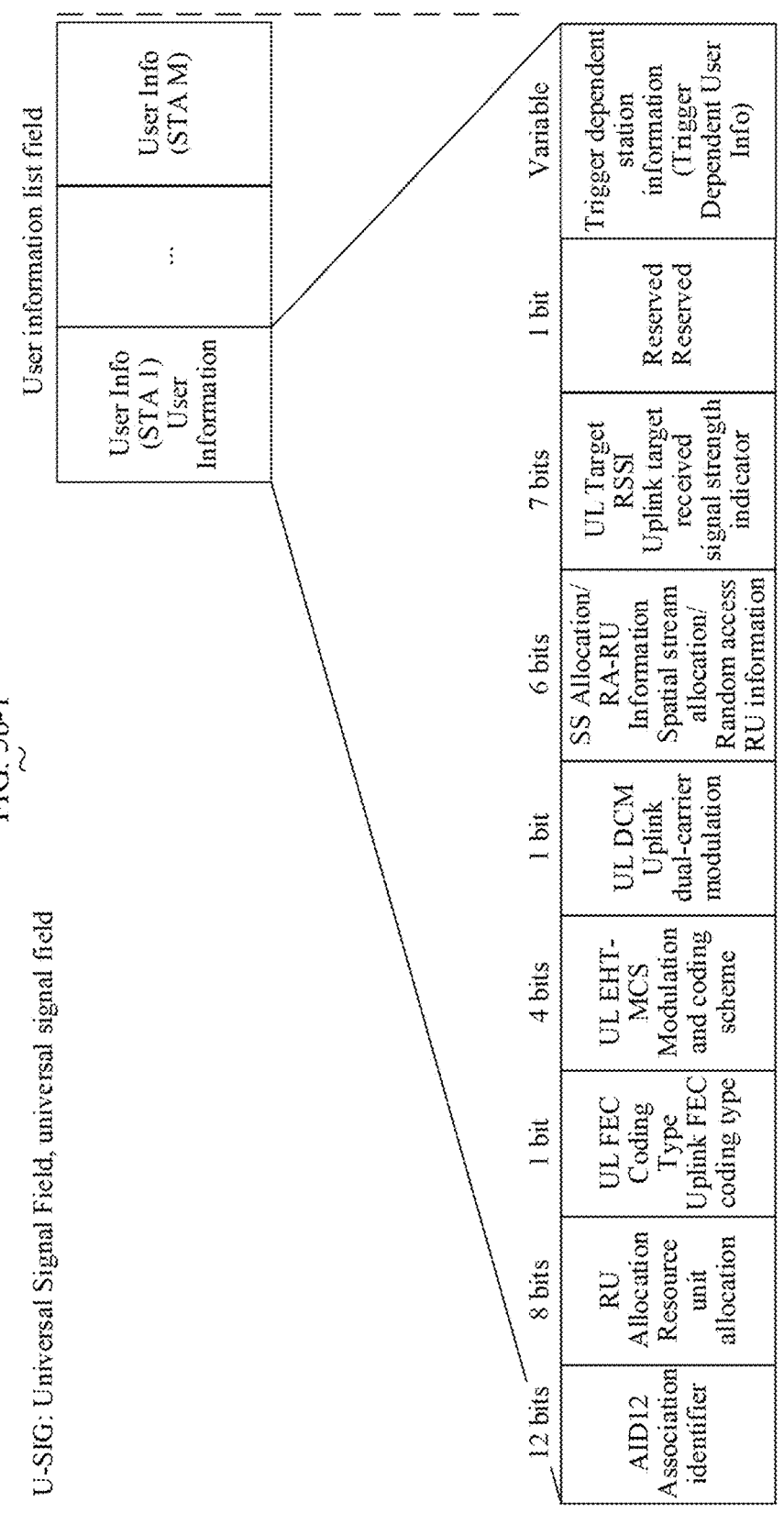

FIG. 5b-1 and FIG. 5b-2 are schematic diagrams of frame formats of the common information field and the user information field in the trigger frame in the 802.11ax standard. As shown in FIG. 5b-1 and FIG. 5b-2, in the user information field, an association identifier 12 (AID12) indicates an association identifier of a STA, and a resource unit (RU) allocation subfield indicates a specific resource unit location allocated to the STA (the STA indicated by the AID12).

Based on FIG. 5b-1 and FIG. 5b-2, the following briefly describes some fields in the common information field in the trigger frame.

1. Trigger Type Field in the Common Information Field

The trigger type field occupies 4 bits, and is used to indicate a type of the trigger frame. For a correspondence between a value of the trigger type field and a type of the trigger frame, refer to the following Table 2.

TABLE 2

| Value of a trigger type field | Type of a trigger frame |
|---|---|
| 0 | Basic |
| 1 | Beamforming report poll (BFRP) |
| 2 | Multi-user block acknowledgment request (MU-BAR) |
| 3 | Multi-user request to send (MU-RTS) |
| 4 | Buffer status report poll (BSRP) |
| 5 | Group cast retransmission MU-BAR |
| 6 | Bandwidth query report poll (BQRP) |
| 7 | Null data packet (NDP) feedback report poll (NDP NFRP) |
| 8 to 15 | Reserved |

2. Uplink Bandwidth Field in the Common Information Field

The uplink bandwidth field occupies 2 bits, and is used to indicate a bandwidth in an HE-SIG-A in the HE TB PPDU. If a value of the uplink bandwidth field is 0, it indicates that the bandwidth in the HE-SIG-A is 20 MHz; if a value of the uplink bandwidth field is 1, it indicates that the bandwidth in the HE-SIG-A is 40 MHz; if a value of the uplink bandwidth field is 2, it indicates that the bandwidth in the HE-SIG-A is 80 MHz; if a value of the uplink bandwidth field is 3, it indicates that the bandwidth in the HE-SIG-A is 160 MHz.

3. Number of HE-LTF Symbols and Midamble Periodicity Field and Doppler Field in the Common Information Field The number of HE-LTF symbols and midamble periodicity field occupies 3 bits. The Doppler field occupies 1 bit. The number of HE-LTF symbols and midamble periodicity field needs to be used in combination with the Doppler field.

Specifically, when a value of the Doppler field is 0, the 3 bits in the number of HE-LTF symbols and midamble periodicity field are used to indicate the number of HE-LTF symbols. Specifically, if a value of the number of HE-LTF symbols and midamble periodicity field is 0, it indicates that the number of HE-LTF symbols is 1; if a value of the number of HE-LTF symbols and midamble periodicity field is 1, it indicates that the number of HE-LTF symbols is 2; if a value of the number of HE-LTF symbols and midamble periodicity field is 2, it indicates that the number of HE-LTF symbols is 4; if a value of the number of HE-LTF symbols and midamble periodicity field is 3, it indicates that the number of HE-LTF symbols is 6; if a value of the number of HE-LTF symbols and midamble periodicity field is 4, it indicates that the number of HE-LTF symbols is 8; another value of the number of HE-LTF symbols and midamble periodicity field is a reserved value.

When a value of the Doppler subfield is 1, first two bits in the number of HE-LTF symbols and midamble periodicity field are used to indicate the number of HE-LTF symbols, and the third bit in the number of HE-LTF symbols and midamble periodicity field is used to indicate a midamble periodicity. When a value of the first two bits is 0, it indicates that the number of HE-LTF symbols is 1; when a value of the first two bits is 1, it indicates that the number of HE-LTF symbols is 2; when a value of the first two bits is 2, it indicates that the number of HE-LTF symbols is 4; a value of 3 of the first two bits is a reserved value. When a value of the third bit in the number of HE-LTF symbols and midamble periodicity field is 0, it indicates that the midamble periodicity is 10 symbols; when a value of the third bit is 1, it indicates that the midamble periodicity is 20 symbols.

The foregoing describes some fields in the common information field in the trigger frame in the 802.11ax standard. Based on FIG. 5*b*-1 and FIG. 5*b*-2, the following briefly describes some fields in the user information field in the trigger frame.

1. AID12 Field in the User Information Field

The AID12 field occupies 12 bits. For values and meanings of the AID12 field, refer to the following Table 3.

TABLE 3

| AID12 field | Definition |
|---|---|
| 0 | The user information field allocates one or more contiguous random access RUs for an associated station (user info field allocates one or more contiguous RA-RUs for associated STA) |
| 1 to 2007 | The user information field is addressed to a station whose AID is equal to the value of the AID subfield |
| 2008 to 2044 | Reserved |
| 2045 | The user information field allocates one or more contiguous random access RUs for an unassociated station (user info field allocates one or more contiguous RA-RUs for unassociated STAs) |
| 2046 | Unallocated RU |
| 2047 to 4094 | Reserved |
| 4095 | Start of a padding field |

In other words, in the 802.11ax standard, if a value in an AID12 field in one user information field is 0 or 2045, the user information field is used to allocate one or more contiguous random access RUs to a managed station. If a value in an AID12 field in one user information field is any value of 1 to 2007, the user information field is used to carry information that needs to be read by a station whose AID matches the value in the AID12 field. If a value in an AID12 field in one user information field is 2046, the user information field is used to indicate an unallocated RU. If a value in an AID12 field in one user information field is 4095, the user information field is used as a padding field. In addition, in the 802.11ax standard, values 2008 to 2044 and 2047 to 4094 of the AID12 field are still reserved values, and are not defined.

2. Resource Unit Allocation Field in the User Information Field

In the 802.11ax standard, the resource unit allocation field and the uplink bandwidth field in the common information field may jointly indicate a size and a location of an allocated RU.

It may be understood that the uplink bandwidth field in the common information field occupies 2 bits, and indicates a maximum of 160 MHz bandwidth. In other words, a trigger frame in the 802.11ax triggers a station to transmit uplink data on a maximum of 160 MHz bandwidth. However, a maximum transmission bandwidth supported in the 802.11be standard is 320 MHz. Therefore, to support a 320 MHz bandwidth in the 802.11be standard, embodiments of this application provide a PPDU uplink bandwidth indication method. A trigger frame in the 802.11ax may be reused to trigger an EHT station to perform uplink data transmission on a bandwidth greater than 160 MHz. Receiving of the trigger frame by an HE station is not affected, and therefore, it is not necessary to design a new trigger frame to schedule the EHT station to perform uplink data transmission. In this way, the trigger frame has a capability of triggering the EHT station to perform uplink data transmission on the bandwidth greater than 160 MHz while ensuring compatibility of the trigger frame, and further complexity and signaling overheads are reduced.

The following describes in detail the technical solutions provided in this application with reference to more accompanying drawings.

It may be understood that the AP and the STA in this application may be a single-link device, or may be a functional entity or a functional unit in a multi-link device. For example, the AP in this application is an AP in an AP multi-link device, and the STA is a STA in a station multi-link device. This is not limited in this application.

It may be understood that the PPDU uplink bandwidth indication method provided in embodiments of this application is described below by using an example in which the method is implemented in a communication system including one AP and one or more STAs. The AP supports the IEEE 802.11be protocol (or referred to as the Wi-Fi 7, the EHT protocol), and may further support another WLAN communication protocol, for example, protocols such as the IEEE 802.11ax and the IEEE 802.11ac. At least one STA of the one or more STAs supports the IEEE 802.11be protocol. It should be understood that the AP and the STA in embodiments of this application may further support a next-generation protocol of the IEEE 802.11be. In other words, the PPDU uplink bandwidth indication method provided in embodiments of this application is not only applicable to the IEEE 802.11be protocol, but also applicable to a next-generation protocol of the IEEE 802.11be.

It should be understood that the STA in embodiments of this application may be an HE station or an EHT station. The HE station can transmit only an HE TB PPDU, and an EHT station can transmit an HE TB PPDU and a trigger-based EHT TB PPDU. The trigger-based HE PPDU may be abbreviated as EHT TB PPDU (extremely high throughput Trigger Based Physical layer Protocol Data Unit).

Figure 6:
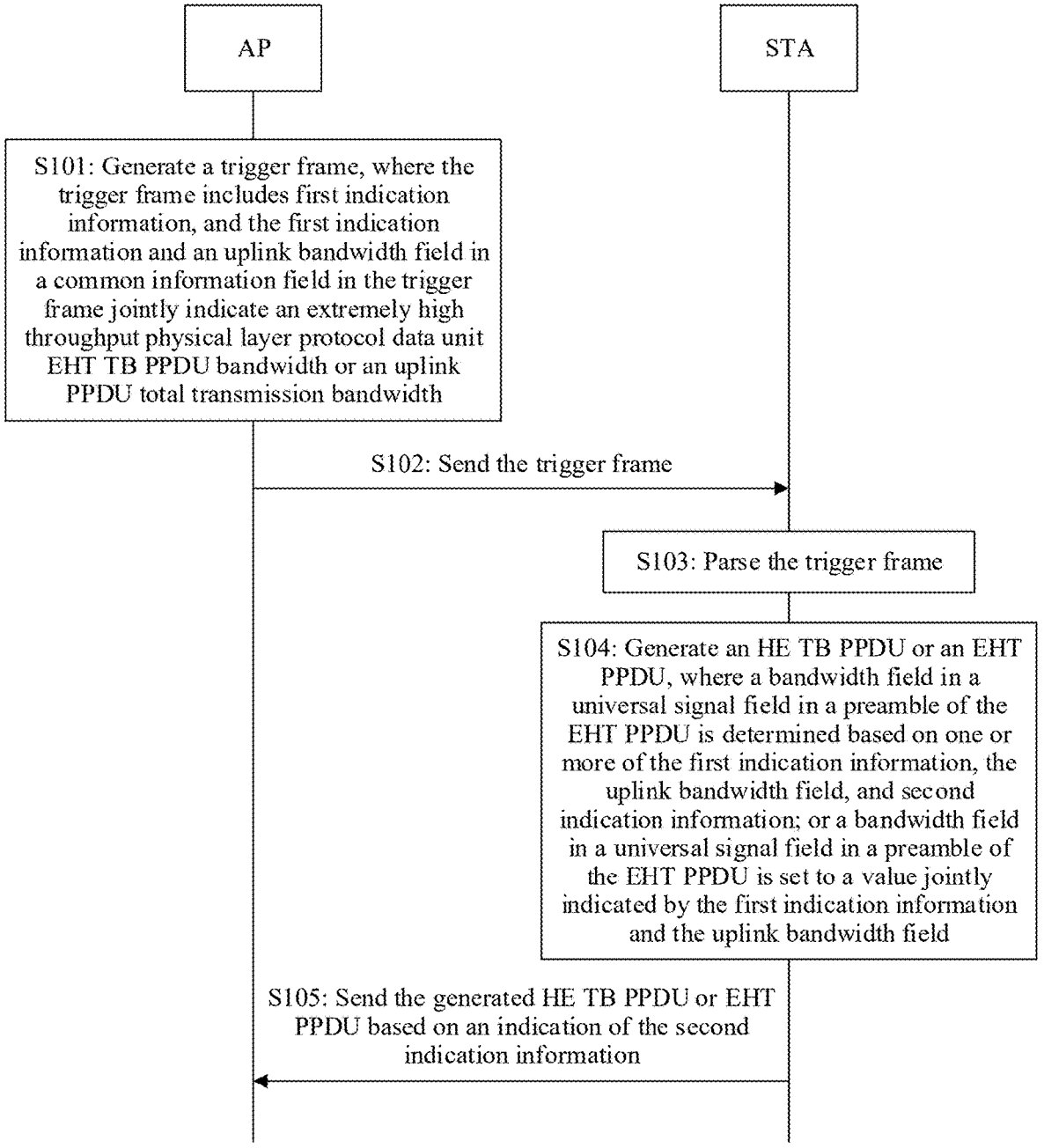
FIG. 6 is a schematic flowchart of a PPDU uplink bandwidth indication method according to an embodiment of this application.

FIG. 6 is a schematic flowchart of a PPDU uplink bandwidth indication method according to an embodiment of this application. As shown in FIG. 6, the PPDU uplink bandwidth indication method includes but is not limited to the following steps.

S101: An AP generates a trigger frame, where the trigger frame includes first indication information, and the first indication information and an uplink bandwidth field in a common information field in the trigger frame jointly indicate an extremely high throughput physical layer protocol data unit EHT TB PPDU bandwidth or an uplink PPDU total transmission bandwidth.

For a frame format of the trigger frame, refer to FIG. 5a. The trigger frame includes a common information field and a user information list field. For a frame format of the common information field, refer to the common information field shown in FIG. 5b-1 and FIG. 5b-2. The common information field includes an uplink bandwidth field used for indicating a bandwidth in an HE-SIG-A in an HE TB PPDU. The trigger frame may include the first indication information. The first indication information and the uplink bandwidth field in the common information field in the trigger frame jointly indicate the bandwidth of an extremely high throughput physical layer protocol data unit EHT TB PPDU or the uplink PPDU total transmission bandwidth. It should be understood that the uplink PPDU total transmission bandwidth is a sum of the bandwidth of the uplink HE TB PPDU and the bandwidth of the uplink EHT TB PPDU.

Optionally, the first indication information may alternatively be directly used to indicate the uplink PPDU total transmission bandwidth or the EHT TB PPDU bandwidth, and does not need jointly indicate the uplink PPDU total transmission bandwidth or the EHT TB PPDU bandwidth together with the uplink bandwidth field.

Optionally, the trigger frame further includes second indication information. The second indication information is used to indicate distribution (distribution herein refers to a bandwidth size and a frequency segment) of a trigger-based high efficiency physical layer protocol data unit HE TB PPDU and/or an EHT TB PPDU in the uplink PPDU total transmission bandwidth. Alternatively, the second indication information is used to indicate whether a station transmits an HE TB PPDU or an EHT TB PPDU.

Optionally, the trigger frame further includes the second indication information, and the second indication information is used to indicate whether an EHT station transmits an HE TB PPDU or an EHT TB PPDU.

Optionally, the trigger frame further includes the second indication information, and the second indication information is used to indicate a frequency segment for an EHT TB PPDU and/or a frequency segment for an HE TB PPDU.

The trigger frame may be used to schedule one or more EHT stations to perform uplink multi-user transmission, and may further schedule an HE station and an EHT station to simultaneously perform uplink multi-user transmission. In other words, the trigger frame supports an uplink multi-user hybrid transmission mode. It should be understood that an HE station can transmit only an HE TB PPDU, and an EHT station can transmit both an HE TB PPDU and an EHT TB PPDU.

It should be understood that an HE/EHT short training field, an HE/EHT long training field, and a data field in a PPDU are transmitted on a resource block, and indication information of the resource block is in a user information field that matches an AID of the station. This is the same in the following, and details are not described again.

If the trigger frame includes user information fields of one or more HE stations, a trigger frame for non-HT duplicate transmission on a primary 80 MHz channel or a primary 160 MHz channel cannot be punctured. In other words, the trigger frame for non-HT needs to be transmitted on each 20 MHz channel of the primary 80 MHz channel or the primary 160 MHz channel.

S102: The AP sends the trigger frame. Correspondingly, a STA receives the trigger frame.

S103: The STA parses the trigger frame.

S104 (Optional): The STA generates an HE TB PPDU or an EHT TB PPDU. A bandwidth field in a universal signal field in a preamble of the EHT TB PPDU is determined based on one or more of the first indication information, the uplink bandwidth field, and the second indication information. Alternatively, a bandwidth field in a universal signal field in a preamble of the EHT TB PPDU is set to a value jointly indicated by the first indication information and the uplink bandwidth field.

S105 (Optional): The STA sends the generated HE TB PPDU or EHT TB PPDU based on an indication of the second indication information. Correspondingly, the AP receives the HE TB PPDU or the EHT TB PPDU.

It can be learned that in this embodiment of this application, the trigger frame in the 802.11ax carries the first indication information, to directly indicate or jointly indicate the EHT TB PPDU bandwidth or the uplink PPDU total transmission bandwidth. The trigger frame in the 802.11ax also carries the second indication information that is used to indicate distribution of the HE TB PPDU and/or the EHT TB PPDU in the uplink PPDU total transmission bandwidth, or indicate the frequency segment for the EHT TB PPDU and/or the frequency segment for the HE TB PPDU, or directly indicate whether the EHT station transmits the HE TB PPDU or the EHT TB PPDU. In this way, the EHT station sets the bandwidth field of the universal signal field in the EHT TB PPDU based on one or more of the first indication information, the uplink bandwidth field, and the second indication information, and then transmits the EHT TB PPDU based on the indication of the second indication information. The trigger frame in the 802.11ax can be reused to trigger the EHT station to perform uplink data transmission on a bandwidth greater than 160 MHz, so that the trigger frame has a capability of triggering the EHT station to perform uplink data transmission on the bandwidth greater than 160 MHz while ensuring compatibility of the trigger frame. In addition, receiving of the trigger frame by an HE station is not affected, and therefore it is not necessary to design a new trigger frame to schedule the EHT station to perform uplink data transmission, and complexity and signaling overheads are reduced.

Implementations of the first indication information and the second indication information are described below in detail.

Optionally, the first indication information may be in an unused bit (or a reserved bit) in the common information field in the trigger frame, or may be in a special user information field (denoted as a first user information field) in the trigger frame. A value of an association identifier AID12 field in the first user information field is a preset value. The preset value may be an unused AID in the current technology, that is, any value of 2008 to 2044 or 2046 to 4095. For example, if the value of the AID12 in the first user information field is 2044, it indicates that the first user information field carries a part of common information of the trigger frame.

The first indication information may be referred to as an uplink bandwidth extension field, or may have another name, for example, a bandwidth indication field. This is not limited in embodiments of this application. The uplink bandwidth extension field and the uplink bandwidth field jointly indicate the uplink PPDU total transmission bandwidth or the EHT TB PPDU bandwidth. In other words, in embodiments of this application, the trigger frame in the 802.11ax is extended, and the uplink bandwidth extension field is carried in the trigger frame in the 802.11ax. The field may be in the unused bit in the common information part of the trigger frame, or may be in the special user information field.

The first indication information may be referred to as an uplink PPDU total bandwidth field, or may have another name. This is not limited in embodiments of this application. The uplink PPDU total bandwidth field is directly used to indicate the uplink PPDU total transmission bandwidth.

The first indication information may be referred to as an uplink EHT TB PPDU bandwidth field, or may have another name. This is not limited in embodiments of this application. The uplink EHT TB PPDU bandwidth field is directly used to indicate the EHT TB PPDU bandwidth.

Optionally, the second indication information may be in a reserved bit in the common information field in the trigger frame, or may be in one special user information field (denoted as the first user information field), or may be in a second user information field in the trigger frame. An AID12 field in the second user information field is used to indicate an association identifier of one STA, and a value of the AID12 field is any value in 1 to 2007. The second indication information may be referred to as an EHT/HE indication field, or may have another name, for example, a PPDU type indication field. This is not limited in embodiments of this application.

If the second indication information is used to indicate distribution of the HE TB PPDU and/or the EHT TB PPDU in the uplink PPDU total transmission bandwidth, the second indication information may be in a reserved bit in the common information field in the trigger frame, or in the first user information field. In other words, in this embodiment of this application, an EHT/HE indication field is carried in the special user information field in the 802.11ax trigger frame, to indicate whether the EHT station transmits the HE TB PPDU or the EHT TB PPDU on one or more frequency segments in the uplink bandwidth. The "uplink bandwidth" mentioned in embodiments of this application is the uplink PPDU total transmission bandwidth, and the uplink bandwidth and the uplink PPDU total transmission bandwidth can be used interchangeably.

If the second indication information is used to indicate the frequency segment for the EHT TB PPDU and/or the frequency segment for the HE TB PPDU, the second indication information may be in a reserved bit in the common information field in the trigger frame, or in the first user information field.

If the second indication information is used to indicate whether the EHT station transmits the HE TB PPDU or the EHT TB PPDU, the second indication information may be in the second user information field. In other words, in this embodiment of this application, one bit is added to the user information field in the trigger frame to indicate whether the EHT station transmits the HE TB PPDU or the EHT TB PPDU.

FIG. 7 is a schematic diagram of a frame structure of a first user information field according to an embodiment of this application. FIG. 7 shows that the first user information field carries first indication information and second indication information. As shown in FIG. 7, the first user information field includes an AID12 field, an uplink bandwidth extension field, an EHT/HE indication field, and the like. A value of the AID12 field is any one of 2008 to 2044 or 2046 to 4095, for example, 2044. In FIG. 7, the AID12 field occupies 12 bits, the uplink bandwidth extension field occupies 2 bits or 3 bits, the EHT/HE indication field occupies x bits, and a value of x may be 1, 2, or 4.

It should be understood that an HE station can correctly decode only an uplink bandwidth field, but does not decode the uplink bandwidth extension field.

Specific implementations of the first indication information and the second indication information are described below in detail. For ease of understanding, an implementation of the second indication information is first described, and then an implementation of the first indication information is described.

1. Second Indication Information

Method a: The second indication information is in the first user information field or a reserved bit in the common information field in the trigger frame. The EHT/HE indication field is used to indicate whether an EHT station transmits an HE TB PPDU or an EHT TB PPDU on one or more frequency segments in the uplink PPDU total transmission bandwidth.

Implementation a-1: If it is limited that only a primary 160 MHz channel can be used to perform hybrid transmission on an HE TB PPDU and an EHT TB PPDU, and a bandwidth granularity (frequency segment) for transmission of an uplink sub-PPDU is 80 MHz, the EHT/HE indication field may occupy 2 bits, where the first bit of the 2 bits corresponds to a first 80 MHz channel, and the second bit corresponds to a second 80 MHz channel. A value of the first bit is used to indicate whether the HE TB PPDU or the EHT TB PPDU is transmitted on the first 80 MHz channel in the primary 160 MHz channel. A value of the second bit is used to indicate whether the HE TB PPDU or the EHT TB PPDU is transmitted on the second 80 MHz channel in the primary 160 MHz channel.

For example, when the value of the first bit is 0, it indicates that the HE TB PPDU is transmitted on the first 80 MHz channel; when the value of the first bit is 1, it indicates that the EHT TB PPDU is transmitted on the first 80 MHz.

Alternatively, when the value of the first bit is 0, it indicates that the EHT TB PPDU is transmitted on the first 80 MHz channel; when the value of the first bit is 1, it indicates that the HE TB PPDU is transmitted on the first 80 MHz.

One of the following designs may be used for the first 80 MHz channel and the second 80 MHz channel, and is applied to all embodiments of this application:

Design 1: The first 80 MHz channel is a primary 80 MHz channel, and the second 80 MHz channel is a secondary 80 MHz channel.

Design 2: The first 80 MHz channel is a secondary 80 MHz channel, and the second 80 MHz channel is a primary 80 MHz channel.

Design 3: The first 80 MHz channel is a first 80 MHz channel in ascending order of frequencies in a 160 MHz bandwidth, and the second 80 MHz channel is a second 80 MHz channel in ascending order of frequencies in the 160 MHz bandwidth.

Design 4: The first 80 MHz channel is a first 80 MHz channel in descending order of frequencies in a 160 MHz bandwidth, and the second 80 MHz channel is a second 80 MHz channel in descending order of frequencies in the 160 MHz bandwidth.

FIG. 8 is a schematic diagram of a structure of an uplink multi-user PPDU according to an embodiment of this application. If a value of a bit is 0, it indicates transmission of an HE TB PPDU; if a value of a bit is 1, it indicates transmission of an EHT TB PPDU. If the design 1 is used for the first 80 MHz channel and the second 80 MHz channel, when a value of the EHT/HE indication field is 01, it indicates that an EHT station transmits an HE TB PPDU on the primary 80 MHz channel within the primary 160 MHz channel, and the EHT station transmits an EHT TB PPDU on a secondary 80 MHz channel within the primary 160 MHz channel. It may be understood that FIG. 8 is merely a schematic diagram, and shows a hybrid transmission scenario in which an uplink multi-user PPDU is an HE TB PPDU and an EHT TB PPDU. When a value of the EHT/HE indication field is 00, an EHT station (there may be one or more EHT stations herein) transmits an HE TB PPDU on both the primary 80 MHz channel and the secondary 80 MHz channel within the primary 160 MHz channel. When a value of the EHT/HE indication field is 11, an EHT station (there may be one or more EHT stations herein) transmits an EHT TB PPDU on both the primary 80 MHz channel and the secondary 80 MHz channel within the primary 160 MHz channel. In other words, in those cases, the uplink multi-user PPDU is formed by multiple sub-PPDUs of a same PPDU type.

Implementation a-2: If it is limited that only the primary 160 MHz channel can be used to perform hybrid transmission on an HE TB PPDU and an EHT TB PPDU, and a bandwidth granularity (frequency segment) for transmission of an uplink sub-PPDU is 160 MHz, the EHT/HE indication field may occupy one bit, and the one bit is used to indicate whether an EHT station transmits an HE TB PPDU or an EHT TB PPDU within the primary 160 MHz channel.

Because a maximum transmission bandwidth supported in the EHT standard is 320 MHz, for the foregoing implementation a-1 and implementation a-2, the EHT station may transmit the EHT TB PPDU on a secondary 160 MHz channel by default.

Implementation a-3: If all of a 320 MHz channel can be used to perform hybrid transmission on an HE TB PPDU and an EHT TB PPDU, and a bandwidth granularity (frequency segment) for transmission of an uplink sub-PPDU is 80 MHz, the EHT/HE indication field may occupy 4 bits. The 4 bits one-to-one correspond to four 80 MHz channels in the 320 MHz bandwidth. A value of each bit is used to indicate whether the EHT station transmits an HE TB PPDU or an EHT TB PPDU on an 80 MHz channel corresponding to the bit. It may be understood that if the uplink bandwidth (that is, the uplink PPDU total transmission bandwidth) is less than 320 MHz, a bit corresponding to an 80 MHz channel that is not within the uplink bandwidth (that is, the uplink PPDU total transmission bandwidth) may be omitted or not used.

Implementation a-4: If all of a 320 MHz channel can be used to perform hybrid transmission on an HE TB PPDU and an EHT TB PPDU, and a bandwidth granularity (frequency segment) for transmission of an uplink sub-PPDU is 160 MHz, the EHT/HE indication field may occupy 2 bits. The 2 bits one-to-one correspond to two 160 MHz channels in the 320 MHz bandwidth. A value of each bit is used to indicate whether the EHT station transmits an HE TB PPDU or an EHT TB PPDU on a 160 MHz channel corresponding to the bit. It may be understood that if the uplink bandwidth (that is, the uplink PPDU total transmission bandwidth) is less than 320 MHz, a bit corresponding to a 160 MHz channel that is not within the uplink bandwidth (that is, the uplink PPDU total transmission bandwidth) may be omitted or not used.

Optionally, after the AP sends the trigger frame, the trigger frame may include one or more of a user information field sent to an HE station for sending an HE TB PPDU, and a user information field sent to an EHT station for sending an EHT/HE TB PPDU, for example, include both a user information field for scheduling the HE station and a user information field for scheduling the EHT station. The station responds with an uplink multi-user PPDU, where a parameter of a universal signal field in a physical layer preamble of an uplink EHT TB PPDU (the EHT TB PPDU part shown in FIG. 8), for example, bandwidth signaling of the EHT TB PPDU, included in the uplink multi-user PPDU is obtained from the received trigger frame. In addition, the universal signal field in the uplink EHT TB PPDU includes fields such as a PHY (physical layer) version identifier field, a TXOP (transmit opportunity) field, a BSS (basic service set) color field, a cyclic redundancy code field, and a tail bit field. A PHY version identifier field in the universal signal field in the physical layer preamble of the uplink EHT TB PPDU (or referred to as a sub EHT TB PPDU) sent by the EHT station in response to the trigger frame may be obtained from the EHT/HE indication field in the trigger frame.

Specifically, for any one of the foregoing implementation a-1 to the foregoing implementation a-4, if the EHT/HE indication field in the trigger frame indicates that an HE TB PPDU is transmitted on one of frequency segments, the EHT station transmits an HE TB PPDU in the frequency segment. A physical layer preamble of the HE TB PPDU, such as a high efficiency signaling field A, does not carry a PHY version identifier, which is the same as that in the 802.11ax. If the EHT/HE indication field in the trigger frame indicates that an EHT TB PPDU is transmitted on one of frequency segments, the EHT station transmits an EHT TB PPDU on the frequency segment. The EHT TB PPDU carries a PHY version identifier field (for example, 3 bits), and the PHY version identifier field is set to a value corresponding to the EHT TB PPDU, for example, "0".

For example, in the foregoing implementation a-1, an example is used for description with reference to FIG. 8. If a value of a bit is 0, it indicates transmission of an HE TB PPDU; if a value of a bit is 1, it indicates transmission of an EHT TB PPDU. It is assumed that the design 1 is used for the first 80 MHz channel and the second 80 MHz channel. When a value of the EHT/HE indication field is 01, it indicates that the EHT station transmits an HE TB PPDU on the primary 80 MHz channel within the primary 160 MHz channel, and a physical layer preamble of the HE TB PPDU does not include a PHY version identifier field. The EHT station transmits an EHT TB PPDU on the secondary 80 MHz channel within the primary 160 MHz channel. A universal signal field in a physical layer preamble of the EHT TB PPDU includes a PHY version identifier field, and a value of the PHY version identifier field is set to a value "0" corresponding to the EHT TB PPDU.

For another example, in the foregoing implementation a-2, if a value of a bit is 0, it indicates transmission of an HE TB PPDU; if a value of a bit is 1, it indicates transmission of an EHT TB PPDU. When a value of the EHT/HE indication field is 0, it indicates that the EHT station transmits an HE TB PPDU on the primary 160 MHz channel. A physical layer preamble of the HE TB PPDU does not include a PHY version identifier field. When a value of the EHT/HE indication field is 1, it indicates that the EHT station transmits an EHT TB PPDU on the primary 160 MHz channel. A universal signal field in a physical layer preamble of the EHT TB PPDU includes a PHY version identifier field, and a value of the PHY version identifier field is set to a value "0" corresponding to the EHT TB PPDU.

Method b: The second indication information is in the common information field in the trigger frame. The EHT/HE indication field is used to indicate whether an EHT station transmits an HE TB PPDU or an EHT TB PPDU on an allocated resource block in the uplink PPDU total transmission bandwidth.

Implementation b-1: If it is limited that only a primary 160 MHz channel can be used to perform hybrid transmission on an HE TB PPDU and an EHT TB PPDU, and a bandwidth granularity (frequency segment) for transmission of an uplink sub-PPDU is 80 MHz, the EHT/HE indication field may occupy two PHY version identifier fields, where the first PHY version identifier field corresponds to a first 80 MHz channel, and the second PHY version identifier field corresponds to a second 80 MHz channel. A value of the first PHY version identifier field is used to indicate whether an HE TB PPDU, an EHT TB PPDU, or a PPDU of another next generation type is transmitted on the first 80 MHz channel in the primary 160 MHz channel. A value of the PHY version identifier field is used to indicate whether an HE TB PPDU, an EHT TB PPDU, or a PPDU of another next generation type is transmitted on the second 80 MHz channel on the primary 160 MHz channel. The PPDU of the next generation type is not yet determined currently, so that a corresponding value of the field is a reserved value.

For the first 80 MHz channel and the second 80 MHz channel, refer to the foregoing descriptions. Details are not described herein again.

For example, if the first PHY version identifier field is 3 bits, and the value of the first PHY version identifier field is 0 (000 in binary), it indicates that the HE TB PPDU is transmitted on the first 80 MHz channel; if the value of the first bit is 1 (001 in binary), it indicates that the EHT TB PPDU is transmitted on the first 80 MHz.

Alternatively, if the value of the first PHY version identifier field is 0, it indicates that the EHT TB PPDU is transmitted on the first 80 MHz channel; if the value of the first bit is 7, it indicates that the HE TB PPDU is transmitted on the first 80 MHz.

An example is used for description with reference to FIG. 8. If a value of the PHY version identifier field is 0, it indicates that an HE TB PPDU is to be transmitted; if a value of the PHY version identifier field is 1, it indicates that an EHT TB PPDU is to be transmitted. If the EHT/HE indication field is 000 001, it indicates that the EHT station transmits an HE TB PPDU on the primary 80 MHz channel within the primary 160 MHz channel, and the EHT station transmits an EHT TB PPDU on the secondary 80 MHz subchannel within the primary 160 MHz channel.

Implementation b-2: If it is limited that only the primary 160 MHz channel can be used to perform hybrid transmission on an HE TB PPDU and an EHT TB PPDU, and a bandwidth granularity (frequency segment) for transmission of an uplink sub-PPDU is 160 MHz, the EHT/HE indication field may occupy one PHY version identifier field. The one PHY version identifier field is used to indicate whether an EHT station transmits an HE TB PPDU, an EHT TB PPDU, or a PPDU of a next generation type within the primary 160 MHz channel.

Because a maximum transmission bandwidth supported in the EHT standard is 320 MHz, for the foregoing implementation a-1 and implementation a-2, the EHT station may transmit the EHT TB PPDU on a secondary 160 MHz channel by default.

Implementation b-3: If all of a 320 MHz channel can be used to perform hybrid transmission on an HE TB PPDU and an EHT TB PPDU, and a bandwidth granularity (frequency segment) for transmission of an uplink sub-PPDU is 80 MHz, the EHT/HE indication field may occupy four PHY version identifier fields. The four PHY version identifier fields one-to-one correspond to four 80 MHz channels in the 320 MHz bandwidth. A value of each PHY version identifier field is used to indicate whether the EHT station transmits an HE TB PPDU, EHT TB PPDU, or a PPDU of a next generation type on an 80 MHz channel corresponding to the PHY version identifier field. It may be understood that, if the uplink bandwidth is less than 320 MHz, a PHY version identifier field corresponding to an 80 MHz channel that is not in the uplink bandwidth may be ignored/omitted or not used.

Implementation b-4: If all of a 320 MHz channel can be used to perform hybrid transmission on an HE TB PPDU and an EHT TB PPDU, and a bandwidth granularity (frequency segment) for transmission of an uplink sub-PPDU is 160 MHz, the EHT/HE indication field may occupy two PHY version identifier fields. The two PHY version identifier fields one-to-one correspond to two 160 MHz channels in the 320 MHz bandwidth. A value of each PHY version identifier field is used to indicate whether the EHT station transmits an HE TB PPDU, EHT TB PPDU, or a PPDU of a next generation type on a 160 MHz channel corresponding to the PHY version identifier field. It may be understood that, if the uplink bandwidth is less than 320 MHz, a PHY version identifier field corresponding to a 160 MHz channel that is not in the uplink bandwidth may be ignored/omitted or not used.

Optionally, if the EHT/HE indication field in the trigger frame carries PHY version identifier fields corresponding to frequency segments, the EHT station transmits, on a corresponding frequency segment, a PPDU type indicated by the PHY version identifier field. If an HE TB PPDU is indicated, a physical layer preamble of the HE TB PPDU, for example, a high efficiency signaling field A, is the same as that in the 802.11ax, and does not carry a PHY version identifier. If an EHT TB PPDU is indicated, the EHT station transmits an HE TB PPDU on the frequency segment, and a PHY version identifier field (for example, 3 bits) corresponding to the frequency segment in the trigger frame, for example, a value "0" is directly copied. If a next-generation PPDU of the EHT TB PPDU is indicated, a PHY version identifier field (for example, 3 bits) corresponding to the frequency segment in the trigger frame, for example, a value "1" is directly copied.

Method c: The second indication information is in the second user information field in the trigger frame. In other words, one bit is added to the user information field in the trigger frame to carry the second indication information, to indicate whether the EHT station transmits an HE TB PPDU or an EHT TB PPDU. When the 1 bit or the value of the EHT/HE indication field is 0, the EHT station is indicated to transmit an HE TB PPDU. When the 1 bit or the value of the EHT/HE indication field is 1, the EHT station is indicated to transmit an EHT TB PPDU. Alternatively, when the 1 bit or the value of the EHT/HE indication field is 0, the EHT station is indicated to transmit an EHT TB PPDU. When the 1 bit or the value of the EHT/HE indication field is 1, the EHT station is indicated to transmit an HE TB PPDU.

Method d: The second indication information is in the common information field in the trigger frame. The EHT/HE indication field is used to indicate an uplink PPDU hybrid transmission mode, where an uplink PPDU for hybrid transmission includes an HE TB PPDU and an EHT TB PPDU. The field indirectly notifies the EHT station whether to transmit an HE TB PPDU or an EHT TB PPDU. A specific method is the same as that described above, and is also determined by using 80 MHz in which a resource block allocated to the station is located.

Specifically, the mode of the uplink PPDU for hybrid transmission includes one or more of the following:

| No. | Uplink PPDU hybrid transmission mode |
|---|---|
| 1 | Primary 80 MHz: HE TB PPDU, secondary 80 MHz: Punctured, secondary 160 MHz: EHT TB PPDU |
| 2 | Primary 160 MHz: HE TB PPDU, secondary 160 MHz: EHT TB PPDU |
| 3 | Primary 160 MHz: HE TB PPDU, first 80 MHz in secondary 160 MHz: EHT TB PPDU, second 80 MHz in secondary 160 MHz: Punctured |
| 4 | Primary 160 MHz: HE TB PPDU, first 80 MHz in secondary 160 MHz: Punctured, second 80 MHz in secondary 160 MHz: EHT TB PPDU |
| 5 | Primary 80 MHz: HE TB PPDU, secondary 80 MHz: Punctured, first 80 MHz in secondary 160 MHz: EHT TB PPDU, second 80 MHz in secondary 160 MHz: Punctured |
| 6 | Primary 80 MHz: HE TB PPDU, secondary 80 MHz: Punctured, first 80 MHz in secondary 160 MHz: Punctured, second 80 MHz in secondary 160 MHz: EHT TB PPDU |
| 7 | Primary 80 MHz: HE TB PPDU, secondary 80 MHz: EHT TB PPDU, secondary 160 MHz: EHT TB PPDU |
| 8 | Primary 80 MHz: EHT TB PPDU, secondary 80 MHz: HE TB PPDU, secondary 160 MHz: EHT TB PPDU |
| 7 | Primary 80 MHz: HE TB PPDU, secondary 80 MHz: EHT TB PPDU |
| 9 | Primary 80 MHz: EHT TB PPDU, secondary 80 MHz: HE TB PPDU |

In the foregoing mode, it may be further considered that a frequency band less than 80 MHz, for example, 20 MHz or 40 MHz, is punctured.

The first 80 MHz and the second 80 MHz in the secondary 160 MHz are sorted in descending or ascending order of frequencies in 160 MHz.

That an existing 802.11ax-compliant station or an existing 802.11ac-compliant station in 160 MHz may combine legacy preambles on each 20 MHz of 160 MHz, for example, an L-SIG field, and combine preambles in each 20 MHz of 160 MHz in duplicate transmission, for example, an HE-SIG-A field in the 802.11ax or a VHT-SIG-A field in the 802.11ac is considered, so that it is proposed that hybrid transmission is not allowed for an uplink PPDU transmitted in primary 160 MHz. Therefore, the uplink PPDU hybrid transmission mode includes one or more of the following:

| No. | Uplink PPDU hybrid transmission mode |
|---|---|
| 1 | Primary 80 MHz: HE TB PPDU, secondary 80 MHz: Punctured, secondary 160 MHz: EHT TB PPDU |
| 2 | Primary 160 MHz: HE TB PPDU, secondary 160 MHz: EHT TB PPDU |
| 3 | Primary 160 MHz: HE TB PPDU, first 80 MHz in secondary 160 MHz: EHT TB PPDU, second 80 MHz in secondary 160 MHz: Punctured |
| 4 | Primary 160 MHz: HE TB PPDU, first 80 MHz in secondary 160 MHz: Punctured, second 80 MHz in secondary 160 MHz: EHT TB PPDU |
| 5 | Primary 80 MHz: HE TB PPDU, secondary 80 MHz: Punctured, first 80 MHz in secondary 160 MHz: EHT TB PPDU, second 80 MHz in secondary 160 MHz: Punctured |
| 6 | Primary 80 MHz: HE TB PPDU, secondary 80 MHz: Punctured, first 80 MHz in secondary 160 MHz: Punctured, second 80 MHz in secondary 160 MHz: EHT TB PPDU |
| 7 | Primary 20 MHz: HE PPDU, a frequency band in primary 160 MHz other than 20 MHz is punctured, first 80 MHz in secondary 160 MHz: EHT TB PPDU, second 80 MHz in secondary 160 MHz: Punctured |
| 8 | Primary 20 MHz: HE PPDU, a frequency band in primary 160 MHz other than 20 MHz is punctured, first 80 MHz in secondary 160 MHz: Punctured, second 80 MHz in secondary 160 MHz: EHT TB PPDU |

| No. | Uplink PPDU hybrid transmission mode |
|---|---|
| 9 | Primary 40 MHz: HE PPDU, a frequency band in primary 160 MHz other than 40 MHz is punctured, first 80 MHz in secondary 160 MHz: EHT TB PPDU, second 80 MHz in secondary 160 MHz: Punctured |
| 10 | Primary 40 MHz: HE PPDU, a frequency band in primary 160 MHz other than 40 MHz is punctured, first 80 MHz in secondary 160 MHz: Punctured, second 80 MHz in secondary 160 MHz: EHT TB PPDU |
| 11 | Primary 20 MHz: HE PPDU, a frequency band in primary 160 MHz other than 20 MHz is punctured, secondary 160 MHz: EHT TB PPDU |
| 12 | Primary 40 MHz: HE PPDU, a frequency band in primary 160 MHz other than 40 MHz is punctured, secondary 160 MHz: EHT TB PPDU |

In addition, it is further proposed that one bit be added to indicate an uplink PPDU in hybrid transmission or an uplink PPDU in non-hybrid transmission, which specifically includes the following:

1. 1-bit signaling is added to indicate whether a triggered uplink PPDU is for hybrid transmission or for non-hybrid transmission; or
2. A special uplink PPDU hybrid transmission mode, that is, non-hybrid transmission, is added to the foregoing two uplink PPDU hybrid transmission mode tables.

In addition, after receiving the trigger frame, an HE station can send only an uplink HE TB PPDU.

Optionally, in embodiments of this application, the user information field in the trigger frame in the 802.11ax is referred to as an HE user information field. Features such as a 320 MHz bandwidth (including a combination of a plurality of resource blocks in resource allocation) and 16 spatial flows are introduced to the EHT standard. As a result, a resource block (a resource block is a resource unit (RU) in this application) allocation field and a spatial flow allocation field in the user information field in the trigger frame need to be changed, and a changed user information field is referred to as an EHT user information field. A length of a user information field in a trigger frame designed in the 802.11be is consistent with a length of a user information field in a trigger frame of a same type in the 802.11ax, except for a trigger frame of a MU-BAR (multi-user-block ack request) type.

For various implementations of the EHT/HE indication field in the foregoing method a and method b, the EHT station parses one user information field, to be specific, parses the user information field as the EHT user information field. However, the EHT station can still send an EHT TB PPDU or an HE PPDU on the allocated resource block based on an indication of the EHT/HE indication field. The allocated resource block is indicated in a resource block allocation field in the trigger frame, and may indicate a frequency segment of the resource block on which the EHT station performs transmission.

It may alternatively be understood as: for various implementations of the EHT/HE indication field in the foregoing method a and method b, the EHT station parses a user information field that matches an AID (association identifier) of the EHT station, and determines, by using 80 MHz in which an allocated resource block indicated in a resource block allocation field in the user information field is located, whether to send an EHT TB PPDU or an HE TB PPDU. The allocated resource block is indicated in the resource block allocation field in the trigger frame, and, in combination with the EHT/HE indication field, may jointly indicate a type (EHT TB PPDU or HE TB PPDU) of an uplink PPDU transmitted by the EHT station on the corresponding resource block. Specifically, B0 in the resource block allocation field in the HE user information field indicates the primary 80 MHz channel or the secondary 80 MHz channel. A reserved bit (the $40^{th}$ bit) in the HE user information field is set to 0 by default according to a protocol, and may be understood as the primary 160 MHz channel (because an HE PPDU is limited to transmission on the primary 160 MHz channel). A resource block allocation field in the EHT user information field needs 9 bits, which is 1 bit more than a resource block allocation field in the HE user information field. It is proposed that another bit in the EHT user information field may use a reserved bit (the $40^{th}$ bit) in the HE user information field, and is denoted as a BS bit. When a value of the BS bit is set to 0, it indicates the primary 160 MHz channel; when a value of the BS bit is set to 1, it indicates the secondary 160 MHz channel. A meaning of the bit B0 (the first bit in the field) in the resource allocation field in the original 8 bits in the HE user information field is reserved, that is, to indicate the primary 80 MHz channel or the secondary 80 MHz channel. Some resource blocks or combinations of multiple resource blocks newly supported in the 802.11be may be added to a table of the remaining seven bits. Therefore, the EHT station may determine, based on the bits BS and B0 in the HE user information field or the EHT user information field, (one or more) 80 MHz in which the allocated resource block is located.

For the implementation of the second indication information in the foregoing method c, the EHT station needs to parse two types of user information fields. If the EHT station is indicated to transmit an HE PPDU, the EHT station parses the EHT/HT indication field as the HE user information field, and then sends an HE PPDU. If the EHT station is indicated to transmit an EHT TB PPDU, the EHT station parses the EHT/HT indication field as the EHT user information field, and then sends an EHT TB PPDU.

The foregoing describes specific implementations of the second indication information. The following describes in detail an implementation of the first indication information.

It should be understood that 320 MHz channels obtained through channel division on the 6 GHz frequency band overlap. Therefore, a frequency domain location of 320 MHz needs to be distinguished, that is, 320 MHz-1 and 320 MHz-2 need to be distinguished. FIG. 9 is a schematic diagram of division into 320 MHz channels on the 6 GHz frequency band.

802.11be-compliant devices may be classified into a first version and a second version. To simplify implementation of a station of the first version, it is proposed that an EHT AP of the first version does not support sending of a trigger frame for hybrid scheduling, and an EHT AP of the second version supports sending of a trigger frame for hybrid scheduling.

The present invention provides third indication information. The third indication information is located in the first user information field or a reserved bit in the common information field in the trigger frame, and indicates whether the trigger frame is used to trigger an uplink PPDU in hybrid transmission or an uplink PPDU in non-hybrid transmission.
2. First Indication Information In the following implementations, the schematic diagram of the frame structure shown in FIG. 7 is used as an example for description. In other words, the first indication information is located in the first user information field.

Method 1: The uplink bandwidth extension field jointly indicates an uplink PPDU total transmission bandwidth together with the uplink bandwidth field in the common information field in the trigger frame. The uplink bandwidth extension field occupies 2 bits.
Implementation 1.1:

When a value of the uplink bandwidth field is 0, and the uplink bandwidth extension field is a reserved field, the jointly indicated uplink PPDU total transmission bandwidth is 20 MHz.

The foregoing sentence may also be understood as the following.

When a value of the uplink bandwidth field is 0, and a value of the uplink bandwidth extension field is a first (or fifth) value, the jointly indicated uplink PPDU total transmission bandwidth is 20 MHz.

When a value of the uplink bandwidth field is 0, and a value of the uplink bandwidth extension field is a second (or sixth) value, this value combination is reserved (not used).

When a value of the uplink bandwidth field is 0, and a value of the uplink bandwidth extension field is a third (or seventh) value, this value combination is reserved (not used).

When a value of the uplink bandwidth field is 0, and a value of the uplink bandwidth extension field is a fourth (or an eighth) value, this value combination is reserved (not used).

Alternatively:

When a value of the uplink bandwidth field is 0, and a value of the uplink bandwidth extension field is a first (or fifth) value, the jointly indicated uplink PPDU total transmission bandwidth is 20 MHz.

When a value of the uplink bandwidth field is 0, and a value of the uplink bandwidth extension field is a second (or sixth) value, the jointly indicated uplink PPDU total transmission bandwidth is 80 MHz.

When a value of the uplink bandwidth field is 0, and a value of the uplink bandwidth extension field is a third (or seventh) value, the jointly indicated uplink PPDU total transmission bandwidth is 160 MHz.

When a value of the uplink bandwidth field is 0, and a value of the uplink bandwidth extension field is a fourth (or an eighth) value, this value combination is reserved (not used).

It should be noted that hybrid uplink transmission of a 20 MHz uplink HE PPDU and an 80 MHz uplink PPDU (the 80 MHz includes a 20 MHz uplink HE PPDU) may not be allowed in a protocol, and therefore it may alternatively be:

When a value of the uplink bandwidth field is 0, and a value of the uplink bandwidth extension field is a first (or fifth) value, the jointly indicated uplink PPDU total transmission bandwidth is 20 MHz.

When a value of the uplink bandwidth field is 0, and a value of the uplink bandwidth extension field is a second (or sixth) value, the jointly indicated uplink PPDU total transmission bandwidth is 160 MHz.

When a value of the uplink bandwidth field is 0, and a value of the uplink bandwidth extension field is a third (or seventh) value, this value combination is reserved (not used).

When a value of the uplink bandwidth field is 0, and a value of the uplink bandwidth extension field is a fourth (or an eighth) value, this value combination is reserved (not used).

When a value of the uplink bandwidth field is 1, and the uplink bandwidth extension field is a reserved field, the jointly indicated uplink PPDU total transmission bandwidth is 40 MHz.

The foregoing sentence may also be understood as the following.

When a value of the uplink bandwidth field is 1, and a value of the uplink bandwidth extension field is a first (or fifth) value, the jointly indicated uplink PPDU total transmission bandwidth is 40 MHz.

When a value of the uplink bandwidth field is 1, and a value of the uplink bandwidth extension field is a second (or sixth) value, this value combination is reserved (not used).

When a value of the uplink bandwidth field is 1, and a value of the uplink bandwidth extension field is a third (or seventh) value, this value combination is reserved (not used).

When a value of the uplink bandwidth field is 1, and a value of the uplink bandwidth extension field is a fourth (or an eighth) value, this value combination is reserved (not used).

Alternatively:

When a value of the uplink bandwidth field is 1, and a value of the uplink bandwidth extension field is a first (or fifth) value, the jointly indicated uplink PPDU total transmission bandwidth is 40 MHz.

When a value of the uplink bandwidth field is 1, and a value of the uplink bandwidth extension field is a second (or sixth) value, the jointly indicated uplink PPDU total transmission bandwidth is 80 MHz.

When a value of the uplink bandwidth field is 1, and a value of the uplink bandwidth extension field is a third (or seventh) value, the jointly indicated uplink PPDU total transmission bandwidth is 160 MHz.

When a value of the uplink bandwidth field is 1, and a value of the uplink bandwidth extension field is a fourth (or an eighth) value, this value combination is reserved (not used).

It should be noted that hybrid uplink transmission of a 40 MHz uplink HE PPDU and an 80 MHz uplink PPDU (the 80 MHz includes a 40 MHz uplink HE PPDU) may not be allowed in a protocol, and therefore it may alternatively be:

When a value of the uplink bandwidth field is 1, and a value of the uplink bandwidth extension field is a first (or fifth) value, the jointly indicated uplink PPDU total transmission bandwidth is 40 MHz.

When a value of the uplink bandwidth field is 1, and a value of the uplink bandwidth extension field is a second (or sixth) value, the jointly indicated uplink PPDU total transmission bandwidth is 160 MHz.

When a value of the uplink bandwidth field is 1, and a value of the uplink bandwidth extension field is a third (or seventh) value, this value combination is reserved (not used).

When a value of the uplink bandwidth field is 1, and a value of the uplink bandwidth extension field is a fourth (or an eighth) value, this value combination is reserved (not used).

When a value of the uplink bandwidth field is 2, and a value of the uplink bandwidth extension field is a first value, the jointly indicated uplink PPDU total transmission bandwidth is 80 MHz.

When a value of the uplink bandwidth field is 2, and a value of the uplink bandwidth extension field is a second value, the jointly indicated uplink PPDU total transmission bandwidth is 160 MHz.

When a value of the uplink bandwidth field is 2, and a value of the uplink bandwidth extension field is a third value, the jointly indicated uplink PPDU total transmission bandwidth is 320 MHz.

When a value of the uplink bandwidth field is 2, and a value of the uplink bandwidth extension field is a fourth value, this combination is reserved.

When a value of the uplink bandwidth field is 3, and a value of the uplink bandwidth extension field is a fifth value, the jointly indicated uplink PPDU total transmission bandwidth is 160 MHz.

When a value of the uplink bandwidth field is 3, and a value of the uplink bandwidth extension field is a sixth value, the jointly indicated uplink PPDU total transmission bandwidth is 320 MHz.

When a value of the uplink bandwidth field is 3, and a value of the uplink bandwidth extension field is a seventh value, this combination is reserved.

When a value of the uplink bandwidth field is 3, and a value of the uplink bandwidth extension field is an eighth value, this combination is reserved.

The first value to the fourth value each may be any one of $\{0, 1, 2, 3\}$, and the first value, the second value, the third value, and the fourth value are different from each other. For example, the first value is 0, the second value is 1, the third value is 2, and the fourth value is 3. Similarly, the fifth value to the eighth value each may be any one of $\{0, 1, 2, 3\}$, and the fifth value, the sixth value, the seventh value, and the eighth value are different from each other. For example, the fifth value is 1, the sixth value is 2, the seventh value is 3, and the eighth value is 0.

Implementation 1.2:

When a value of the uplink bandwidth field is 0, and the uplink bandwidth extension field is a reserved field, the jointly indicated uplink PPDU total transmission bandwidth is 20 MHz.

The foregoing sentence may also be understood as the following.

When a value of the uplink bandwidth field is 0, and a value of the uplink bandwidth extension field is a first (or fifth) value, the jointly indicated uplink PPDU total transmission bandwidth is 20 MHz.

When a value of the uplink bandwidth field is 0, and a value of the uplink bandwidth extension field is a second (or sixth) value, this value combination is reserved (not used).

When a value of the uplink bandwidth field is 0, and a value of the uplink bandwidth extension field is a third (or seventh) value, this value combination is reserved (not used).

When a value of the uplink bandwidth field is 0, and a value of the uplink bandwidth extension field is a fourth (or an eighth) value, this value combination is reserved (not used).

Alternatively:

When a value of the uplink bandwidth field is 0, and a value of the uplink bandwidth extension field is a first (or fifth) value, the jointly indicated uplink PPDU total transmission bandwidth is 20 MHz.

When a value of the uplink bandwidth field is 0, and a value of the uplink bandwidth extension field is a second (or sixth) value, the jointly indicated uplink PPDU total transmission bandwidth is 80 MHz.

When a value of the uplink bandwidth field is 0, and a value of the uplink bandwidth extension field is a third (or seventh) value, the jointly indicated uplink PPDU total transmission bandwidth is 160 MHz.

When a value of the uplink bandwidth field is 0, and a value of the uplink bandwidth extension field is a fourth (or an eighth) value, this value combination is reserved (not used).

It should be noted that hybrid uplink transmission of a 20 MHz uplink HE PPDU and an 80 MHz uplink PPDU (the 80 MHz includes a 20 MHz uplink HE PPDU) may not be allowed in a protocol, and therefore it may alternatively be:

When a value of the uplink bandwidth field is 0, and a value of the uplink bandwidth extension field is a first (or fifth) value, the jointly indicated EHT TB PPDU total transmission bandwidth is 20 MHz.

When a value of the uplink bandwidth field is 0, and a value of the uplink bandwidth extension field is a second (or sixth) value, the jointly indicated uplink PPDU total transmission bandwidth is 160 MHz.

When a value of the uplink bandwidth field is 0, and a value of the uplink bandwidth extension field is a third (or seventh) value, this value combination is reserved (not used).

When a value of the uplink bandwidth field is 0, and a value of the uplink bandwidth extension field is a fourth (or an eighth) value, this value combination is reserved (not used).

Alternatively:

When a value of the uplink bandwidth field is 1, and a value of the uplink bandwidth extension field is a first (or fifth) value, the jointly indicated uplink PPDU total transmission bandwidth is 40 MHz.

When a value of the uplink bandwidth field is 1, and a value of the uplink bandwidth extension field is a second (or sixth) value, the jointly indicated uplink PPDU total transmission bandwidth is 80 MHz.

When a value of the uplink bandwidth field is 1, and a value of the uplink bandwidth extension field is a third (or seventh) value, the jointly indicated uplink PPDU total transmission bandwidth is 160 MHz.

When a value of the uplink bandwidth field is 1, and a value of the uplink bandwidth extension field is a fourth (or an eighth) value, this value combination is reserved (not used).

It should be noted that hybrid uplink transmission of a 40 MHz uplink HE PPDU and an 80 MHz uplink PPDU (the 80 MHz includes a 40 MHz uplink HE PPDU) may not be allowed in a protocol, and therefore it may alternatively be:

When a value of the uplink bandwidth field is 1, and a value of the uplink bandwidth extension field is a first (or fifth) value, the jointly indicated uplink PPDU total transmission bandwidth is 40 MHz.

When a value of the uplink bandwidth field is 1, and a value of the uplink bandwidth extension field is a second (or sixth) value, the jointly indicated uplink PPDU total transmission bandwidth is 160 MHz.

When a value of the uplink bandwidth field is 1, and a value of the uplink bandwidth extension field is a third (or seventh) value, this value combination is reserved (not used).

When a value of the uplink bandwidth field is 1, and a value of the uplink bandwidth extension field is a fourth (or an eighth) value, this value combination is reserved (not used).

When a value of the uplink bandwidth field is 1, and the uplink bandwidth extension field is a reserved field, the jointly indicated uplink PPDU total transmission bandwidth is 40 MHz.

The foregoing sentence may also be understood as the following.

When a value of the uplink bandwidth field is 1, and a value of the uplink bandwidth extension field is a first (or fifth) value, the jointly indicated uplink PPDU total transmission bandwidth is 40 MHz.

When a value of the uplink bandwidth field is 1, and a value of the uplink bandwidth extension field is a second (or sixth) value, this value combination is reserved (not used).

When a value of the uplink bandwidth field is 1, and a value of the uplink bandwidth extension field is a third (or seventh) value, this value combination is reserved (not used).

When a value of the uplink bandwidth field is 1, and a value of the uplink bandwidth extension field is a fourth (or an eighth) value, this value combination is reserved (not used).

When a value of the uplink bandwidth field is 2, and a value of the uplink bandwidth extension field is a first value, the jointly indicated uplink PPDU total transmission bandwidth is 80 MHz.

When a value of the uplink bandwidth field is 2, and a value of the uplink bandwidth extension field is a second value, the jointly indicated uplink PPDU total transmission bandwidth is 160 MHz.

When a value of the uplink bandwidth field is 2, and a value of the uplink bandwidth extension field is a third value, the jointly indicated uplink PPDU total transmission bandwidth is 320 MHz-1.

When a value of the uplink bandwidth field is 2, and a value of the uplink bandwidth extension field is a fourth value, the jointly indicated uplink PPDU total transmission bandwidth is 320 MHz-2.

When a value of the uplink bandwidth field is 3, and a value of the uplink bandwidth extension field is a fifth value, the jointly indicated uplink PPDU total transmission bandwidth is 160 MHz.

When a value of the uplink bandwidth field is 3, and a value of the uplink bandwidth extension field is a sixth value, the jointly indicated uplink PPDU total transmission bandwidth is 320 MHz-1.

When a value of the uplink bandwidth field is 3, and a value of the uplink bandwidth extension field is a seventh value, the Jointly indicated uplink PPDU total transmission bandwidth is 320 MHz-2.

When a value of the uplink bandwidth field is 3, and a value of the uplink bandwidth extension field is an eighth value, this combination is reserved.

The first value to the fourth value each may be any one of {0, 1, 2, 3}, and the first value, the second value, the third value, and the fourth value are different from each other. For example, the first value is 0, the second value is 1, the third value is 2, and the fourth value is 3. Similarly, the fifth value to the eighth value each may be any one of {0, 1, 2, 3}, and the fifth value, the sixth value, the seventh value, and the eighth value are different from each other. For example, the fifth value is 1, the sixth value is 2, the seventh value is 3, and the eighth value is 0.

It can be learned that a difference between the foregoing implementation 1.1 and the foregoing implementation 1.2 lies in that in the implementation 1.2, 320 MHz is classified into 320 MHz-1 and 320 MHz-2 according to different frequency locations. The implementation 1.1 and the implementation 1.2 may be summarized as Table 4 below.

TABLE 4

| Uplink bandwidth field | Uplink bandwidth extension field | Jointly indicated uplink PPDU total transmission bandwidth |
|---|---|---|
| 0 (20 MHz) | First (or fifth) value | 20 MHz (implementation 1.1 or 1.2) |
| | Second (or sixth) | 20 MHz (implementation 1.1 or 1.2) |

TABLE 4-continued

| Uplink bandwidth field | Uplink bandwidth extension field | Jointly indicated uplink PPDU total transmission bandwidth |
|---|---|---|
|  | value | |
|  | Third (or seventh) value | 20 MHz (implementation 1.1 or 1.2) |
|  | Fourth (or eighth) value | 20 MHz (implementation 1.1 or 1.2) |
| 1 (40 MHz) | First (or fifth) value | 40 MHz (implementation 1.1 or 1.2) |
|  | Second (or sixth) value | 40 MHz (implementation 1.1 or 1.2) |
|  | Third (or seventh) value | 40 MHz (implementation 1.1 or 1.2) |
|  | Fourth (or eighth) value | 40 MHz (implementation 1.1 or 1.2) |
| 2 (80 MHz) | First value | 80 MHz (implementation 1.1 or 1.2) |
|  | Second value | 160 MHz (implementation 1.1 or 1.2) |
|  | Third value | 320 MHz (implementation 1.1), 320 MHz-1 (implementation 1.2) |
|  | Fourth value | Reserved (implementation 1.1), 320 MHz-2 (implementation 1.2) |
| 3 (160 MHz) | Fifth value | 160 MHz (implementation 1.1 or 1.2) |
|  | Sixth value | 320 MHz (implementation 1.1), 320 MHz-1 (implementation 1.2) |
|  | Seventh value | Reserved (implementation 1.1), 320 MHz-2 (implementation 1.2) |
|  | Eighth value | Reserved (implementation 1.1 or 1.2) |

TABLE 4a

| Uplink bandwidth field | Uplink bandwidth extension field | Jointly indicated uplink PPDU total transmission bandwidth |
|---|---|---|
| 0 (20 MHz) | First (or fifth) value | 20 MHz (implementation 1.1 or 1.2) |
|  | Second (or sixth) value | Reserved (implementation 1.1 or 1.2) |
|  | Third (or seventh) value | Reserved (implementation 1.1 or 1.2) |
|  | Fourth (or eighth) value | Reserved (implementation 1.1 or 1.2) |
| 1 (40 MHz) | First (or fifth) value | 40 MHz (implementation 1.1 or 1.2) |
|  | Second (or sixth) value | Reserved (implementation 1.1 or 1.2) |
|  | Third (or seventh) value | Reserved (implementation 1.1 or 1.2) |
|  | Fourth (or eighth) value | Reserved (implementation 1.1 or 1.2) |
| 2 (80 MHz) | First value | 80 MHz (implementation 1.1 or 1.2) |
|  | Second value | 160 MHz (implementation 1.1 or 1.2) |
|  | Third value | 320 MHz (implementation 1.1), 320 MHz-1 (implementation 1.2) |
|  | Fourth value | Reserved (implementation 1.1), 320 MHz-2 (implementation 1.2) |
| 3 (160 MHz) | Fifth value | 160 MHz (implementation 1.1 or 1.2) |
|  | Sixth value | 320 MHz (implementation 1.1), 320 MHz-1 (implementation 1.2) |
|  | Seventh value | Reserved (implementation 1.1), 320 MHz-2 (implementation 1.2) |
|  | Eighth value | Reserved (implementation 1.1 or 1.2) |

TABLE 4b

| Uplink bandwidth field | Uplink bandwidth extension field | Jointly indicated uplink PPDU total transmission bandwidth |
|---|---|---|
| 0 (20 MHz) | First (or fifth) value | 20 MHz (implementation 1.1 or 1.2) |
|  | Second (or sixth) value | 80 MHz or reserved (implementation 1.1 or 1.2) |
|  | Third (or seventh) value | 160 MHz or reserved (implementation 1.1 or 1.2) |
|  | Fourth (or eighth) value | Reserved (implementation 1.1 or 1.2) |

TABLE 4b-continued

| Uplink bandwidth field | Uplink bandwidth extension field | Jointly indicated uplink PPDU total transmission bandwidth |
|---|---|---|
| 1 (40 MHz) | First (or fifth) value | 40 MHz (implementation 1.1 or 1.2) |
|  | Second (or sixth) value | 80 MHz or reserved (implementation 1.1 or 1.2) |
|  | Third (or seventh) value | 160 MHz or reserved (implementation 1.1 or 1.2) |
|  | Fourth (or eighth) value | Reserved (implementation 1.1 or 1.2) |
| 2 (80 MHz) | First value | 80 MHz (implementation 1.1 or 1.2) |
|  | Second value | 160 MHz (implementation 1.1 or 1.2) |
|  | Third value | 320 MHz (implementation 1.1), 320 MHz-1 (implementation 1.2) |
|  | Fourth value | Reserved (implementation 1.1), 320 MHz-2 (implementation 1.2) |
| 3 (160 MHz) | Fifth value | 160 MHz (implementation 1.1 or 1.2) |
|  | Sixth value | 320 MHz (implementation 1.1), 320 MHz-1 (implementation 1.2) |
|  | Seventh value | Reserved (implementation 1.1), 320 MHz-2 (implementation 1.2) |
|  | Eighth value | Reserved (implementation 1.1 or 1.2) |

It should be understood that although both the foregoing implementation 1.1 and the foregoing implementation 1.2 relate to the first value to the fourth value and the fifth value to the eighth value, values of the first value to the fourth value may be different or may be the same in different implementations. Similarly, values of the fifth value to the eighth value may be different or may be the same in different implementations. For example, in the implementation 1.1 and the implementation 1.2, values of the first value to the fourth value are 0, 1, 2, and 3, and values of the fifth value to the eighth value are 1, 2, 3, and 0. For another example, values of the first value to the fourth value in the implementation 1.1 are 0, 1, 2, and 3, and values of the first value to the fourth value in the implementation 1.2 are 3, 2, 1, and 0. Values of the fifth value to the eighth value in the implementation 1.1 are 1, 2, 3, and 0, and values of the fifth value to the eighth value in the implementation 1.1 are 0, 1, 2, and 3. This is the same in the following, and details are not described again.

In the implementation 1.1, when the uplink PPDU total transmission bandwidth is 320 MHz, the uplink bandwidth field and the uplink bandwidth extension field may be set to 2 and the third value, respectively, or the uplink bandwidth field and the uplink bandwidth extension field may be set to 3 and the sixth value, respectively. To facilitate implementation of a receive station, or provide more reserved value combinations or unused value combinations, two methods are provided.

1. When the uplink bandwidth field and the uplink bandwidth extension field may be set to 3 and the sixth value, respectively, the uplink PPDU total transmission bandwidth is 320 MHz. When the uplink bandwidth field and the uplink bandwidth extension field may be set to 2 and the third value, this combination is reserved.

Alternatively, when the uplink bandwidth field and the uplink bandwidth extension field may be set to 2 and the third value, respectively, the uplink PPDU total transmission bandwidth is 320 MHz. When the uplink bandwidth field and the uplink bandwidth extension field may be set to 3 and the sixth value, this combination is reserved.

2. When the uplink bandwidth extension field is set to the third value, the uplink bandwidth field may be set to any value, that is, any one of 0 to 3, the uplink PPDU total transmission bandwidth is 320 MHz.

In the implementation 1.2, when the uplink PPDU total transmission bandwidth is 320 MHz-1, the uplink bandwidth field and the uplink bandwidth extension field may be set to 2 and the third value, respectively, or the uplink bandwidth field and the uplink bandwidth extension field may be set to 3 and the sixth value, respectively. To facilitate implementation of the receive station, two methods are provided.

1. When the uplink bandwidth field and the uplink bandwidth extension field may be set to 3 and the sixth value, respectively, an uplink PPDU total transmission bandwidth is 320 MHz-1. Alternatively, when the uplink bandwidth field and the uplink bandwidth extension field may be set to 2 and the third value, respectively, an uplink PPDU total transmission bandwidth is 320 MHz-1; when the uplink bandwidth field and the uplink bandwidth extension field may be set to 3 and the sixth value, respectively, this combination is reserved.

It may also be expressed as follows:

When the uplink bandwidth field and the uplink bandwidth extension field may be set to 3 and the sixth value, respectively, an uplink PPDU total transmission bandwidth is 320 MHz-1. When the uplink bandwidth field and the uplink bandwidth extension field may be set to 2 and the third value, respectively, this combination is reserved.

Alternatively, when the uplink bandwidth field and the uplink bandwidth extension field may be set to 2 and the third value, respectively, the uplink PPDU total transmission bandwidth is 320 MHz-1. When the uplink bandwidth field and the uplink bandwidth extension field may be set to 3 and the sixth value, this combination is reserved.

2. When the uplink bandwidth extension field is set to the sixth value, the uplink bandwidth field may be set to any value, that is, any one of 0 to 3, the uplink PPDU total transmission bandwidth is 320 MHz-1.

When the EHT TB PPDU bandwidth is 320 MHz-2, the uplink bandwidth field and the uplink bandwidth extension field may be set to 2 and the fourth value, respectively, or the uplink bandwidth field and the uplink bandwidth extension field may be set to 3 and the seventh value, respectively. To facilitate implementation of the receive station, two methods are provided.

1. When the uplink bandwidth field and the uplink bandwidth extension field may be set to 3 and the seventh value, respectively, the uplink PPDU total transmission bandwidth is 320 MHz-2. When the uplink bandwidth field and the uplink bandwidth extension field may be set to 2 and the fourth value, this combination is reserved.

Alternatively, when the uplink bandwidth field and the uplink bandwidth extension field may be set to 2 and the fourth value, respectively, the uplink PPDU total transmission bandwidth is 320 MHz-2. When the uplink bandwidth field and the uplink bandwidth extension field may be set to 3 and the seventh value, this combination is reserved.

2. When the uplink bandwidth extension field is set to the seventh value, the uplink bandwidth field may be set to any value, that is, any one of 0 to 3, the uplink PPDU total transmission bandwidth is 320 MHz-2.

Implementation 1.3:

When a value of the uplink bandwidth extension field is a first value, an uplink PPDU total transmission bandwidth jointly indicated by the uplink bandwidth field and the uplink bandwidth extension field is the same as a bandwidth indicated by the uplink bandwidth field.

When a value of the uplink bandwidth extension field is a second value, an uplink PPDU total transmission bandwidth jointly indicated by the uplink bandwidth field and the uplink bandwidth extension field is 160 MHz.

When a value of the uplink bandwidth extension field is a third value, an uplink PPDU total transmission bandwidth jointly indicated by the uplink bandwidth field and the uplink bandwidth extension field is 320 MHz.

When a value of the uplink bandwidth extension field is a fourth value, this combination is reserved.

The first value to the fourth value each may be any one of {0, 1, 2, 3}, and the first value, the second value, the third value, and the fourth value are different from each other.

Implementation 1.4:

When a value of the uplink bandwidth extension field is a first value, an uplink PPDU total transmission bandwidth jointly indicated by the uplink bandwidth field and the uplink bandwidth extension field is the same as a bandwidth indicated by the uplink bandwidth field.

When a value of the uplink bandwidth extension field is a second value, an uplink PPDU total transmission bandwidth jointly indicated by the uplink bandwidth field and the uplink bandwidth extension field is 160 MHz.

When a value of the uplink bandwidth extension field is a third value, an uplink PPDU total transmission bandwidth jointly indicated by the uplink bandwidth field and the uplink bandwidth extension field is 320 MHz-1.

When a value of the uplink bandwidth extension field is a fourth value, an uplink PPDU total transmission bandwidth jointly indicated by the uplink bandwidth field and the uplink bandwidth extension field is 320 MHz-2.

The first value to the fourth value each may be any one of {0, 1, 2, 3}, and the first value, the second value, the third value, and the fourth value are different from each other.

It can be learned that the foregoing implementation 1.3 and the foregoing implementation 1.4 may be summarized as the following Table 5.

TABLE 5

| Uplink bandwidth field | Uplink bandwidth extension field | Jointly indicated uplink PPDU total transmission bandwidth |
|---|---|---|
| 0 (20 MHz) | First value | 20 MHz (implementation 1.3 or 1.4) |
| | Second value | 160 MHz, meaningless in this case (implementation 1.3 or 1.4) |
| | Third value | 320 MHz, meaningless in this case (implementation 1.3); 320 MHz-1, meaningless in this case (implementation 1.4) |
| | Fourth value | Reserved (implementation 1.3); 320 MHz-2, meaningless in this case (implementation 1.4) |
| 1 (40 MHz) | First value | 40 MHz (implementation 1.3 or 1.4) |
| | Second value | 160 MHz, meaningless in this case (implementation 1.3 or 1.4) |
| | Third value | 320 MHz, meaningless in this case (implementation 1.3); 320 MHz-1, meaningless in this case (implementation 1.4) |
| | Fourth value | Reserved (implementation 1.3); 320 MHz-2, meaningless in this case (implementation 1.4) |
| 2 (80 MHz) | First value | 80 MHz (implementation 1.3 or 1.4) |
| | Second value | 160 MHz (implementation 1.3 or 1.4) |
| | Third value | 320 MHz (implementation 1.3), 320 MHz-1 (implementation 1.4) |
| | Fourth value | Reserved (implementation 1.3), 320 MHz-2 (implementation 1.4) |
| 3 (160 MHz) | First value | 160 MHz (implementation 1.3 or 1.4) |
| | Second value | 160 MHz (implementation 1.3 or 1.4) |
| | Third value | 320 MHz (implementation 1.3), 320 MHz-1 (implementation 1.4) |
| | Fourth value | Reserved (implementation 1.3), 320 MHz-2 (implementation 1.4) |

In various implementations of the foregoing method 1, if the station transmits an uplink HE TB PPDU, a bandwidth of the uplink HE TB PPDU is a value indicated by the uplink bandwidth field. If the station transmits an uplink EHT TB PPDU, a bandwidth of the uplink EHT TB PPDU is determined based on one or more of the uplink bandwidth field, the uplink bandwidth extension field, and the EHT/HE indication field. For example, the following several cases are included: determining based on the uplink bandwidth field and the uplink bandwidth extension field, or determining based on the uplink bandwidth extension field, or determining based on the EHT/HE indication field, or determining based on the uplink bandwidth field, the uplink bandwidth extension field, and the EHT/HE indication field. For example, when the implementation a-3 of the method a is used for the second indication information, the bandwidth of the uplink EHT TB PPDU may be determined based on only the EHT/HE indication field. It should be understood that the uplink PPDU total transmission bandwidth is a sum of the bandwidth of the uplink HE TB PPDU and the bandwidth of the uplink EHT TB PPDU.

Optionally, for various implementations of the method 1, when the second indication information is implemented by using the method c, after receiving the trigger frame, the EHT station may set a bandwidth field in a universal signal field in a preamble of an uplink EHT TB PPDU to the uplink PPDU total transmission bandwidth. This is because in the foregoing method c, the EHT/HE indication field is in the user information field in the trigger frame, and a specific bandwidth of the EHT TB PPDU cannot be determined based on the field. However, there is an RU allocation field in the user information field in the trigger frame. When sending an uplink EHT TB PPDU, the EHT station sends the uplink EHT TB PPDU on a corresponding resource based on an indication of the RU allocation field.

Optionally, after the station receives the trigger frame, when the station sends an EHT TB PPDU, a bandwidth in a universal signal field in an uplink physical layer preamble needs to be determined based on one or more of the uplink bandwidth field, the uplink bandwidth extension field, and the EHT/HE indication field. For example, the following several cases are included: determining based on the uplink bandwidth field and the uplink bandwidth extension field, or determining based on the uplink bandwidth extension field, or determining based on the EHT/HE indication field, or determining based on the uplink bandwidth field, the uplink bandwidth extension field, and the EHT/HE indication field. Optionally, a bandwidth value needs to be set further based on fields such as a channel width and a channel center frequency band (CCFS) in an EHT operation element. The channel width field is used to indicate a bandwidth of a basic service set (BSS) (that is, a maximum bandwidth of a PPDU that can be transmitted in the BSS), and one or more CCFS fields are used to indicate a center frequency of the bandwidth of the BBS, so that an associated station learns of whether a 320 MHz PPDU transmitted in the BSS is a 320 MHz-1 PPDU or a 320 MHz-2 PPDU. A station that is not associated with the BSS or a station in another basic service set may learn of, by receiving a management frame, for example, a beacon frame, sent by an AP in the basic service set, whether the 320 MHz PPDU transmitted in the BSS is a 320 MHz-1 PPDU or a 320 MHz-2 PPDU. Alternatively, whether the 320 MHz PPDU transmitted in the BSS is a 320 MHz-1 PPDU or a 320 MHz-2 PPDU is explicitly indicated in the trigger frame.

Optionally, in the foregoing implementation 1.1 and implementation 1.3, after the EHT station receives the trigger frame, if a bandwidth of a transmitted uplink EHT TB PPDU is 320 MHz, whether the bandwidth of 320 MHz is 320 MHz-1 or 320 MHz-2 may be determined based on the channel width field, the CCFS field, and the like in the EHT operation element, and 320 MHz-1 or 320 MHz-2 is filled in a universal signal field in a preamble of the uplink EHT TB PPDU.

Optionally, in the foregoing implementation 1.2 and implementation 1.4, after receiving the trigger frame, if a bandwidth of a transmitted uplink EHT TB PPDU is 320 MHz, the EHT station may fill 320 MHz-1 or 320 MHz-2 in a universal signal field of a preamble of the uplink EHT TB PPDU based on 320 MHz-1 or 320 MHz-2 indicated in the trigger frame (specifically, a joint indication of the uplink bandwidth field and the uplink bandwidth extension field in the trigger frame).

The foregoing describes various implementations of the method 1. For ease of understanding, the following describes the implementations of the method 1 with reference to specific examples. Specifically, the following examples are described by using the implementation 1.1 of the method 1 as an example.

In the following examples, it is assumed that the implementation a-3 of the method a is used for the second indication information. To be specific, all of the 320 MHz channel can be used for hybrid transmission of an HE TB PPDU and an EHT TB PPDU, and the EHT/HE indication field occupies 4 bits. In this case, an unused bit in the 4-bit EHT/HE indication field depends on the uplink PPDU total transmission bandwidth. For example, if the uplink PPDU total transmission bandwidth is 160 MHz, 2 bits of the 4-bit EHT/HE indication field are not used. For another example, if the uplink PPDU total transmission bandwidth is 320 MHz, 0 bit of the 4-bit EHT/HE indication field is not used. It should be understood that the following examples are also applicable to other implementations of the second indication information.

It should be further understood that various implementations of the second indication information are also applicable to various implementations of the first indication information.

For ease of description, in the following examples, it is assumed that the primary 80 MHz channel is the first 80 MHz channel, the secondary 80 MHz channel is the second 80 MHz channel, and the secondary 160 MHz channel is the third 80 MHz channel and the fourth 80 MHz channel. The first to the fourth 80 MHz channels are obtained by sorting frequencies in descending order or in ascending order. It should be understood that the primary 80 MHz channel may be any 80 MHz channel in the frequency band, the secondary 80 MHz channel is located next to the primary 80 MHz channel, and the secondary 160 MHz channel is contiguous.

Example 1.1

The AP sends the trigger frame. The uplink bandwidth field (whose value is 3) in the trigger frame indicates 160 MHz, and the uplink PPDU total transmission bandwidth jointly indicated by the uplink bandwidth extension field (whose value is the sixth value) and the uplink bandwidth field is 320 MHz. A value of the EHT/HE indication field in the trigger frame is 0011 (where 0 indicates transmission of an HE TB PPDU, and 1 indicates transmission of an EHT TB PPDU).

After a plurality of stations receive the trigger frame, an HE station or an EHT station transmits an HE TB PPDU on the first and second 80 MHz channels based on an indication of the EHT/HE indication field, where a bandwidth field in a high efficiency signaling field A in a preamble of the HE TB PPDU is set to 160 MHz indicated by the uplink bandwidth field. An EHT station transmits an EHT TB PPDU on the third and fourth 80 MHz channels based on the uplink bandwidth field, the uplink bandwidth extension field, and the EHT/HE indication field. A bandwidth field in a universal signal field in a preamble of the EHT TB PPDU is set to 160 MHz (this value may be determined based on the uplink bandwidth field and the uplink bandwidth extension field).

Figure 10A:
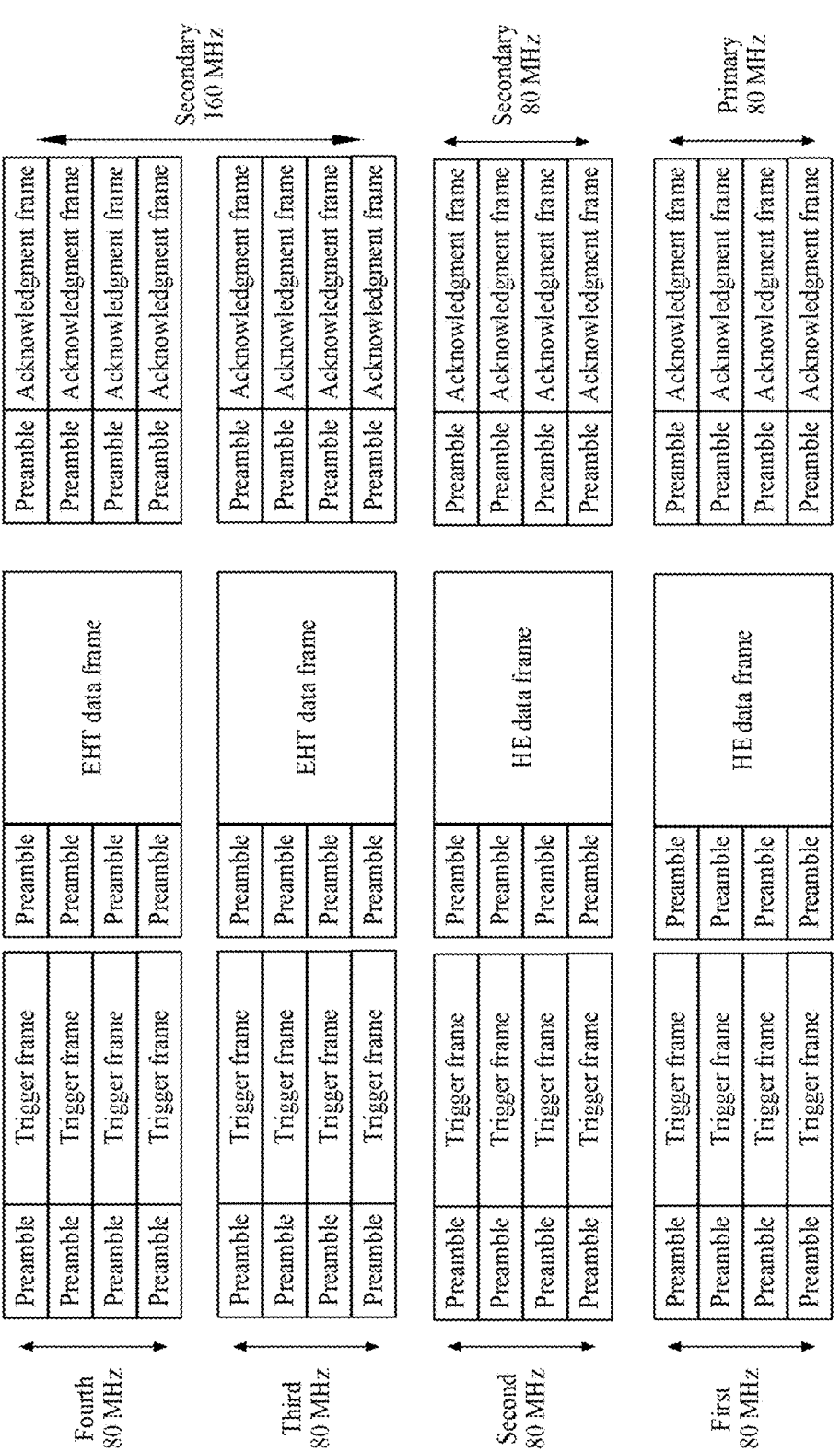
FIG. 10a is a schematic diagram of a time sequence in which an AP triggers a station to perform uplink data transmission in Example 1.1.

The AP receives an uplink multi-user PPDU, where the uplink multi-user PPDU includes uplink sub-PPDUs sent by one or more stations. Then, the AP returns an acknowledgment frame. The acknowledgment frame sent to the one or more stations may be sent in a form of downlink OFDMA, or may be sent in a form of non-HT duplicate transmission. FIG. 10a is a schematic diagram of a time sequence in which the AP triggers a station to perform uplink data transmission in Example 1.1. In FIG. 10a, the uplink multi-user PPDU includes the HE TB PPDU with a bandwidth of 160 MHz and the EHT TB PPDU with a bandwidth of 160 MHz.

Example 1.2

The AP sends the trigger frame. The uplink bandwidth field (whose value is 2) in the trigger frame indicates 80 MHz, and the uplink PPDU total transmission bandwidth jointly indicated by the uplink bandwidth extension field (whose value is the second value) and the uplink bandwidth field is 160 MHz. A value of the EHT/HE indication field in the trigger frame is 0100 (in this case, the last two bits of the EHT/HE indication field are reserved or not used, where 0 indicates transmission of the HE TB PPDU, and 1 indicates transmission of the EHT TB PPDU).

After a plurality of stations receive the trigger frame, an HE station or an EHT station transmits an HE TB PPDU on the first 80 MHz channel based on an indication of the EHT/HE indication field, where a bandwidth field in a high efficiency signaling field A in a preamble of the HE TB PPDU is set to 80 MHz indicated by the uplink bandwidth field. An EHT station transmits an EHT TB PPDU on the second 80 MHz channels based on the uplink bandwidth field, the uplink bandwidth extension field, and the EHT/HE indication field. A bandwidth field in a universal signal field in a preamble of the EHT TB PPDU is set to 80 MHz (this value may be determined based on the uplink bandwidth field and the uplink bandwidth extension field).

Figure 10B:
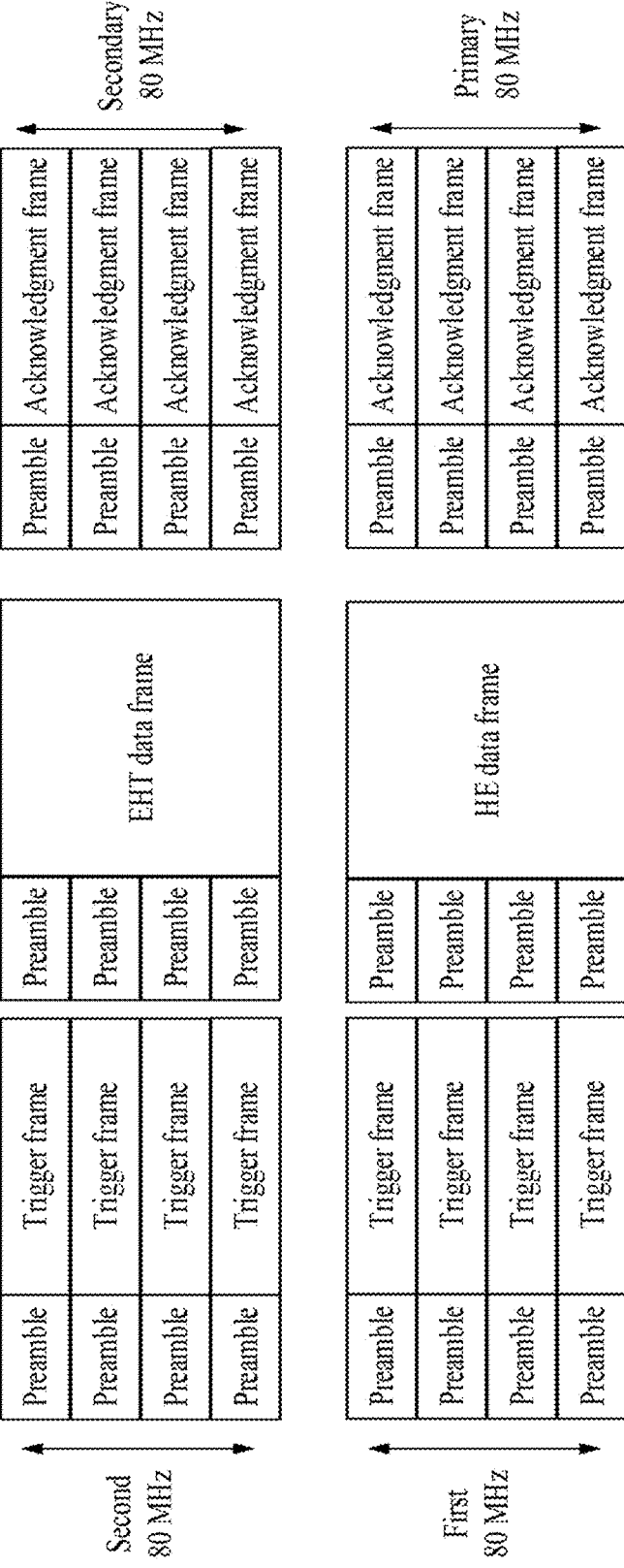
FIG. 10b is a schematic diagram of a time sequence in which an AP triggers a station to perform uplink data transmission in Example 1.2.

The AP receives an uplink multi-user PPDU, where the uplink multi-user PPDU includes uplink sub-PPDUs sent by one or more stations. Then, the AP returns an acknowledgment frame. The acknowledgment frame sent to the one or more stations may be sent in a form of downlink OFDMA, or may be sent in a form of non-HT duplicate transmission. FIG. 10b is a schematic diagram of a time sequence in which the AP triggers a station to perform uplink data transmission in Example 1.2. In FIG. 10b, the uplink multi-user PPDU includes the HE TB PPDU with a bandwidth of 80 MHz and the EHT TB PPDU with a bandwidth of 80 MHz.

Example 1.3

The AP sends the trigger frame. The uplink bandwidth field (whose value is 2) in the trigger frame indicates 80 MHz, and the uplink PPDU total transmission bandwidth jointly indicated by the uplink bandwidth extension field (whose value is the first value) and the uplink bandwidth field is 80 MHz. A value of the EHT/HE indication field in the trigger frame is 1000 (in this case, the last three bits of the EHT/HE indication field are reserved or not used, where 0 indicates transmission of the HE TB PPDU, and 1 indicates transmission of the EHT TB PPDU).

After a plurality of stations receive the trigger frame, the EHT station transmits the EHT TB PPDU on the first 80 MHz channel based on the uplink bandwidth field, the uplink bandwidth extension field, and the EHT/HE indication field. A bandwidth field in a universal signal field in a preamble of the EHT TB PPDU is set to 80 MHz (this value is determined based on the EHT/HE indication field).

Figure 10C:
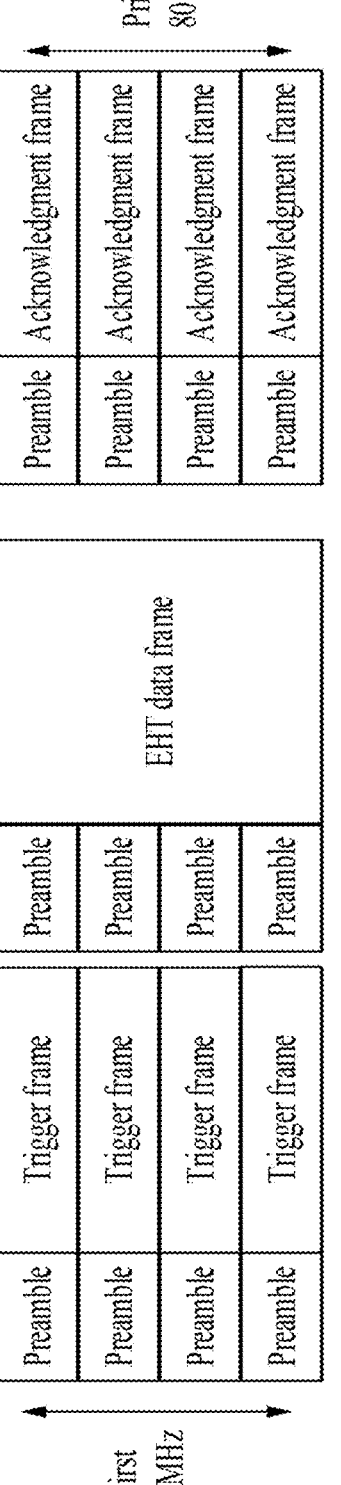
FIG. 10c is a schematic diagram of a time sequence in which an AP triggers a station to perform uplink data transmission in Example 1.3.

The AP receives an uplink multi-user PPDU, where the uplink multi-user PPDU includes uplink sub-PPDUs sent by one or more stations. Then, the AP returns an acknowledgment frame. The acknowledgment frame sent to the one or more stations may be sent in a form of downlink OFDMA, or may be sent in a form of non-HT duplicate transmission. FIG. 10c is a schematic diagram of a time sequence in which the AP triggers a station to perform uplink data transmission in Example 1.3. In FIG. 10c, the uplink multi-user PPDU includes the EHT TB PPDU with a bandwidth of 80 MHz.

Example 1.4

The AP sends the trigger frame. The uplink bandwidth field (whose value is 2) in the trigger frame indicates 80 MHz, and the uplink PPDU total transmission bandwidth jointly indicated by the uplink bandwidth extension field (whose value is the third value) and the uplink bandwidth field is 320 MHz. A value of the EHT/HE indication field in the trigger frame is 0111 (where 0 indicates transmission of an HE TB PPDU, and 1 indicates transmission of an EHT TB PPDU).

After a plurality of stations receive the trigger frame, an HE station or an EHT station transmits an HE TB PPDU on the first 80 MHz channel based on an indication of the EHT/HE indication field, where a bandwidth field in a high efficiency signaling field A in a preamble of the HE TB PPDU is set to 80 MHz indicated by the uplink bandwidth field. The EHT station transmits an EHT TB PPDU on the second, third, and fourth 80 MHz channels based on the uplink bandwidth field, the uplink bandwidth extension field, and the EHT/HE indication field, where a bandwidth field in a universal signal field in a preamble of the EHT TB PPDU is set to 320 MHz (this value is determined based on the uplink bandwidth field). Because the EHT standard does not support a bandwidth of a 240 MHz type, the bandwidth field in the universal signal field in the preamble of the EHT TB PPDU needs to be set to 320 MHz, but an actual transmission bandwidth of the EHT TB PPDU is still 240 MHz.

Figure 10D:
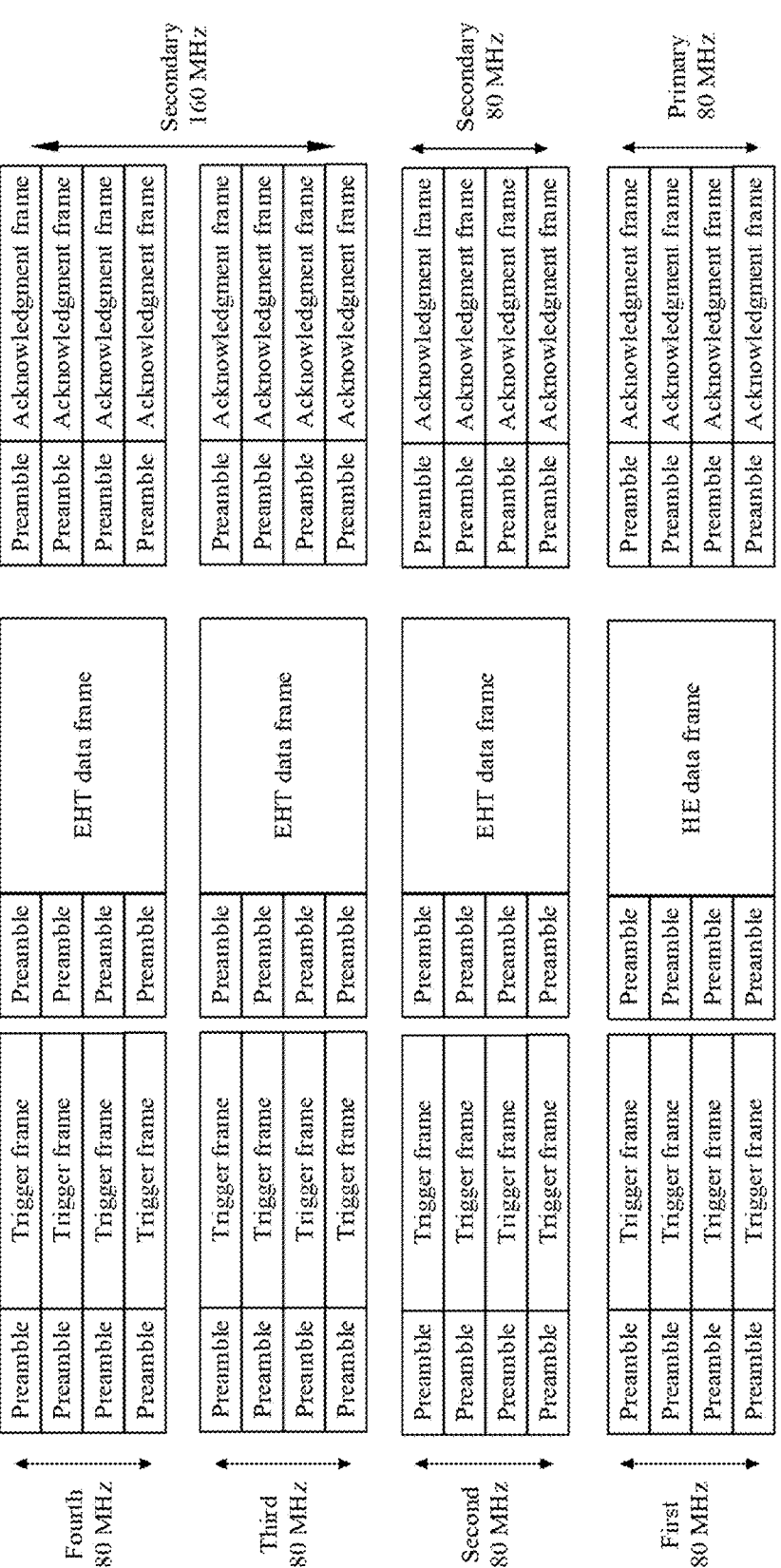
FIG. 10d is a schematic diagram of a time sequence in which an AP triggers a station to perform uplink data transmission in Example 1.4.

The AP receives an uplink multi-user PPDU, where the uplink multi-user PPDU includes uplink sub-PPDUs sent by one or more stations. Then, the AP returns an acknowledgment frame. The acknowledgment frame sent to the one or more stations may be sent in a form of downlink OFDMA, or may be sent in a form of non-HT duplicate transmission. FIG. 10d is a schematic diagram of a time sequence in which the AP triggers a station to perform uplink data transmission in Example 1.4. In FIG. 10d, the uplink multi-user PPDU includes an HE TB PPDU whose bandwidth is 80 MHz and an EHT TB PPDU whose actual transmission bandwidth is 240 MHz.

Example 1.5

The AP sends the trigger frame. The uplink bandwidth field (whose value is 2) in the trigger frame indicates 80

MHz, and the uplink PPDU total transmission bandwidth jointly indicated by the uplink bandwidth extension field (whose value is the third value) and the uplink bandwidth field is 320 MHz. A value of the EHT/HE indication field in the trigger frame is 0011 (where 0 indicates transmission of an HE TB PPDU, and 1 indicates transmission of an EHT TB PPDU).

After a plurality of stations receive the trigger frame, an HE station or an EHT station transmits an HE TB PPDU on the first 80 MHz channel based on an indication of the EHT/HE indication field, where a bandwidth field in a high efficiency signaling field A in a preamble of the HE TB PPDU is set to 80 MHz indicated by the uplink bandwidth field. The EHT station transmits an EHT TB PPDU on the third and fourth 80 MHz channels based on the uplink bandwidth field, the uplink bandwidth extension field, and the EHT/HE indication field, where a bandwidth field in a universal signal field in a preamble of the EHT TB PPDU is set to 160 MHz (this value is determined based on the EHT/HE indication field). It should be understood that the EHT/HE indication field indicates that an HE TB PPDU is transmitted on the first 80 MHz channel and the second 80 MHz channel, but an HE TB PPDU bandwidth indicated by the uplink bandwidth field is only 80 MHz. Therefore, the second 80 MHz channel is punctured, and only the first 80 MHz channel can be used to transmit the HE TB PPDU.

Figure 10E:
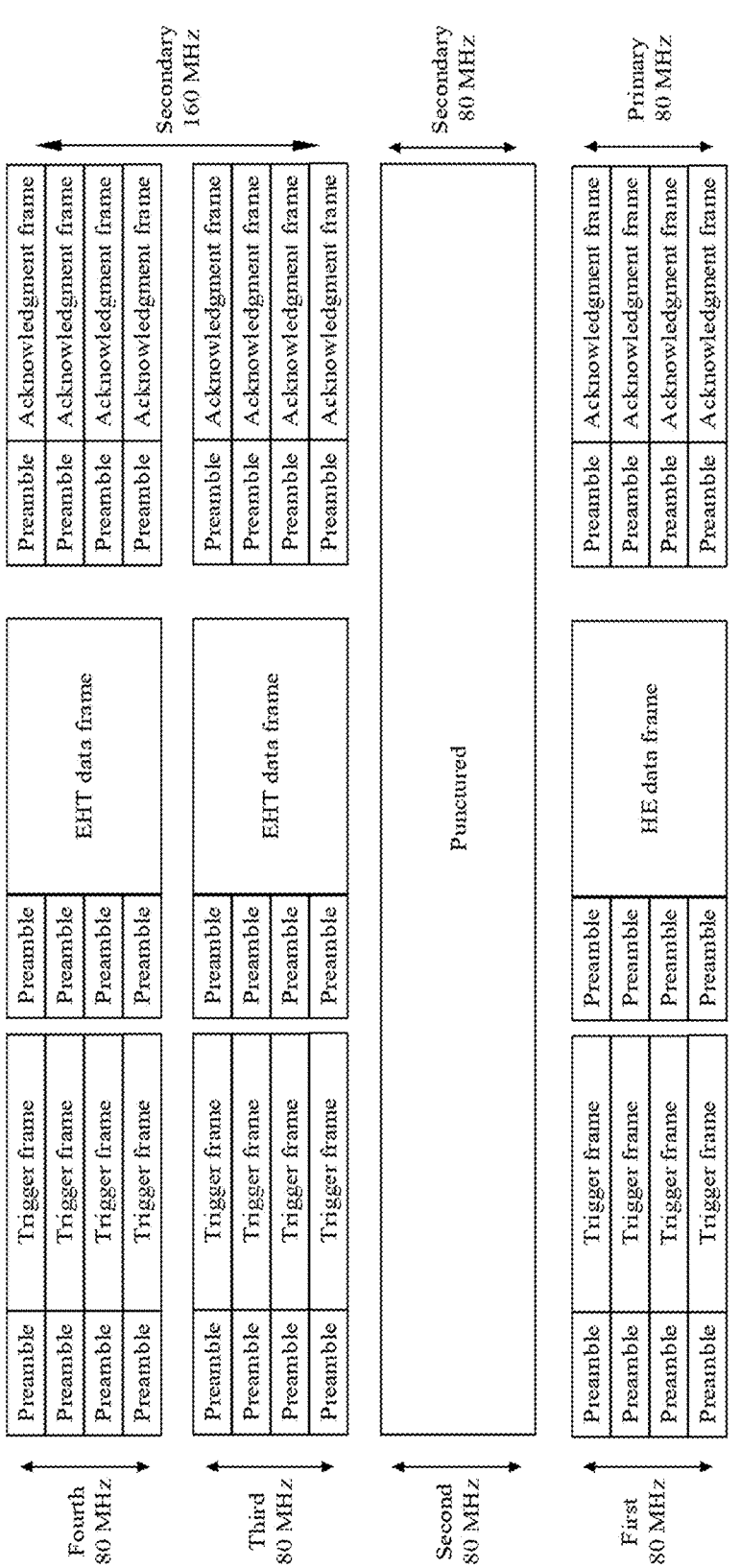
FIG. 10e is a schematic diagram of a time sequence in which an AP triggers a station to perform uplink data transmission in Example 1.5.

The AP receives an uplink multi-user PPDU, where the uplink multi-user PPDU includes uplink sub-PPDUs sent by one or more stations. Then, the AP returns an acknowledgment frame. The acknowledgment frame sent to the one or more stations may be sent in a form of downlink OFDMA, or may be sent in a form of non-HT duplicate transmission. FIG. 10*e* is a schematic diagram of a time sequence in which the AP triggers a station to perform uplink data transmission in Example 1.5. In FIG. 10*e*, the second 80 MHz channel is punctured, and an uplink multi-user PPDU includes the HE TB PPDU with a bandwidth of 80 MHz and the EHT TB PPDU with a bandwidth of 160 MHz.

Method 2: The uplink bandwidth extension field jointly indicates an EHT TB PPDU bandwidth together with the uplink bandwidth field in the common information field in the trigger frame. In the following implementations 2.1, 2.2, and 2.3, the uplink bandwidth extension field occupies 2 bits, and in the following implementation 2.4, the uplink bandwidth extension field occupies 3 bits.

Implementation 2.1:

When a value of the uplink bandwidth field is 0, and the uplink bandwidth extension field is a reserved field, the jointly indicated EHT TB PPDU bandwidth is 20 MHz. In this case, a maximum uplink PPDU total transmission bandwidth is 20 MHz.

The foregoing sentence may also be understood as the following.

When a value of the uplink bandwidth field is 0, and a value of the uplink bandwidth extension field is a first value, the jointly indicated EHT TB PPDU total transmission bandwidth is 20 MHz.

When a value of the uplink bandwidth field is 0, and a value of the uplink bandwidth extension field is a second value, this value combination is reserved (not used).

When a value of the uplink bandwidth field is 0, and a value of the uplink bandwidth extension field is a third value, this value combination is reserved (not used).

When a value of the uplink bandwidth field is 0, and a value of the uplink bandwidth extension field is a fourth value, this value combination is reserved (not used).

Alternatively:

When a value of the uplink bandwidth field is 0, and a value of the uplink bandwidth extension field is a first value, the jointly indicated EHT TB PPDU transmission bandwidth is 20 MHz.

When a value of the uplink bandwidth field is 0, and a value of the uplink bandwidth extension field is a second value, the jointly indicated EHT TB PPDU transmission bandwidth is 80 MHz. In this case, this combination may be used to support hybrid uplink transmission of a 20 MHz uplink HE PPDU and an 80 MHz uplink EHT PPDU. For example, an uplink HE PPDU is transmitted on primary 20 MHz, and an uplink EHT PPDU is transmitted on one 80 MHz in the secondary 160 MHz channel. Optionally, all of the frequency band in 320 MHz other than the primary 20 MHz channel and other than the 80 MHz channel in the secondary 160 MHz channel is punctured. Certainly, this combination may still support transmission of a non-A-PPDU on a corresponding bandwidth, for example, an uplink HE PPDU or an uplink EHT PPDU.

When a value of the uplink bandwidth field is 0, and a value of the uplink bandwidth extension field is a third value, the jointly indicated EHT TB PPDU transmission bandwidth is 160 MHz. In this case, this combination may be used to support hybrid uplink transmission of a 20 MHz uplink HE PPDU and a 160 MHz uplink EHT PPDU. For example, an uplink HE PPDU is transmitted on primary 20 MHz, and an uplink EHT PPDU is transmitted on the secondary 160 MHz channel. Optionally, all of the frequency band in 320 MHz other than the primary 20 MHz channel and other than the secondary 160 MHz channel is punctured. Certainly, this combination may still support transmission of a non-A-PPDU on a corresponding bandwidth, for example, an uplink HE PPDU or an uplink EHT PPDU.

When a value of the uplink bandwidth field is 0, and a value of the uplink bandwidth extension field is a fourth value, this value combination is reserved (not used).

It should be noted that hybrid uplink transmission of a 20 MHz uplink HE PPDU and an 80 MHz EHT PPDU may not be allowed in a protocol, and therefore it may alternatively be:

When a value of the uplink bandwidth field is 0, and a value of the uplink bandwidth extension field is a first value, the jointly indicated EHT TB PPDU total transmission bandwidth is 20 MHz.

When a value of the uplink bandwidth field is 0, and a value of the uplink bandwidth extension field is a second value, the jointly indicated EHT TB PPDU transmission bandwidth is 160 MHz. In this case, this combination may be used to support hybrid uplink transmission of a 20 MHz uplink HE PPDU and a 160 MHz uplink EHT PPDU. Certainly, this combination may still support transmission of a non-A-PPDU on a corresponding bandwidth, for example, an uplink HE PPDU or an uplink EHT PPDU.

When a value of the uplink bandwidth field is 0, and a value of the uplink bandwidth extension field is a third value, this value combination is reserved (not used).

When a value of the uplink bandwidth field is 0, and a value of the uplink bandwidth extension field is a fourth value, this value combination is reserved (not used).

When a value of the uplink bandwidth field is 1, and the uplink bandwidth extension field is a reserved field, the jointly indicated EHT TB PPDU bandwidth is 40 MHz. In this case, a maximum uplink PPDU total transmission bandwidth is 40 MHz.

The foregoing sentence may also be understood as the following.

When a value of the uplink bandwidth field is 1, and a value of the uplink bandwidth extension field is a first value, the jointly indicated EHT TB PPDU bandwidth is 40 MHz. In this case, a maximum uplink PPDU total transmission bandwidth is 40 MHz.

When a value of the uplink bandwidth field is 1, and a value of the uplink bandwidth extension field is a second value, this value combination is reserved (not used).

When a value of the uplink bandwidth field is 1, and a value of the uplink bandwidth extension field is a third value, this value combination is reserved (not used).

When a value of the uplink bandwidth field is 1, and a value of the uplink bandwidth extension field is a fourth value, this value combination is reserved (not used).

Alternatively:

When a value of the uplink bandwidth field is 1, and a value of the uplink bandwidth extension field is a first value, the jointly indicated EHT TB PPDU transmission bandwidth is 40 MHz.

When a value of the uplink bandwidth field is 1, and a value of the uplink bandwidth extension field is a second value, the jointly indicated EHT TB PPDU transmission bandwidth is 80 MHz. In this case, this combination may be used to support hybrid uplink transmission of a 40 MHz uplink HE PPDU and an 80 MHz uplink EHT PPDU. Certainly, this combination may still support transmission of a non-A-PPDU on a corresponding bandwidth, for example, an uplink HE PPDU or an uplink EHT PPDU.

When a value of the uplink bandwidth field is 1, and a value of the uplink bandwidth extension field is a third value, the jointly indicated EHT TB PPDU transmission bandwidth is 160 MHz. In this case, this combination may be used to support hybrid uplink transmission of a 40 MHz uplink HE PPDU and a 160 MHz uplink EHT PPDU. Certainly, this combination may still support transmission of a non-A-PPDU on a corresponding bandwidth, for example, an uplink HE PPDU or an uplink EHT PPDU.

When a value of the uplink bandwidth field is 1, and a value of the uplink bandwidth extension field is a fourth value, this value combination is reserved (not used).

It should be noted that hybrid uplink transmission of a 40 MHz uplink HE PPDU and an 80 MHz EHT PPDU may not be allowed in a protocol, and therefore it may alternatively be:

When a value of the uplink bandwidth field is 1, and a value of the uplink bandwidth extension field is a first value, the jointly indicated EHT TB PPDU transmission bandwidth is 40 MHz.

When a value of the uplink bandwidth field is 1, and a value of the uplink bandwidth extension field is a second value, the jointly indicated EHT TB PPDU transmission bandwidth is 160 MHz. In this case, this combination may be used to support hybrid uplink transmission of a 40 MHz uplink HE PPDU and a 160 MHz uplink EHT PPDU. Certainly, this combination may still support transmission of a non-A-PPDU on a corresponding bandwidth, for example, an uplink HE PPDU or an uplink EHT PPDU.

When a value of the uplink bandwidth field is 1, and a value of the uplink bandwidth extension field is a third value, this value combination is reserved (not used).

When a value of the uplink bandwidth field is 1, and a value of the uplink bandwidth extension field is a fourth value, this value combination is reserved (not used).

When a value of the uplink bandwidth field is 2, and a value of the uplink bandwidth extension field is a first value, the jointly indicated EHT TB PPDU bandwidth is 80 MHz. In this case, a maximum uplink PPDU total transmission bandwidth is 160 MHz (80 MHz+80 MHz).

When a value of the uplink bandwidth field is 2, and a value of the uplink bandwidth extension field is a second value, the jointly indicated EHT TB PPDU bandwidth is 160 MHz. In this case, a maximum uplink PPDU total transmission bandwidth is 320 MHz. This is because there is no 240 MHz bandwidth (80 MHz+160 MHz) in the EHT standard. Therefore, the maximum uplink PPDU total transmission bandwidth is 320 MHz, where 80 MHz is punctured, and the actual transmission bandwidth is 240 MHz.

When a value of the uplink bandwidth field is 2, and a value of the uplink bandwidth extension field is a third value, the jointly indicated EHT TB PPDU bandwidth is 320 MHz. In this case, a maximum uplink PPDU total transmission bandwidth is 320 MHz. It should be understood that 80 MHz+320 MHz exceeds 320 MHz, but a maximum uplink PPDU total transmission bandwidth is still 320 MHz.

When a value of the uplink bandwidth field is 2, and a value of the uplink bandwidth extension field is a fourth value, this combination is reserved.

When a value of the uplink bandwidth field is 3, and a value of the uplink bandwidth extension field is a first value, the jointly indicated EHT TB PPDU bandwidth is 80 MHz. In this case, a maximum uplink PPDU total transmission bandwidth is 320 MHz. This is because there is no 240 MHz bandwidth (160 MHz+80 MHz) in the EHT standard.

When a value of the uplink bandwidth field is 3, and a value of the uplink bandwidth extension field is a second value, the jointly indicated EHT TB PPDU bandwidth is 160 MHz. In this case, a maximum uplink PPDU total transmission bandwidth is 320 MHz (160 MHz+160 MHz).

When a value of the uplink bandwidth field is 3, and a value of the uplink bandwidth extension field is a third value, the jointly indicated EHT TB PPDU bandwidth is 320 MHz. In this case, a maximum total bandwidth for uplink PPDU transmission is 320 MHz. It should be understood that 160 MHz+320 MHz exceeds 320 MHz, but a maximum uplink PPDU total transmission bandwidth is still 320 MHz.

When a value of the uplink bandwidth field is 3, and a value of the uplink bandwidth extension field is a fourth value, this combination is reserved.

In the implementation 2.1, the uplink bandwidth extension field occupies 2 bits, and may represent four values from 0 to 3. The first value to the fourth value each may be any one of {0, 1, 2, 3}, and the first value, the second value, the third value, and the fourth value are different from each other. For example, the first value is 0, the second value is 1, the third value is 2, and the fourth value is 3.

It can be learned that a main difference between the implementation 2.1 of the method 2 and the implementation 1.1 of the method 1 lies in that in the implementation 2.1, the EHT TB PPDU bandwidth may be less than the value indicated by the uplink bandwidth field.

Implementation 2.2:

When a value of the uplink bandwidth field is 0, and the uplink bandwidth extension field is a reserved field, the jointly indicated EHT TB PPDU bandwidth is 20 MHz. In this case, a maximum uplink PPDU total transmission bandwidth is 20 MHz.

The foregoing sentence may also be understood as the following.

When a value of the uplink bandwidth field is 0, and a value of the uplink bandwidth extension field is a first value, the jointly indicated EHT TB PPDU total transmission bandwidth is 20 MHz.

When a value of the uplink bandwidth field is 0, and a value of the uplink bandwidth extension field is a second value, this value combination is reserved (not used).

When a value of the uplink bandwidth field is 0, and a value of the uplink bandwidth extension field is a third value, this value combination is reserved (not used).

When a value of the uplink bandwidth field is 0, and a value of the uplink bandwidth extension field is a fourth value, this value combination is reserved (not used).

Alternatively:

When a value of the uplink bandwidth field is 0, and a value of the uplink bandwidth extension field is a first value, the jointly indicated EHT TB PPDU transmission bandwidth is 20 MHz.

When a value of the uplink bandwidth field is 0, and a value of the uplink bandwidth extension field is a second value, the jointly indicated EHT TB PPDU transmission bandwidth is 80 MHz. In this case, this combination may be used to support hybrid uplink transmission of a 20 MHz uplink HE PPDU and an 80 MHz uplink EHT PPDU. For example, an uplink HE PPDU is transmitted on a primary 20 MHz channel, and an uplink EHT PPDU is transmitted on one 80 MHz channel in the secondary 160 MHz channel. Optionally, all of the frequency band in 320 MHz other than the primary 20 MHz channel and other than the 80 MHz channel in the secondary 160 MHz channel is punctured. Certainly, this combination may still support transmission of a non-A-PPDU on a corresponding bandwidth, for example, an uplink HE PPDU or an uplink EHT PPDU.

When a value of the uplink bandwidth field is 0, and a value of the uplink bandwidth extension field is a third value, the jointly indicated EHT TB PPDU transmission bandwidth is 160 MHz. In this case, this combination may be used to support hybrid uplink transmission of a 20 MHz uplink HE PPDU and a 160 MHz uplink EHT PPDU. For example, an uplink HE PPDU is transmitted on the primary 40 MHz channel, and an uplink EHT PPDU is transmitted on the secondary 160 MHz channel. Optionally, all of the frequency band in 320 MHz other than the primary 20 MHz channel and other than the secondary 160 MHz channel is punctured. Certainly, this combination may still support transmission of a non-A-PPDU on a corresponding bandwidth, for example, an uplink HE PPDU or an uplink EHT PPDU.

When a value of the uplink bandwidth field is 0, and a value of the uplink bandwidth extension field is a fourth value, this value combination is reserved (not used).

It should be noted that hybrid uplink transmission of a 20 MHz uplink HE PPDU and an 80 MHz EHT PPDU may not be allowed in a protocol, and therefore it may alternatively be:

When a value of the uplink bandwidth field is 0, and a value of the uplink bandwidth extension field is a first value, the jointly indicated EHT TB PPDU total transmission bandwidth is 20 MHz.

When a value of the uplink bandwidth field is 0, and a value of the uplink bandwidth extension field is a second value, the jointly indicated EHT TB PPDU transmission bandwidth is 160 MHz. In this case, this combination may be used to support hybrid uplink transmission of a 20 MHz uplink HE PPDU and a 160 MHz uplink EHT PPDU. Certainly, this combination may still support transmission of a non-A-PPDU on a corresponding bandwidth, for example, an uplink HE PPDU or an uplink EHT PPDU.

When a value of the uplink bandwidth field is 0, and a value of the uplink bandwidth extension field is a third value, this value combination is reserved (not used).

When a value of the uplink bandwidth field is 0, and a value of the uplink bandwidth extension field is a fourth value, this value combination is reserved (not used).

When a value of the uplink bandwidth field is 1, and the uplink bandwidth extension field is a reserved field, the jointly indicated EHT TB PPDU bandwidth is 40 MHz. In this case, a maximum uplink PPDU total transmission bandwidth is 40 MHz.

The foregoing sentence may also be understood as the following.

When a value of the uplink bandwidth field is 1, and a value of the uplink bandwidth extension field is a first value, the jointly indicated EHT TB PPDU bandwidth is 40 MHz. In this case, a maximum uplink PPDU total transmission bandwidth is 40 MHz.

When a value of the uplink bandwidth field is 1, and a value of the uplink bandwidth extension field is a second value, this value combination is reserved (not used).

When a value of the uplink bandwidth field is 1, and a value of the uplink bandwidth extension field is a third value, this value combination is reserved (not used).

When a value of the uplink bandwidth field is 1, and a value of the uplink bandwidth extension field is a fourth value, this value combination is reserved (not used).

Alternatively:

When a value of the uplink bandwidth field is 1, and a value of the uplink bandwidth extension field is a first value, the jointly indicated EHT TB PPDU transmission bandwidth is 40 MHz.

When a value of the uplink bandwidth field is 1, and a value of the uplink bandwidth extension field is a second value, the jointly indicated EHT TB PPDU transmission bandwidth is 80 MHz. In this case, this combination may be used to support hybrid uplink transmission of a 40 MHz uplink HE PPDU and an 80 MHz uplink EHT PPDU. For example, the uplink HE PPDU occupies a primary 40 MHz channel, and the uplink EHT PPDU occupies one 80 MHz channel in the secondary 160 MHz channel. Optionally, all of the frequency band in 320 MHz other than the primary 40 MHz channel and the 80 MHz in the secondary 160 MHz channel is punctured. Certainly, this combination may still support transmission of a non-A-PPDU on a corresponding bandwidth, for example, an uplink HE PPDU or an uplink EHT PPDU.

When a value of the uplink bandwidth field is 1, and a value of the uplink bandwidth extension field is a third value, the jointly indicated EHT TB PPDU transmission bandwidth is 160 MHz. In this case, this combination may be used to support hybrid uplink transmission of a 40 MHz uplink HE PPDU and a 160 MHz uplink EHT PPDU. For example, the uplink HE PPDU occupies a primary 40 MHz channel, and the uplink EHT PPDU occupies the secondary 160 MHz channel. Optionally, all of the frequency band in 320 MHz other than the primary 40 MHz channel and the secondary 160 MHz channel are punctured. Certainly, this combination may still support transmission of a non-A-PPDU on a corresponding bandwidth, for example, an uplink HE PPDU or an uplink EHT PPDU.

When a value of the uplink bandwidth field is 1, and a value of the uplink bandwidth extension field is a fourth value, this value combination is reserved (not used).

It should be noted that hybrid uplink transmission of a 40 MHz uplink HE PPDU and an 80 MHz EHT PPDU may not be allowed in a protocol, and therefore it may alternatively be:

When a value of the uplink bandwidth field is 1, and a value of the uplink bandwidth extension field is a first value, the jointly indicated EHT TB PPDU transmission bandwidth is 40 MHz.

When a value of the uplink bandwidth field is 1, and a value of the uplink bandwidth extension field is a second value, the jointly indicated EHT TB PPDU transmission bandwidth is 160 MHz. In this case, this combination may be used to support hybrid uplink transmission of a 40 MHz uplink HE PPDU and a 160 MHz uplink EHT PPDU. Certainly, this combination may still support transmission of a non-A-PPDU on a corresponding bandwidth, for example, an uplink HE PPDU or an uplink EHT PPDU.

When a value of the uplink bandwidth field is 1, and a value of the uplink bandwidth extension field is a third value, this value combination is reserved (not used).

When a value of the uplink bandwidth field is 1, and a value of the uplink bandwidth extension field is a fourth value, this value combination is reserved (not used).

When a value of the uplink bandwidth field is 2, and a value of the uplink bandwidth extension field is a first value, the jointly indicated EHT TB PPDU bandwidth is 80 MHz. In this case, a maximum uplink PPDU total transmission bandwidth is 160 MHz (80 MHz+80 MHz).

When a value of the uplink bandwidth field is 2, and a value of the uplink bandwidth extension field is a second value, the jointly indicated EHT TB PPDU bandwidth is 160 MHz. In this case, a maximum uplink PPDU total transmission bandwidth is 320 MHz. This is because there is no 240 MHz bandwidth (80 MHz+160 MHz) in the EHT standard. Therefore, the maximum uplink PPDU total transmission bandwidth is 320 MHz, where 80 MHz is punctured, and the actual transmission bandwidth is 240 MHz.

When a value of the uplink bandwidth field is 2, and a value of the uplink bandwidth extension field is a third value, the jointly indicated EHT TB PPDU bandwidth is 320 MHz-1. In this case, a maximum uplink PPDU total transmission bandwidth is 320 MHz. It should be understood that 80 MHz+320 MHz exceeds 320 MHz, but a maximum uplink PPDU total transmission bandwidth is still 320 MHz.

When a value of the uplink bandwidth field is 2, and a value of the uplink bandwidth extension field is a fourth value, the jointly indicated EHT TB PPDU bandwidth is 320 MHz-2. In this case, a maximum uplink PPDU total transmission bandwidth is 320 MHz.

When a value of the uplink bandwidth field is 3, and a value of the uplink bandwidth extension field is a first value, the jointly indicated EHT TB PPDU bandwidth is 80 MHz. In this case, a maximum uplink PPDU total transmission bandwidth is 320 MHz. This is because there is no 240 MHz bandwidth (160 MHz+80 MHz) in the EHT standard.

When a value of the uplink bandwidth field is 3, and a value of the uplink bandwidth extension field is a second value, the jointly indicated EHT TB PPDU bandwidth is 160 MHz. In this case, a maximum uplink PPDU total transmission bandwidth is 320 MHz (160 MHz+160 MHz).

When a value of the uplink bandwidth field is 3, and a value of the uplink bandwidth extension field is a third value, the jointly indicated EHT TB PPDU bandwidth is 320 MHz-1. In this case, a maximum total bandwidth for uplink PPDU transmission is 320 MHz. It should be understood that 160 MHz+320 MHz exceeds 320 MHz, but a maximum uplink PPDU total transmission bandwidth is still 320 MHz.

When a value of the uplink bandwidth field is 3, and a value of the uplink bandwidth extension field is a fourth value, the jointly indicated EHT TB PPDU bandwidth is 320 MHz-2. In this case, a maximum total bandwidth for uplink PPDU transmission is 320 MHz. It should be understood that 160 MHz+320 MHz exceeds 320 MHz, but a maximum uplink PPDU total transmission bandwidth is still 320 MHz.

In the implementation 2.2, the uplink bandwidth extension field occupies 2 bits, and may represent four values from 0 to 3. The first value to the fourth value each may be any one of {0, 1, 2, 3}, and the first value, the second value, the third value, and the fourth value are different from each other. For example, the first value is 0, the second value is 1, the third value is 2, and the fourth value is 3.

It can be learned that values and meanings of the uplink bandwidth extension field in the foregoing implementation 2.1 and the foregoing implementation 2.2 may be summarized as Table 6.

TABLE 6

| Uplink bandwidth field | Uplink bandwidth extension field | Jointly indicated EHT TB PPDU bandwidth |
|---|---|---|
| 0 (20 MHz) | First value | 20 MHz (implementation 2.1 or 2.2) |
| | Second value | 20 MHz (implementation 2.1 or 2.2) |
| | Third value | 20 MHz (implementation 2.1 or 2.2) |
| | Fourth value | 20 MHz (implementation 2.1 or 2.2) |
| 1 (40 MHz) | First value | 40 MHz (implementation 2.1 or 2.2) |
| | Second value | 40 MHz (implementation 2.1 or 2.2) |
| | Third value | 40 MHz (implementation 2.1 or 2.2) |
| | Fourth value | 40 MHz (implementation 2.1 or 2.2) |
| 2 (80 MHz) | First value | 80 MHz (implementation 2.1 or 2.2) |
| | Second value | 160 MHz (implementation 2.1 or 2.2) |
| | Third value | 320 MHz (implementation 2.1), 320 MHz-1 (implementation 2.2) |
| | Fourth value | Reserved (implementation 2.1), 320 MHz-2 (implementation 2.2) |
| 3 (160 MHz) | First value | 80 MHz (implementation 2.1 or 2.2) |
| | Second value | 160 MHz (implementation 2.1 or 2.2) |
| | Third value | 320 MHz (implementation 2.1), 320 MHz-1 (implementation 2.2) |
| | Fourth value | Reserved (implementation 2.1), 320 MHz-2 (implementation 2.2) |

TABLE 6a

| Uplink bandwidth field 2 | Uplink bandwidth extension field 2 | Jointly indicated EHT TB PPDU bandwidth |
|---|---|---|
| 0 (20 MHz) | First value | 20 MHz (implementation 2.1 or 2.2) |
| | Second value | Reserved (implementation 2.1 or 2.2) |
| | Third value | Reserved (implementation 2.1 or 2.2) |
| | Fourth value | Reserved (implementation 2.1 or 2.2) |
| 1 (40 MHz) | First value | 40 MHz (implementation 2.1 or 2.2) |
| | Second value | Reserved (implementation 2.1 or 2.2) |
| | Third value | Reserved (implementation 2.1 or 2.2) |
| | Fourth value | Reserved (implementation 2.1 or 2.2) |
| 2 (80 MHz) | First value | 80 MHz (implementation 2.1 or 2.2) |
| | Second value | 160 MHz (implementation 2.1 or 2.2) |
| | Third value | 320 MHz (implementation 2.1), 320 MHz-1 (implementation 2.2) |
| | Fourth value | Reserved (implementation 2.1), 320 MHz-2 (implementation 2.2) |
| 3 (160 MHz) | First value | 80 MHz (implementation 2.1 or 2.2) |
| | Second value | 160 MHz (implementation 2.1 or 2.2) |
| | Third value | 320 MHz (implementation 2.1), 320 MHz-1 (implementation 2.2) |
| | Fourth value | Reserved (implementation 2.1), 320 MHz-2 (implementation 2.2) |

TABLE 6b

| Uplink bandwidth field | Uplink bandwidth extension field | Jointly indicated EHT TB PPDU bandwidth |
|---|---|---|
| 0 (20 MHz) | First value | 20 MHz (implementation 2.1 or 2.2) |
| | Second value | 80 MHz or reserved (implementation 2.1 or 2.2) |
| | Third value | 160 MHz or reserved (implementation 2.1 or 2.2) |
| | Fourth value | Reserved (implementation 2.1 or 2.2) |
| 1 (40 MHz) | First value | 40 MHz (implementation 2.1 or 2.2) |
| | Second value | 80 MHz or reserved (implementation 2.1 or 2.2) |
| | Third value | 160 MHz or reserved (implementation 2.1 or 2.2) |
| | Fourth value | Reserved (implementation 2.1 or 2.2) |
| 2 (80 MHz) | First value | 80 MHz (implementation 2.1 or 2.2) |
| | Second value | 160 MHz (implementation 2.1 or 2.2) |
| | Third value | 320 MHz (implementation 2.1), 320 MHz-1 (implementation 2.2) |
| | Fourth value | Reserved (implementation 2.1), 320 MHz-2 (implementation 2.2) |
| 3 (160 MHz) | First value | 80 MHz (implementation 2.1 or 2.2) |
| | Second value | 160 MHz (implementation 2.1 or 2.2) |
| | Third value | 320 MHz (implementation 2.1), 320 MHz-1 (implementation 2.2) |
| | Fourth value | Reserved (implementation 2.1), 320 MHz-2 (implementation 2.2) |

In the implementation 2.1, when the EHT TB PPDU bandwidth is 320 MHz, the uplink bandwidth field and the uplink bandwidth extension field may be set to 2 and the third value, respectively, or the uplink bandwidth field and the uplink bandwidth extension field may be set to 3 and the third value, respectively. To facilitate implementation of a receive station, or provide more reserved combinations or unused values, two methods are provided.

1. When the uplink bandwidth field and the uplink bandwidth extension field may be set to 3 and the third value, respectively, the EHT TB PPDU bandwidth is 320 MHz. Alternatively, when the uplink bandwidth field and the uplink bandwidth extension field may be set to 2 and the third value, respectively, the EHT TB PPDU bandwidth is 320 MHz; when the uplink bandwidth field and the uplink bandwidth extension field may be set to 3 and the third value, respectively, this combination is reserved.

It may also be expressed as follows:

When the uplink bandwidth field and the uplink bandwidth extension field may be set to 3 and the third value, respectively, the EHT TB PPDU bandwidth is 320 MHz. When the uplink bandwidth field and the uplink bandwidth extension field may be set to 2 and the third value, this combination is reserved.

Alternatively, when the uplink bandwidth field and the uplink bandwidth extension field may be set to 2 and the third value, respectively, the EHT TB PPDU bandwidth is 320 MHz. When the uplink bandwidth field and the uplink bandwidth extension field may be set to 3 and the third value, this combination is reserved.

2. When the uplink bandwidth extension field is set to the third value, the uplink bandwidth field may be set to any value, that is, any one of 0 to 3, the EHT TB PPDU bandwidth is 320 MHz.

In the implementation 2.2, when the EHT TB PPDU bandwidth is 320 MHz-1, the uplink bandwidth field and the uplink bandwidth extension field may be set to 2 and the third value, respectively, or the uplink bandwidth field and the uplink bandwidth extension field may be set to 3 and the third value, respectively. To facilitate implementation of the receive station, two methods are provided.

1. When the uplink bandwidth field and the uplink bandwidth extension field may be set to 3 and the third value, respectively, the EHT TB PPDU bandwidth is 320 MHz-1. Alternatively, when the uplink bandwidth field and the uplink bandwidth extension field may be set to 2 and the third value, respectively, the EHT TB PPDU bandwidth is 320 MHz-1; when the uplink bandwidth field and the uplink bandwidth extension field may be set to 3 and the third value, respectively, this combination is reserved.

It may also be expressed as follows:

When the uplink bandwidth field and the uplink bandwidth extension field may be set to 3 and the third value, respectively, the EHT TB PPDU bandwidth is 320 MHz-1. When the uplink bandwidth field and the uplink bandwidth extension field may be set to 2 and the third value, this combination is reserved.

Alternatively, when the uplink bandwidth field and the uplink bandwidth extension field may be set to 2 and the third value, respectively, the EHT TB PPDU bandwidth is 320 MHz-1. When the uplink bandwidth field and the uplink bandwidth extension field may be set to 3 and the third value, this combination is reserved.

2. When the uplink bandwidth extension field is set to the third value, the uplink bandwidth field may be set to any value, that is, any one of 0 to 3, the EHT TB PPDU bandwidth is 320 MHz-1.

When the EHT TB PPDU bandwidth is 320 MHz-2, the uplink bandwidth field and the uplink bandwidth extension field may be set to 2 and the fourth value, respectively, or the uplink bandwidth field and the uplink bandwidth extension field may be set to 3 and the fourth value, respectively. To facilitate implementation of the receive station, two methods are provided.

1. When the uplink bandwidth field and the uplink bandwidth extension field may be set to 3 and the fourth value, respectively, the EHT TB PPDU bandwidth is 320 MHz-2. When the uplink bandwidth field and the uplink bandwidth extension field may be set to 2 and the fourth value, this combination is reserved.

Alternatively, when the uplink bandwidth field and the uplink bandwidth extension field may be set to 2 and the fourth value, respectively, the EHT TB PPDU bandwidth is 320 MHz-2. When the uplink bandwidth field and the uplink bandwidth extension field may be set to 3 and the fourth value, this combination is reserved.

2. When the uplink bandwidth extension field is set to the fourth value, the uplink bandwidth field may be set to any value, that is, any one of 0 to 3, the EHT TB PPDU bandwidth is 320 MHz-2.

In the implementation 2.2, when the EHT TB PPDU bandwidth is 320 MHz-1 or 320 MHz-2, according to the method 1 in the two methods, one combination indicates the EHT TB PPDU bandwidth, and the other combination is reserved (not used).

As what is mentioned above, that an existing 802.11ax-compliant station or an existing 802.11ac-compliant station in 160 MHz may combine legacy preambles on each 20 MHz of 160 MHz, for example, an L-SIG field, and combine preambles in each 20 MHz of 160 MHz in duplicate transmission, for example, an HE-SIG-A field in the 802.11ax or a VHT-SIG-A field in the 802.11ac is considered, so that it is proposed that hybrid transmission is not allowed for an uplink PPDU in primary 160 MHz transmission, to prevent the 802.11ax-compliant station or 802.11ac-compliant station supporting 160 MHz from incorrectly receiving a preamble. In this case, a size of a frequency segment (a bandwidth granularity for transmitting an uplink sub-PPDU)

of the EHT/HE indication field needs to be 160 MHz. Therefore, for a PPDU (A-PPDU) in uplink hybrid transmission, the primary 160 MHz cannot include both an uplink HE PPDU and an uplink EHT PPDU: for example, in the 160 MHz bandwidth, an uplink HE PPDU is transmitted on the primary 80 MHz channel and an uplink EHT PPDU is transmitted on the secondary 80 MHz channel, or an uplink EHT PPDU is transmitted on the primary 80 MHz channel and an uplink HE PPDU is transmitted on the secondary 80 MHz channel; for another example, in a bandwidth of 320 MHz, an uplink HE PPDU is transmitted on the primary 80 MHz channel, an uplink EHT PPDU is transmitted on the secondary 80 MHz channel, and an EHT PPDU is transmitted on the secondary 160 MHz channel, or an uplink EHT PPDU is transmitted on the primary 80 MHz, an uplink HE PPDU is transmitted on the secondary 80 MHz channel, and an EHT PPDU is transmitted on the secondary 160 MHz channel. Therefore, a design of the uplink EHT PPDU bandwidth or the uplink bandwidth extension field in the trigger frame does not need to support hybrid transmission of an uplink HE PPDU and an uplink EHT PPDU on the primary 160 MHz channel, for example, the foregoing four types of hybrid transmission.

Implementation 2.3:

When a value of the uplink bandwidth extension field is a first value, an EHT TB PPDU bandwidth jointly indicated by the uplink bandwidth field and the uplink bandwidth extension field is the same as a bandwidth indicated by the uplink bandwidth field.

When a value of the uplink bandwidth extension field is a second value, an EHT TB PPDU bandwidth jointly indicated by the uplink bandwidth field and the uplink bandwidth extension field is 80 MHz.

When a value of the uplink bandwidth extension field is a third value, an EHT TB PPDU bandwidth jointly indicated by the uplink bandwidth field and the uplink bandwidth extension field is 160 MHz.

When a value of the uplink bandwidth extension field is a fourth value, an EHT TB PPDU bandwidth jointly indicated by the uplink bandwidth field and the uplink bandwidth extension field is 320 MHz.

In the implementation 2.3, the uplink bandwidth extension field occupies 2 bits, and may represent four values from 0 to 3. The first value to the fourth value each may be any one of {0, 1, 2, 3}, and the first value, the second value, the third value, and the fourth value are different from each other. For example, the first value is 0, the second value is 1, the third value is 2, and the fourth value is 3.

It can be learned that values and meanings of the uplink bandwidth extension field in the foregoing implementation 2.3 may be summarized as Table 7.

TABLE 7

| Uplink bandwidth field | Uplink bandwidth extension field | Jointly indicated EHT TB PPDU bandwidth |
|---|---|---|
| 0 (20 MHz) | First value | 20 MHz |
| | Second value | 80 MHz, meaningless in this case |
| | Third value | 160 MHz, meaningless in this case |
| | Fourth value | 320 MHz, meaningless in this case |
| 1 (40 MHz) | First value | 40 MHz |
| | Second value | 80 MHz, meaningless in this case |
| | Third value | 160 MHz, meaningless in this case |
| | Fourth value | 320 MHz, meaningless in this case |
| 2 (80 MHz) | First value | 80 MHz |
| | Second value | 80 MHz |
| | Third value | 160 MHz |
| | Fourth value | 320 MHz |

TABLE 7-continued

| Uplink bandwidth field | Uplink bandwidth extension field | Jointly indicated EHT TB PPDU bandwidth |
|---|---|---|
| 3 (160 MHz) | First value | 160 MHz |
| | Second value | 80 MHz |
| | Third value | 160 MHz |
| | Fourth value | 320 MHz |

Implementation 2.4:

When a value of the uplink bandwidth extension field is a first value, an EHT TB PPDU bandwidth jointly indicated by the uplink bandwidth field and the uplink bandwidth extension field is the same as a bandwidth indicated by the uplink bandwidth field.

When a value of the uplink bandwidth extension field is a second value, an EHT TB PPDU bandwidth jointly indicated by the uplink bandwidth field and the uplink bandwidth extension field is 80 MHz.

When a value of the uplink bandwidth extension field is a third value, an EHT TB PPDU bandwidth jointly indicated by the uplink bandwidth field and the uplink bandwidth extension field is 160 MHz.

When a value of the uplink bandwidth extension field is a fourth value, an EHT TB PPDU bandwidth jointly indicated by the uplink bandwidth field and the uplink bandwidth extension field is 320 MHz-1.

When a value of the uplink bandwidth extension field is a fifth value, an EHT TB PPDU bandwidth jointly indicated by the uplink bandwidth field and the uplink bandwidth extension field is 320 MHz-2. Another value is reserved.

In the implementation 2.4, the uplink bandwidth extension field occupies 3 bits, and may represent eight values from 0 to 7. The first value to the fifth value each may be any one of {0, 1, 2, 3, 4, 5, 6, 7}, and the first value, the second value, the third value, the fourth value, and the fifth value are different from each other. For example, the first value is 0, the second value is 1, the third value is 2, the fourth value is 3, the fifth value is 4, and other values (namely, 5, 6, and 7) are reserved.

It can be learned that values and meanings of the uplink bandwidth extension field in the foregoing implementation 2.4 may be summarized as Table 8.

TABLE 8

| Uplink bandwidth field | Uplink bandwidth extension field | Jointly indicated EHT TB PPDU bandwidth |
|---|---|---|
| 0 (20 MHz) | First value | 20 MHz |
| | Second value | 80 MHz, meaningless in this case |
| | Third value | 160 MHz, meaningless in this case |
| | Fourth value | 320 MHz-1, meaningless in this case |
| | Fifth value | 320 MHz-2, meaningless in this case |
| | Another value | Reserved |
| 1 (40 MHz) | First value | 40 MHz |
| | Second value | 80 MHz, meaningless in this case |
| | Third value | 160 MHz, meaningless in this case |
| | Fourth value | 320 MHz-1, meaningless in this case |
| | Fifth value | 320 MHz-2, meaningless in this case |
| | Another value | Reserved |
| 2 (80 MHz) | First value | 80 MHz |
| | Second value | 80 MHz |
| | Third value | 160 MHz |
| | Fourth value | 320 MHz-1 |
| | Fifth value | 320 MHz-2 |
| | Another value | Reserved |
| 3 (160 MHz) | First value | 160 MHz |
| | Second value | 80 MHz |
| | Third value | 160 MHz |

TABLE 8-continued

| Uplink bandwidth field | Uplink bandwidth extension field | Jointly indicated EHT TB PPDU bandwidth |
|---|---|---|
| | Fourth value | 320 MHz-1 |
| | Fifth value | 320 MHz-2 |
| | Another value | Reserved |

In various implementations of the foregoing method 2, if the station transmits an uplink HE TB PPDU, a bandwidth of the uplink HE TB PPDU is a value indicated by the uplink bandwidth field. If the station transmits an uplink EHT TB PPDU, a bandwidth of the uplink EHT TB PPDU is a bandwidth jointly indicated by an uplink bandwidth field and an uplink bandwidth extension field.

Optionally, after the station receives the trigger frame, when the station sends an EHT TB PPDU, a bandwidth in a universal signal field in an uplink physical layer preamble needs to be determined based on the uplink bandwidth field and the uplink bandwidth extension field. Optionally, a bandwidth value needs to be set further based on fields such as a channel width and a CCFS in an EHT operation element. The channel width field is used to indicate a bandwidth of a BSS (that is, a maximum bandwidth of a PPDU that can be transmitted in the BSS), and one or more CCFS fields are used to indicate a center frequency of the bandwidth of the BBS, so that an associated station learns of whether a 320 MHz PPDU transmitted in the BSS is a 320 MHz-1 PPDU or a 320 MHz-2 PPDU. A station that is not associated with the BSS or a station in another basic service set may learn of, by receiving a management frame, for example, a beacon frame, sent by an AP in the basic service set, whether the 320 MHz PPDU transmitted in the BSS is a 320 MHz-1 PPDU or a 320 MHz-2 PPDU. Alternatively, whether the 320 MHz PPDU transmitted in the BSS is a 320 MHz-1 PPDU or a 320 MHz-2 PPDU is explicitly indicated in the trigger frame.

Optionally, in the foregoing implementation 2.1 and implementation 2.3, after the EHT station receives the trigger frame, if a bandwidth of a transmitted uplink EHT TB PPDU is 320 MHz, whether the bandwidth of 320 MHz is 320 MHz-1 or 320 MHz-2 may be determined based on the bandwidth field, the CCFS field, and the like in the EHT operation element, and 320 MHz-1 or 320 MHz-2 is filled in a universal signal field in a preamble of the uplink EHT TB PPDU.

Optionally, in the foregoing implementation 2.2 and implementation 2.4, after receiving the trigger frame, if a bandwidth of a transmitted uplink EHT TB PPDU is 320 MHz, the EHT station may fill 320 MHz-1 or 320 MHz-2 in a universal signal field of a preamble of the uplink EHT TB PPDU based on 320 MHz-1 or 320 MHz-2 indicated in the trigger frame (specifically, a joint indication of the uplink bandwidth field and the uplink bandwidth extension field in the trigger frame).

The foregoing describes various implementations of the method 2. For ease of understanding, the following describes the implementations of the method 2 with reference to specific examples. Specifically, the following examples are described by using the implementation 2.1 of the method 2 as an example.

In the following examples, it is assumed that the implementation a-3 of the method a is used for the second indication information. To be specific, all of the 320 MHz channel can be used for hybrid transmission of an HE TB PPDU and an EHT TB PPDU, and the EHT/HE indication field occupies 4 bits. In this case, an unused bit in the 4-bit EHT/HE indication field depends on the uplink PPDU total transmission bandwidth. For example, if the uplink PPDU total transmission bandwidth is 160 MHz, 2 bits of the 4-bit EHT/HE indication field are not used. For another example, if the uplink PPDU total transmission bandwidth is 320 MHz, 0 bit of the 4-bit EHT/HE indication field is not used. It should be understood that the following examples are also applicable to other implementations of the second indication information. It should be further understood that various implementations of the second indication information are applicable to various implementations of the first indication information.

For ease of description, in the following examples, it is assumed that the primary 80 MHz channel is the first 80 MHz channel, the secondary 80 MHz channel is the second 80 MHz channel, and the secondary 160 MHz channel is the third 80 MHz channel and the fourth 80 MHz channel. The first to the fourth 80 MHz channels are obtained by sorting frequencies in descending order or in ascending order. It should be understood that the primary 80 MHz channel may be any 80 MHz channel in the frequency band, the secondary 80 MHz channel is located next to the primary 80 MHz channel, and the secondary 160 MHz channel is contiguous.

Example 2.1

The AP sends the trigger frame. The uplink bandwidth field (whose value is 3) in the trigger frame indicates 160 MHz, and the EHT TB PPDU bandwidth jointly indicated by the uplink bandwidth extension field (whose value is the second value) and the uplink bandwidth field is 160 MHz. A value of the EHT/HE indication field in the trigger frame is 0011 (where 0 indicates transmission of an HE TB PPDU, and 1 indicates transmission of an EHT TB PPDU).

After a plurality of stations receive the trigger frame, an HE station or an EHT station transmits an HE TB PPDU on the first and second 80 MHz channels based on an indication of the EHT/HE indication field, where a bandwidth field in a high efficiency signaling field A in a preamble of the HE TB PPDU is set to 160 MHz indicated by the uplink bandwidth field. The EHT station sets a bandwidth field in a universal signal field in a preamble in an EHT TB PPDU to 160 MHz (the value jointly indicated by the uplink bandwidth field and the uplink bandwidth extension field) based on the uplink bandwidth field and the uplink bandwidth extension field, and transmits the EHT TB PPDU on the third and fourth 80 MHz channels based on an indication of the EHT/HE indication field.

The AP receives an uplink multi-user PPDU, where the uplink multi-user PPDU includes uplink sub-PPDUs sent by one or more stations. Then, the AP returns an acknowledgment frame. The acknowledgment frame sent to the one or more stations may be sent in a form of downlink OFDMA, or may be sent in a form of non-HT duplicate transmission.

Example 2.2

The AP sends the trigger frame. The uplink bandwidth field (whose value is 2) in the trigger frame indicates 80 MHz, and the EHT TB PPDU bandwidth jointly indicated by the uplink bandwidth extension field (whose value is the first value) and the uplink bandwidth field is 80 MHz. A value of the EHT/HE indication field in the trigger frame is 0100 (where 0 indicates transmission of an HE TB PPDU, and 1 indicates transmission of an EHT TB PPDU).

After a plurality of stations receive the trigger frame, an HE station or an EHT station transmits an HE TB PPDU on the first 80 MHz channel based on an indication of the EHT/HE indication field, where a bandwidth field in a high efficiency signaling field A in a preamble of the HE TB PPDU is set to 80 MHz indicated by the uplink bandwidth field. The EHT station sets a bandwidth field in a universal signal field in a preamble in an EHT TB PPDU to 80 MHz (the value jointly indicated by the uplink bandwidth field and the uplink bandwidth extension field) based on the uplink bandwidth field and the uplink bandwidth extension field, and transmits the EHT TB PPDU on the second 80 MHz channel based on an indication of the EHT/HE indication field.

The AP receives an uplink multi-user PPDU, where the uplink multi-user PPDU includes uplink sub-PPDUs sent by one or more stations. Then, the AP returns an acknowledgment frame. The acknowledgment frame sent to the one or more stations may be sent in a form of downlink OFDMA, or may be sent in a form of non-HT duplicate transmission.

Example 2.3

The AP sends the trigger frame. The uplink bandwidth field (whose value is 2) in the trigger frame indicates 80 MHz, and the EHT TB PPDU bandwidth jointly indicated by the uplink bandwidth extension field (whose value is the first value) and the uplink bandwidth field is 80 MHz. A value of the EHT/HE indication field in the trigger frame is 1000 (where 0 indicates transmission of an HE TB PPDU, and 1 indicates transmission of an EHT TB PPDU). The trigger frame does not include a user information field for scheduling an HE station, that is, a value of an AID12 field in a user information field is not equal to an association identifier of any HE station. In addition, in the trigger frame, no resource on the second 80 MHz channel is allocated to an EHT station.

After a plurality of stations receive the trigger frame, an EHT station sets a bandwidth field in a universal signal field in a preamble in an EHT TB PPDU to 80 MHz (the value jointly indicated by the uplink bandwidth field and the uplink bandwidth extension field) based on the uplink bandwidth field and the uplink bandwidth extension field, and transmits the EHT TB PPDU on the first 80 MHz channel based on an indication of the EHT/HE indication field.

The AP receives an uplink multi-user PPDU, where the uplink multi-user PPDU includes uplink sub-PPDUs sent by one or more stations. Then, the AP returns an acknowledgment frame. The acknowledgment frame sent to the one or more stations may be sent in a form of downlink OFDMA, or may be sent in a form of non-HT duplicate transmission.

Example 2.4

The AP sends the trigger frame. The uplink bandwidth field (whose value is 2) in the trigger frame indicates 80 MHz, and the EHT TB PPDU bandwidth jointly indicated by the uplink bandwidth extension field (whose value is the third value) and the uplink bandwidth field is 320 MHz. A value of the EHT/HE indication field in the trigger frame is 0111 (where 0 indicates transmission of an HE TB PPDU, and 1 indicates transmission of an EHT TB PPDU).

After a plurality of stations receive the trigger frame, an HE station or an EHT station transmits an HE TB PPDU on the first 80 MHz channel based on an indication of the EHT/HE indication field, where a bandwidth field in a high efficiency signaling field A in a preamble of the HE TB PPDU is set to 80 MHz indicated by the uplink bandwidth field. The EHT station sets a bandwidth field in a universal signal field in a preamble of an EHT TB PPDU to 320 MHz (the value jointly indicated by the uplink bandwidth field and the uplink bandwidth extension field) based on the uplink bandwidth field and the uplink bandwidth extension field, and transmits the EHT TB PPDU on the second, third, and fourth 80 MHz channels based on an indication of the EHT/HE indication field.

The AP receives an uplink multi-user PPDU, where the uplink multi-user PPDU includes uplink sub-PPDUs sent by one or more stations. Then, the AP returns an acknowledgment frame. The acknowledgment frame sent to the one or more stations may be sent in a form of downlink OFDMA, or may be sent in a form of non-HT duplicate transmission.

Example 2.5

The AP sends the trigger frame. The uplink bandwidth field (whose value is 3) in the trigger frame indicates 160 MHz, and the EHT TB PPDU bandwidth jointly indicated by the uplink bandwidth extension field (whose value is the first value) and the uplink bandwidth field is 80 MHz. A value of the EHT/HE indication field in the trigger frame is 0011 or 0001 (where 0 indicates transmission of an HE TB PPDU, and 1 indicates transmission of an EHT TB PPDU).

After a plurality of stations receive the trigger frame, an HE station or an EHT station transmits an HE TB PPDU on the first and second 80 MHz channels based on an indication of the EHT/HE indication field, where a bandwidth field in a high efficiency signaling field A in a preamble of the HE TB PPDU is set to 160 MHz indicated by the uplink bandwidth field. The EHT station sets a bandwidth field in a universal signal field in a preamble in an EHT TB PPDU to 80 MHz (the value jointly indicated by the uplink bandwidth field and the uplink bandwidth extension field) based on the uplink bandwidth field and the uplink bandwidth extension field, and transmits the EHT TB PPDU on the fourth 80 MHz channel based on an indication of the EHT/HE indication field.

It should be understood that when the value of the EHT/HE indication field is 0001, the EHT/HE indication field indicates that the HE TB PPDU is transmitted on the first 80 MHz channel, the second 80 MHz channel, and the third 80 MHz channel. However, an HE TB PPDU bandwidth indicated by the uplink bandwidth field is only 160 MHz. Therefore, the third 80 MHz channel is punctured, and only the first 80 MHz channel and the second 80 MHz channel can be used to transmit the HE TB PPDU. When the value of the EHT/HE indication field is 0011, the EHT/HE indication field indicates that the EHT TB PPDU is transmitted on the third and fourth 80 MHz channels. However, the jointly indicated EHT TB PPDU bandwidth is only 80 MHz. Therefore, one 80 MHz channel in the third and fourth 80 MHz channels must be punctured, and a specific 80 MHz channel to be punctured depends on an 80 MHz channel on which a resource allocated to the EHT station in the trigger frame is located. For example, if the resource allocated to the EHT station in the trigger frame is on the fourth 80 MHz channel, the third 80 MHz channel is punctured, and the EHT TB PPDU can be transmitted only on the fourth 80 MHz channel. For another example, if the resource allocated to the EHT station in the trigger frame is on the third 80 MHz channel, the fourth 80 MHz channel is punctured, and the EHT TB PPDU can be transmitted only on the third 80 MHz channel.

Figure 11:
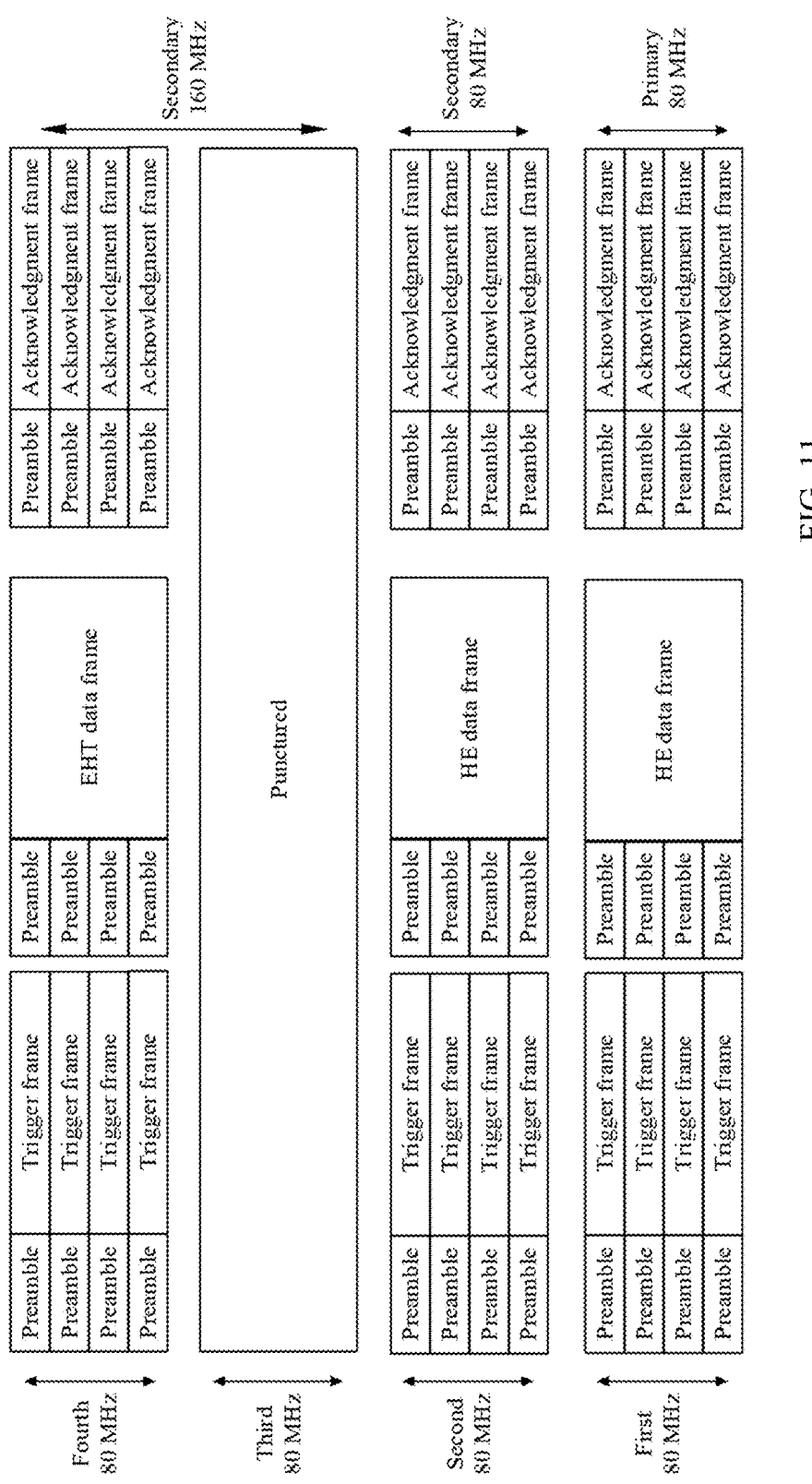
FIG. 11 is a schematic diagram of a time sequence in which an AP triggers a station to perform uplink data transmission in Example 2.5.

The AP receives an uplink multi-user PPDU, where the uplink multi-user PPDU includes uplink sub-PPDUs sent by one or more stations. Then, the AP returns an acknowledgment frame. The acknowledgment frame sent to the one or more stations may be sent in a form of downlink OFDMA, or may be sent in a form of non-HT duplicate transmission. FIG. 11 is a schematic diagram of a time sequence in which the AP triggers a station to perform uplink data transmission in Example 2.5. In FIG. 11, the third 80 MHz channel is punctured, and an uplink multi-user PPDU includes the HE TB PPDU with a bandwidth of 160 MHz and the EHT TB PPDU with a bandwidth of 80 MHz.

Method 3: The first indication information is directly used to indicate an uplink PPDU total transmission bandwidth. The first indication information is carried in an uplink PPDU total bandwidth field, and the field occupies 3 bits.

Implementation 3.1:

When a value of the uplink PPDU total bandwidth field is a first value, it indicates that the uplink PPDU total transmission bandwidth is 20 MHz.

When a value of the uplink PPDU total bandwidth field is a second value, it indicates that the uplink PPDU total transmission bandwidth is 40 MHz.

When a value of the uplink PPDU total bandwidth field is a third value, it indicates that the uplink PPDU total transmission bandwidth is 80 MHz.

When a value of the uplink PPDU total bandwidth field is a fourth value, it indicates that the uplink PPDU total transmission bandwidth is 160 MHz.

When a value of the uplink PPDU total bandwidth field is a fifth value, it indicates that the uplink PPDU total transmission bandwidth is 320 MHz. Another value is not used.

In the implementation 3.1, the uplink bandwidth extension field occupies 3 bits, and may represent eight values from 0 to 7. The first value to the fifth value each may be any one of {0, 1, 2, 3, 4, 5, 6, 7}, and the first value, the second value, the third value, the fourth value, and the fifth value are different from each other. For example, the first value is 0, the second value is 1, the third value is 2, the fourth value is 3, the fifth value is 4, and other values (namely, 5, 6, and 7) are reserved.

Implementation 3.2:

When a value of the uplink PPDU total bandwidth field is a first value, it indicates that the uplink PPDU total transmission bandwidth is 20 MHz.

When a value of the uplink PPDU total bandwidth field is a second value, it indicates that the uplink PPDU total transmission bandwidth is 40 MHz.

When a value of the uplink PPDU total bandwidth field is a third value, it indicates that the uplink PPDU total transmission bandwidth is 80 MHz.

When a value of the uplink PPDU total bandwidth field is a fourth value, it indicates that the uplink PPDU total transmission bandwidth is 160 MHz.

When a value of the uplink PPDU total bandwidth field is a fifth value, it indicates that the uplink PPDU total transmission bandwidth is 320 MHz-1.

When a value of the uplink PPDU total bandwidth field is a sixth value, it indicates that the uplink PPDU total transmission bandwidth is 320 MHz-2. Another value is not used.

In the implementation 3.2, the total uplink PPDU bandwidth occupies 3 bits, and may represent eight values from 0 to 7. The first value to the sixth value each may be any one of {0, 1, 2, 3, 4, 5, 6, 7}, and the first value, the second value, the third value, the fourth value, the fifth value, and the sixth value are different from each other. For example, the first value is 0, the second value is 1, the third value is 2, the fourth value is 3, the fifth value is 4, the sixth value is 5, and other values (namely, 6 and 7) are reserved.

It can be learned that values and meanings of the uplink PPDU total bandwidth field in the foregoing implementation 3.1 and the foregoing implementation 3.2 may be summarized as Table 9.

TABLE 9

| Uplink PPDU total bandwidth field | Uplink PPDU total transmission bandwidth |
| --- | --- |
| First value | 20 MHz (implementation 3.1 or 3.2) |
| Second value | 40 MHz (implementation 3.1 or 3.2) |
| Third value | 80 MHz (implementation 3.1 or 3.2) |
| Fourth value | 160 MHz (implementation 3.1 or 3.2) |
| Fifth value | 320 MHz (implementation 3.1), 320 MHz-1 (implementation 3.2) |
| Sixth value | Reserved (implementation 3.1), 320 MHz-2 (implementation 3.2) |
| Another value | Reserved (implementation 3.1 or 3.2) |

Uplink PPDU total bandwidth field Uplink PPDU total transmission bandwidth Sixth value Reserved (implementation 3.1), 320 MHz-2 (implementation 3.2) Another value Reserved (implementation 3.1 or 3.2)

The uplink PPDU total transmission bandwidth field and the uplink bandwidth field are two independent fields. For example, when the uplink PPDU total transmission bandwidth field is set to the first value (where a corresponding uplink PPDU transmission bandwidth is 20 MHz), the uplink bandwidth field may be set to any value. To facilitate implementation of a receiver, or provide more reserved combinations (unused values), the following is provided in Embodiment 4.1 or 4.2:

1. When the uplink PPDU total transmission bandwidth field is set to the first value, a bandwidth of an uplink EHT TB PPDU is 20 MHz, and the uplink bandwidth field needs to be set to one of four values 0 to 3, for example, 0. In this case, three value combinations corresponding to that the uplink PPDU total transmission bandwidth field is set to the first value and the uplink bandwidth field is set to any one of the other three values (for example, 1, 2, or 3) of the four values 0 to 3 are reserved combinations (not used).

2. When the uplink PPDU total transmission bandwidth field is set to the second value, a bandwidth of an uplink EHT TB PPDU is 40 MHz, and the uplink bandwidth field needs to be set to one of four values 0 to 3, for example, 1. In this case, three value combinations corresponding to that the uplink PPDU total transmission bandwidth field is set to the second value and the uplink bandwidth field is set to any one of the other three values (for example, 0, 2, or 3) of the four values 0 to 3 are reserved combinations (not used).

3. When the uplink PPDU total transmission bandwidth field is set to the third value, a bandwidth of an uplink EHT TB PPDU is 80 MHz, and the uplink bandwidth field needs to be set to one of four values 0 to 3, for example, 2 or 3. In this case, value combinations corresponding to that the uplink PPDU total transmission bandwidth field is set to the third value and the uplink bandwidth field is set to any one of the other values (for example, any one of 0, 1, or 2, or any one of 0, 1, or 3) of the four values 0 to 3 are reserved combinations (not used).

Alternatively:

When the uplink PPDU total transmission bandwidth field is set to the third value, a bandwidth of an uplink EHT TB PPDU is 80 MHz, and the uplink bandwidth field needs to be set to two of four values 0 to 3, for example, 2 and 3. In this case, value combinations corresponding to that the uplink PPDU total transmission bandwidth field is set to the third value and the uplink bandwidth field is set to the other two values (for example, 0 or 1) of the four values 0 to 3 are reserved combinations (not used).

4. When the uplink PPDU total transmission bandwidth field is set to the fourth value, a bandwidth of an uplink EHT TB PPDU is 160 MHz, and the uplink bandwidth field needs to be set to one of four values 0 to 3, for example, 2 or 3. In this case, value combinations corresponding to that the uplink PPDU total transmission bandwidth field is set to the fourth value and the uplink bandwidth field is set to any one of the other values (for example, any one of 0, 1, or 2, or any one of 0, 1, or 3) of the four values 0 to 3 are reserved combinations (not used).

Alternatively:

When the uplink PPDU total transmission bandwidth field is set to the fourth value, a bandwidth of an uplink EHT TB PPDU is 160 MHz, and the uplink bandwidth field needs to be set to two of four values 0 to 3, for example, 2 and 3. In this case, two value combinations corresponding to that the uplink PPDU total transmission bandwidth field is set to the fourth value and the uplink bandwidth field is set to the other two values (for example, 0 or 1) of the four values 0 to 3 are reserved combinations (not used).

In Embodiment 4.1:

5. When the uplink PPDU total transmission bandwidth field is set to the fifth value, a bandwidth of an uplink EHT TB PPDU is 320 MHz, and the uplink bandwidth field needs to be set to one of four values 0 to 3, for example, 2 or 3. In this case, value combinations corresponding to that the uplink PPDU total transmission bandwidth field is set to the fifth value and the uplink bandwidth field is set to any one of the other values (for example, any one of 0, 1, or 2, or any one of 0, 1, or 3) of the four values 0 to 3 are reserved combinations (not used).

Alternatively:

When the uplink PPDU total transmission bandwidth field is set to the fifth value, a bandwidth of an uplink EHT TB PPDU is 320 MHz, and the uplink bandwidth field needs to be set to two of four values 0 to 3, for example, 2 and 3. In this case, value combinations corresponding to that the uplink PPDU total transmission bandwidth field is set to the fifth value and the uplink bandwidth field is set to the other two values (for example, 0 or 1) of the four values 0 to 3 are reserved combinations (not used).

In Embodiment 4.2:

5. When the uplink PPDU total transmission bandwidth field is set to the fifth value, a bandwidth of an uplink EHT TB PPDU is 320 MHz-1, and the uplink bandwidth field needs to be set to one of four values 0 to 3, for example, 2 or 3. In this case, value combinations corresponding to that the uplink PPDU total transmission bandwidth field is set to the fifth value and the uplink bandwidth field is set to any one of the other values (for example, any one of 0, 1, or 2, or any one of 0, 1, or 3) of the four values 0 to 3 are reserved combinations (not used).

Alternatively:

When the uplink PPDU total transmission bandwidth field is set to the fifth value, a bandwidth of an uplink EHT TB PPDU is 320 MHz-1, and the uplink bandwidth field needs to be set to two of four values 0 to 3, for example, 2 and 3. In this case, value combinations corresponding to that the uplink PPDU total transmission bandwidth field is set to the fifth value and the uplink bandwidth field is set to the other two values (for example, 0 or 1) of the four values 0 to 3 are reserved combinations (not used).

6. When the uplink PPDU total transmission bandwidth field is set to the sixth value, a bandwidth of an uplink EHT TB PPDU is 320 MHz-2, and the uplink bandwidth field needs to be set to one of four values 0 to 3, for example, 2 or 3. In this case, value combinations corresponding to that the uplink PPDU total transmission bandwidth field is set to the fifth value and the uplink bandwidth field is set to any one of the other values (for example, any one of 0, 1, or 2, or any one of 0, 1, or 3) of the four values 0 to 3 are reserved combinations (not used).

Alternatively:

When the uplink PPDU total transmission bandwidth field is set to the sixth value, a bandwidth of an uplink EHT TB PPDU is 320 MHz-2, and the uplink bandwidth field needs to be set to two of four values 0 to 3, for example, 2 and 3. In this case, value combinations corresponding to that the uplink PPDU total transmission bandwidth field is set to the fifth value and the uplink bandwidth field is set to the other two values (for example, 0 or 1) of the four values 0 to 3 are reserved combinations (not used).

To facilitate implementation of a receiver, or provide more reserved combinations or unused values, another implementation is provided.

In Embodiment 4.1 or 4.2:

1. When the uplink bandwidth field needs to be set to 0, and the uplink PPDU total transmission bandwidth field is set to the first value, a bandwidth of an uplink EHT TB PPDU is 20 MHz. In this case, three value combinations corresponding to that the uplink bandwidth field that needs to be set to 0 and the uplink PPDU total transmission bandwidth field is set to the other three values (for example, the second value to the fourth value) are reserved combinations (not used).

2. When the uplink bandwidth field needs to be set to 1, and the uplink PPDU total transmission bandwidth field is set to the second value, a bandwidth of an uplink EHT TB PPDU is 40 MHz. In this case, three value combinations corresponding to that the uplink bandwidth field that needs to be set to 1 and the uplink PPDU total transmission bandwidth field is set to the other three values (for example, the first, third, and fourth values) are reserved combinations (not used).

In Embodiment 4.1:

3. When the uplink bandwidth field needs to be set to 2, and the uplink PPDU total transmission bandwidth field is set to the third value, a bandwidth of an uplink EHT TB PPDU is 80 MHz.

When the uplink bandwidth field needs to be set to 2, and the uplink PPDU total transmission bandwidth field is set to the fourth value, a bandwidth of an uplink EHT TB PPDU is 160 MHz.

When the uplink bandwidth field needs to be set to 2, and the uplink PPDU total transmission bandwidth field is set to the fifth value, a bandwidth of an uplink EHT TB PPDU is 320 MHz, or this value combination is a reserved combination (not used).

In this case, two value combinations corresponding to that the uplink bandwidth field that needs to be set to 2 and the uplink PPDU total transmission bandwidth field is set to the other two values (namely, the first value and the second value) are reserved combinations (not used).

4. When the uplink bandwidth field needs to be set to 3, and the uplink PPDU total transmission bandwidth field is set to the third value, a bandwidth of an uplink EHT TB PPDU is 80 MHz.

When the uplink bandwidth field needs to be set to 3, and the uplink PPDU total transmission bandwidth field is set to the fourth value, a bandwidth of an uplink EHT TB PPDU is 160 MHz.

When the uplink bandwidth field needs to be set to 3, and the uplink PPDU total transmission bandwidth field is set to the fifth value, a bandwidth of an uplink EHT TB PPDU is 320 MHz, or this value combination is reserved (not used).

In this case, two value combinations corresponding to that the uplink bandwidth field that needs to be set to 3 and the uplink PPDU total transmission bandwidth field is set to the other two values (namely, the first value and the second value) are reserved combinations (not used).

In Embodiment 4.2:

3. When the uplink bandwidth field needs to be set to 2, and the uplink PPDU total transmission bandwidth field is set to the third value, a bandwidth of an uplink EHT TB PPDU is 80 MHz.

When the uplink bandwidth field needs to be set to 2, and the uplink PPDU total transmission bandwidth field is set to the fourth value, a bandwidth of an uplink EHT TB PPDU is 160 MHz.

When the uplink bandwidth field needs to be set to 2, and the uplink PPDU total transmission bandwidth field is set to the fifth value, a bandwidth of an uplink EHT TB PPDU is 320 MHz-1, or this combination is reserved (not used).

When the uplink bandwidth field needs to be set to 2, and the uplink PPDU total transmission bandwidth field is set to the sixth value, a bandwidth of an uplink EHT TB PPDU is 320 MHz-2, or this combination is reserved (not used).

In this case, two combinations corresponding to that the uplink bandwidth field that needs to be set to 2 and the uplink PPDU total transmission bandwidth field is set to the other two values (namely, the first value and the second value) are reserved combinations (not used).

4. When the uplink bandwidth field needs to be set to 3, and the uplink PPDU total transmission bandwidth field is set to the third value, a bandwidth of an uplink EHT TB PPDU is 80 MHz.

When the uplink bandwidth field needs to be set to 3, and the uplink PPDU total transmission bandwidth field is set to the fourth value, a bandwidth of an uplink EHT TB PPDU is 160 MHz.

When the uplink bandwidth field needs to be set to 3, and the uplink PPDU total transmission bandwidth field is set to the fifth value, a bandwidth of an uplink EHT TB PPDU is 320 MHz-1, or this combination is reserved (not used).

When the uplink bandwidth field needs to be set to 3, and the uplink PPDU total transmission bandwidth field is set to the sixth value, a bandwidth of an uplink EHT TB PPDU is 320 MHz-2, or this combination is reserved (not used).

In this case, two combinations corresponding to that the uplink bandwidth field that needs to be set to 3 and the uplink PPDU total transmission bandwidth field is set to the other two values (namely, the first value and the second value) are reserved combinations (not used).

In various implementations of the foregoing method 3, if the station transmits an uplink HE TB PPDU, a bandwidth of the uplink HE TB PPDU is a value indicated by the uplink bandwidth field. If the station transmits an uplink EHT TB PPDU, a bandwidth of the uplink EHT TB PPDU is determined based on one or more of the uplink bandwidth field, the uplink PPDU total bandwidth field, and the EHT/HE indication field. For example, the following several cases are included: determining based on the uplink bandwidth field and the uplink PPDU total bandwidth field, or determining based on the uplink PPDU total bandwidth field, or determining based on the EHT/HE indication field, or determining based on the uplink bandwidth field, the uplink PPDU total bandwidth field, and the EHT/HE indication field. For example, when the implementation a-3 of the method a is used for the second indication information, the bandwidth of the uplink EHT TB PPDU may be determined based on only the EHT/HE indication field.

Optionally, for various implementations of the method 3, when the second indication information is implemented by using the method c, after receiving the trigger frame, the EHT station may set a bandwidth field in a universal signal field in a preamble of an uplink EHT TB PPDU to the uplink PPDU total transmission bandwidth indicated by the uplink PPDU total bandwidth field. This is because in the foregoing method c, the EHT/HE indication field is in the user information field in the trigger frame, and a specific bandwidth of the EHT TB PPDU cannot be determined based on the field. However, there is an RU allocation field in the user information field in the trigger frame. When sending an uplink EHT TB PPDU, the EHT station sends the uplink EHT TB PPDU on a corresponding resource based on an indication of the RU allocation field.

Method 4: The first indication information is directly used to indicate an EHT TB PPDU bandwidth. The first indication information is carried in an uplink EHT TB PPDU bandwidth field, and the field occupies 3 bits.

Implementation 4.1:

When a value of the uplink EHT TB PPDU bandwidth field is a first value, it indicates that an EHT TB PPDU bandwidth is 20 MHz.

When a value of the uplink EHT TB PPDU bandwidth field is a second value, it indicates that an EHT TB PPDU bandwidth is 40 MHz.

When a value of the uplink EHT TB PPDU bandwidth field is a third value, it indicates that an EHT TB PPDU bandwidth is 80 MHz.

When a value of the uplink EHT TB PPDU bandwidth field is a fourth value, it indicates that an EHT TB PPDU bandwidth is 160 MHz.

When a value of the uplink EHT TB PPDU bandwidth field is a fifth value, it indicates that an EHT TB PPDU bandwidth is 320 MHz. Another value is not used.

In the implementation 4.1, the uplink bandwidth extension field occupies 3 bits, and may represent eight values from 0 to 7. The first value to the fifth value each may be any one of $\{0, 1, 2, 3, 4, 5, 6, 7\}$, and the first value, the second value, the third value, the fourth value, and the fifth value are different from each other. For example, the first value is 0, the second value is 1, the third value is 2, the fourth value is 3, the fifth value is 4, and other values (namely, 5, 6, and 7) are reserved.

Implementation 4.2:

When a value of the uplink EHT TB PPDU bandwidth field is a first value, it indicates that an EHT TB PPDU bandwidth is 20 MHz.

When a value of the uplink EHT TB PPDU bandwidth field is a second value, it indicates that an EHT TB PPDU bandwidth is 40 MHz.

When a value of the uplink EHT TB PPDU bandwidth field is a third value, it indicates that an EHT TB PPDU bandwidth is 80 MHz.

When a value of the uplink EHT TB PPDU bandwidth field is a fourth value, it indicates that an EHT TB PPDU bandwidth is 160 MHz.

When a value of the uplink EHT TB PPDU bandwidth field is a fifth value, it indicates that an EHT TB PPDU bandwidth is 320 MHz-1.

When a value of the uplink EHT TB PPDU bandwidth field is a sixth value, it indicates that an EHT TB PPDU bandwidth is 320 MHz-2. Another value is not used.

In the implementation 4.2, the uplink bandwidth extension field occupies 3 bits, and may represent eight values from 0 to 7. The first value to the sixth value each may be any one of {0, 1, 2, 3, 4, 5, 6, 7}, and the first value, the second value, the third value, the fourth value, the fifth value, and the sixth value are different from each other. For example, the first value is 0, the second value is 1, the third value is 2, the fourth value is 3, the fifth value is 4, the sixth value is 5, and other values (namely, 6 and 7) are reserved.

It can be learned that values and meanings of the uplink EHT TB PPDU bandwidth field in the foregoing implementation 4.1 and the foregoing implementation 4.2 may be summarized as Table 10.

TABLE 10

| Uplink EHT TB PPDU bandwidth field 3 | EHT TB PPDU bandwidth |
|---|---|
| First value | 20 MHz (implementation 4.1 or 4.2) |
| Second value | 40 MHz (implementation 4.1 or 4.2) |
| Third value | 80 MHz (implementation 4.1 or 4.2) |
| Fourth value | 160 MHz (implementation 4.1 or 4.2) |
| Fifth value | 320 MHz (implementation 4.1), 320 MHz-1 (implementation 4.2) |
| Sixth value | Reserved (implementation 4.1), 320 MHz-2 (implementation 4.2) |
| Another value | Reserved (implementation 4.1 or 4.2) |

In various implementations of the foregoing method 4, if the station transmits an uplink HE TB PPDU, a bandwidth of the uplink HE TB PPDU is a value indicated by the uplink bandwidth field. If the station transmits an uplink EHT TB PPDU, a bandwidth of the uplink EHT TB PPDU is determined based on the uplink EHT TB PPDU bandwidth field.

The uplink EHT TB PPDU bandwidth field and the uplink bandwidth field are two independent fields. For example, when the uplink EHT TB PPDU bandwidth field is set to the first value (where a corresponding EHT TB PPDU bandwidth is 20 MHz), the uplink bandwidth field may be set to any value. To facilitate implementation of a receiver, or provide more reserved combinations (unused values), the following is provided in Embodiment 4.1 or 4.2:

1. When the uplink EHT TB PPDU bandwidth field is set to the first value, a bandwidth of an uplink EHT TB PPDU is 20 MHz, and the uplink bandwidth field needs to be set to one of four values 0 to 3, for example, 0. In this case, three value combinations corresponding to that the uplink EHT TB PPDU bandwidth field is set to the first value and the uplink bandwidth field is set to any one of the other three values (for example, 1, 2, or 3) of the four values 0 to 3 are reserved combinations (not used).

2. When the uplink EHT TB PPDU bandwidth field is set to the second value, a bandwidth of an uplink EHT TB PPDU is 40 MHz, and the uplink bandwidth field needs to be set to one of four values 0 to 3, for example, 1. In this case, three value combinations corresponding to that the uplink EHT TB PPDU bandwidth field is set to the second value and the uplink bandwidth field is set to any one of the other three values (for example, 0, 2, or 3) of the four values 0 to 3 are reserved combinations (not used).

3. When the uplink EHT TB PPDU bandwidth field is set to the third value, a bandwidth of an uplink EHT TB PPDU is 80 MHz, and the uplink bandwidth field needs to be set to one of four values 0 to 3, for example, 2 or 3. In this case, value combinations corresponding to that the uplink EHT TB PPDU bandwidth field is set to the third value and the uplink bandwidth field is set to any one of the other values (for example, any one of 0, 1, or 2, or any one of 0, 1, or 3) of the four values 0 to 3 are reserved combinations (not used).

Alternatively:

When the uplink EHT TB PPDU bandwidth field is set to the third value, a bandwidth of an uplink EHT TB PPDU is 80 MHz, and the uplink bandwidth field needs to be set to two of four values 0 to 3, for example, 2 and 3. In this case, value combinations corresponding to that the uplink EHT TB PPDU bandwidth field is set to the third value and the uplink bandwidth field is set to the other two values (for example, 0 or 1) of the four values 0 to 3 are reserved combinations (not used).

4. When the uplink EHT TB PPDU bandwidth field is set to the fourth value, a bandwidth of an uplink EHT TB PPDU is 160 MHz, and the uplink bandwidth field needs to be set to one of four values 0 to 3, for example, 2 or 3. In this case, value combinations corresponding to that the uplink EHT TB PPDU bandwidth field is set to the fourth value and the uplink bandwidth field is set to any one of the other three values (for example, any one of 0, 1, or 2, or any one of 0, 1, or 3) of the four values 0 to 3 are reserved combinations (not used).

Alternatively:

When the uplink EHT TB PPDU bandwidth field is set to the fourth value, a bandwidth of an uplink EHT TB PPDU is 160 MHz, and the uplink bandwidth field needs to be set to two of four values 0 to 3, for example, 2 and 3. In this case, combinations corresponding to that the uplink EHT TB PPDU bandwidth field is set to the fourth value and the uplink bandwidth field is set to the other two values (for example, 0 or 1) of the four values 0 to 3 are reserved combinations (not used).

In Embodiment 4.1:

5. When the uplink EHT TB PPDU bandwidth field is set to the fifth value, a bandwidth of an uplink EHT TB PPDU is 320 MHz, and the uplink bandwidth field needs to be set to one of four values 0 to 3, for example, 2 or 3. In this case, value combinations corresponding to that the uplink EHT TB PPDU bandwidth field is set to the fifth value and the uplink bandwidth field is set to any one of the other values (for example, any one of 0, 1, or 2, or any one of 0, 1, or 3) of the four values 0 to 3 are reserved combinations (not used).

Alternatively:

When the uplink EHT TB PPDU bandwidth field is set to the fifth value, a bandwidth of an uplink EHT TB PPDU is 320 MHz, and the uplink bandwidth field needs to be set to two of four values 0 to 3, for example, 2 and 3. In this case, value combinations corresponding to that the uplink EHT TB PPDU bandwidth field is set to the fifth value and the uplink bandwidth field is set to the other values (for example, 0 or 1) of the four values 0 to 3 are reserved combinations (not used).

In Embodiment 4.2:

5. When the uplink EHT TB PPDU bandwidth field is set to the fifth value, a bandwidth of an uplink EHT TB PPDU is 320 MHz-1, and the uplink bandwidth field needs to be set to one of four values 0 to 3, for example, 2 or 3. In this case, value combinations corresponding to that the uplink EHT TB PPDU bandwidth field is set to the fifth value and the uplink bandwidth field is set to any one of the other values of the four values 0 to 3 are reserved combinations (not used).

Alternatively:

When the uplink EHT TB PPDU bandwidth field is set to the fifth value, a bandwidth of an uplink EHT TB PPDU is 320 MHz-1, and the uplink bandwidth field needs to be set to two of four values 0 to 3, for example, 2 and 3. In this case, value combinations corresponding to that the uplink EHT TB PPDU bandwidth field is set to the fifth value and the uplink bandwidth field is set to the other values (for example, 0 or 1) of the four values 0 to 3 are reserved combinations (not used).

6. When the uplink EHT TB PPDU bandwidth field is set to the sixth value, a bandwidth of an uplink EHT TB PPDU is 320 MHz-2, and the uplink bandwidth field needs to be set to one of four values 0 to 3, for example, 2 or 3. In this case, three combinations corresponding to that the uplink EHT TB PPDU bandwidth field is set to the fifth value and the uplink bandwidth field is set to any one of the other values of the four values 0 to 3 are reserved combinations (not used).

Alternatively:

When the uplink EHT TB PPDU bandwidth field is set to the sixth value, a bandwidth of an uplink EHT TB PPDU is 320 MHz-2, and the uplink bandwidth field needs to be set to two of four values 0 to 3, for example, 2 and 3. In this case, value combinations corresponding to that the uplink EHT TB PPDU bandwidth field is set to the fifth value and the uplink bandwidth field is set to the other values (for example, 0 or 1) of the four values 0 to 3 are reserved combinations (not used).

To facilitate implementation of a receiver, or provide more reserved combinations or unused values, another implementation is provided.

In Embodiment 4.1 or 4.2:

1. When the uplink bandwidth field needs to be set to 0, and the uplink EHT TB PPDU bandwidth field is set to the first value, a bandwidth of an uplink EHT TB PPDU is 20 MHz. In this case, three combinations corresponding to that the uplink bandwidth field needs to be set to 0 and the uplink EHT TB PPDU bandwidth field is set to any one of the other three values (for example, one of the second to fourth values) are reserved combinations (not used).

2. When the uplink bandwidth field needs to be set to 1, and the uplink EHT TB PPDU bandwidth field is set to the second value, a bandwidth of an uplink EHT TB PPDU is 40 MHz. In this case, three combinations corresponding to that the uplink bandwidth field needs to be set to 1 and the uplink EHT TB PPDU bandwidth field is set to any one of the other three values (for example, one of the first, third, and fourth values) are reserved combinations (not used).

In Embodiment 4.1:

3. When the uplink bandwidth field needs to be set to 2, and the uplink EHT TB PPDU bandwidth field is set to the third value, a bandwidth of an uplink EHT TB PPDU is 80 MHz.

When the uplink bandwidth field needs to be set to 2, and the uplink EHT TB PPDU bandwidth field is set to the fourth value, a bandwidth of an uplink EHT TB PPDU is 160 MHz.

When the uplink bandwidth field needs to be set to 2, and the uplink EHT TB PPDU bandwidth field is set to the fifth value, a bandwidth of an uplink EHT TB PPDU is 320 MHz, or this combination is reserved (not used).

In this case, two combinations corresponding to that the uplink bandwidth field needs to be set to 2 and the uplink EHT TB PPDU bandwidth field is set to any one of the other two values (that is, one of the first value and the second value) are reserved combinations (not used).

4. When the uplink bandwidth field needs to be set to 3, and the uplink EHT TB PPDU bandwidth field is set to the third value, a bandwidth of an uplink EHT TB PPDU is 80 MHz.

When the uplink bandwidth field needs to be set to 3, and the uplink EHT TB PPDU bandwidth field is set to the fourth value, a bandwidth of an uplink EHT TB PPDU is 160 MHz.

When the uplink bandwidth field needs to be set to 3, and the uplink EHT TB PPDU bandwidth field is set to the fifth value, a bandwidth of an uplink EHT TB PPDU is 320 MHz, or this combination is reserved (not used).

In this case, two combinations corresponding to that the uplink bandwidth field needs to be set to 3 and the uplink EHT TB PPDU bandwidth field is set to any one of the other two values (that is, one of the first value and the second value) are reserved combinations (not used).

In Embodiment 4.2:

3. When the uplink bandwidth field needs to be set to 2, and the uplink EHT TB PPDU bandwidth field is set to the third value, a bandwidth of an uplink EHT TB PPDU is 80 MHz.

When the uplink bandwidth field needs to be set to 2, and the uplink EHT TB PPDU bandwidth field is set to the fourth value, a bandwidth of an uplink EHT TB PPDU is 160 MHz.

When the uplink bandwidth field needs to be set to 2, and the uplink EHT TB PPDU bandwidth field is set to the fifth value, a bandwidth of an uplink EHT TB PPDU is 320 MHz-1, or this combination is reserved (not used).

When the uplink bandwidth field needs to be set to 2, and the uplink EHT TB PPDU bandwidth field is set to the sixth value, a bandwidth of an uplink EHT TB PPDU is 320 MHz-2, or this combination is reserved (not used).

In this case, two combinations corresponding to that the uplink bandwidth field needs to be set to 2 and the uplink EHT TB PPDU bandwidth field is set to one of the other two values (that is, one of the first value and the second value) are reserved combinations (not used).

4. When the uplink bandwidth field needs to be set to 3, and the uplink EHT TB PPDU bandwidth field is set to the third value, a bandwidth of an uplink EHT TB PPDU is 80 MHz.

When the uplink bandwidth field needs to be set to 3, and the uplink EHT TB PPDU bandwidth field is set to the fourth value, a bandwidth of an uplink EHT TB PPDU is 160 MHz.

When the uplink bandwidth field needs to be set to 3, and the uplink EHT TB PPDU bandwidth field is set to the fifth value, a bandwidth of an uplink EHT TB PPDU is 320 MHz-1, or this combination is reserved (not used).

When the uplink bandwidth field needs to be set to 3, and the uplink EHT TB PPDU bandwidth field is set to the sixth value, a bandwidth of an uplink EHT TB PPDU is 320 MHz-2, or this combination is reserved (not used).

In this case, two combinations corresponding to that the uplink bandwidth field needs to be set to 3 and the uplink EHT TB PPDU bandwidth field is set to one of the other two values (that is, one of the first value and the second value) are reserved combinations (not used).

The foregoing content describes in detail the methods provided in this application. To better implement the foregoing solutions in the embodiments of this application, embodiments of this application further provide corresponding apparatuses or devices.

In this embodiment of this application, the AP and the STA may be divided into function modules based on the foregoing method examples. For example, function modules may be obtained through division based on corresponding functions, or two or more functions may be integrated into one processing module. The integrated module may be implemented in a form of hardware, or may be implemented in a form of a software function module. It should be noted that, in embodiments of this application, module division is an example, and is merely a logical function division. In actual implementation, another division manner may be used. The following describes in detail a communication apparatus in embodiments of this application with reference to FIG. 12 and FIG. 13. The communication apparatus is an access point or a station. Further, the communication apparatus may be an apparatus in an AP, or the communication apparatus may be an apparatus in a STA.

Figure 12:
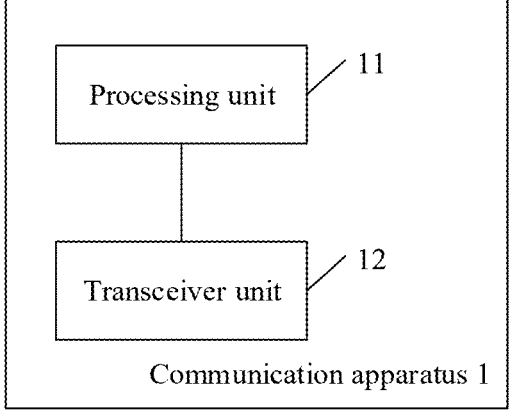
FIG. 12 is a schematic diagram of a structure of a communication apparatus 1 according to an embodiment of this application.

When an integrated unit is used, FIG. 12 is a schematic diagram of a structure of a communication apparatus 1 according to an embodiment of this application. The communication apparatus 1 may be an AP or a chip in the AP, for example, a Wi-Fi chip. As shown in FIG. 12, the communication apparatus 1 includes a processing unit 11 and a transceiver unit 12.

In the first design, the processing unit 11 is configured to generate a trigger frame. The trigger frame includes first indication information, and an uplink bandwidth field in a common information field in the trigger frame and the first indication information jointly indicate an uplink physical layer protocol data unit PPDU total transmission bandwidth. The trigger frame further includes second indication information. The second indication information is used to indicate distribution of a trigger based high efficiency physical layer protocol data unit HE TB PPDU and/or an extremely high throughput physical layer protocol data unit EHT TB PPDU in the uplink PPDU total transmission bandwidth. The transceiver unit 12 is configured to send the trigger frame.

In the second design, the processing unit 11 is configured to generate a trigger frame. The trigger frame includes first indication information. The first indication information and an uplink bandwidth field in a common information field in the trigger frame jointly indicate an uplink physical layer protocol data unit PPDU total transmission bandwidth. The trigger frame further includes second indication information. The second indication information is used to indicate whether a station transmits an HE TB PPDU or an EHT TB PPDU. The transceiver unit 12 is configured to send the trigger frame.

Optionally, in the foregoing first and second designs, the transceiver unit 12 is further configured to receive an HE TB PPDU or an EHT TB PPDU.

A bandwidth field in a universal signal field in a preamble of the EHT TB PPDU is determined based on one or more of the first indication information, the uplink bandwidth field, and the second indication information.

In third possible design, the processing unit 11 is configured to generate a trigger frame. The trigger frame includes first indication information. The first indication information and an uplink bandwidth field in a common information field in the trigger frame jointly indicate an extremely high throughput physical layer protocol data unit EHT TB PPDU bandwidth. The uplink bandwidth field indicates an HE TB PPDU bandwidth. The trigger frame further includes second indication information. The second indication information is used to indicate a frequency segment for an EHT TB PPDU and/or a frequency segment for an HE TB PPDU. A bandwidth of the EHT TB PPDU is a bandwidth jointly indicated by the first indication information and the uplink bandwidth field, and a bandwidth of the HE TB PPDU is a bandwidth of the uplink bandwidth field. The transceiver unit 12 is configured to send the trigger frame.

In the fourth design, the processing unit 11 is configured to generate a trigger frame. The trigger frame includes first indication information. The first indication information and an uplink bandwidth field in a common information field in the trigger frame jointly indicate an EHT TB PPDU bandwidth. The uplink bandwidth field indicates an HE TB PPDU bandwidth. The trigger frame further includes second indication information. The second indication information is used to indicate whether a station transmits an HE TB PPDU or an EHT TB PPDU. The transceiver unit 12 is configured to send the trigger frame.

Optionally, in the third and fourth designs, the transceiver unit 12 is further configured to receive an HE TB PPDU or an EHT TB PPDU. A bandwidth field in a universal signal field in a preamble of the EHT TB PPDU is set to a value jointly indicated by the first indication information and the uplink bandwidth field.

It should be understood that the communication apparatus 1 may correspondingly perform the foregoing method embodiments, and the foregoing operations or functions of the units in the communication apparatus 1 are separately used to implement corresponding operations of the AP in the foregoing method embodiments. For brevity, details are not described herein again.

Figure 13:
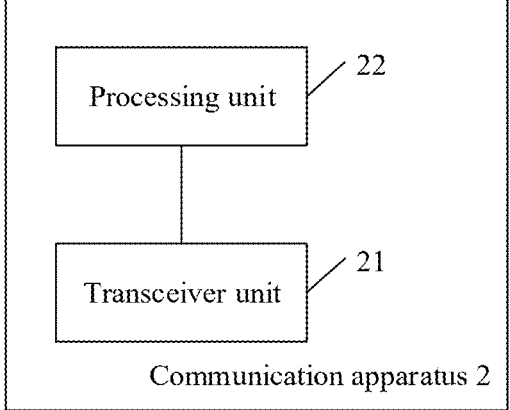
FIG. 13 is a schematic diagram of a structure of a communication apparatus 2 according to an embodiment of this application.

FIG. 13 is a schematic diagram 2 of a structure of a communication apparatus according to an embodiment of this application. The communication apparatus 2 may be a STA or a chip in the STA, for example, a Wi-Fi chip. As shown in the FIG. 13, the communication apparatus 2 includes a transceiver unit 21 and a processing unit 22.

In the first possible design, the transceiver unit 21 is configured to receive a trigger frame. The trigger frame includes first indication information. An uplink bandwidth field in a common information field in the trigger frame and the first indication information jointly indicate an uplink PPDU total transmission bandwidth. The trigger frame further includes second indication information. The second indication information is used to indicate distribution of a trigger based high efficiency physical layer protocol data unit HE TB PPDU and/or an extremely high throughput physical layer protocol data unit EHT TB PPDU in the uplink PPDU total transmission bandwidth. The processing unit 22 is configured to parse the trigger frame.

In the second design, the transceiver unit 21 is configured to receive a trigger frame. The trigger frame includes first indication information. The first indication information and an uplink bandwidth field in a common information field in the trigger frame jointly indicate an uplink PPDU total transmission bandwidth. The trigger frame further includes second indication information. The second indication information is used to indicate whether a station transmits an HE TB PPDU or an EHT TB PPDU. The processing unit 22 is configured to parse the trigger frame.

In the foregoing first and second designs, the processing unit 22 is further configured to generate an HE TB PPDU or an EHT TB PPDU. A bandwidth field in a universal signal field in a preamble of the EHT TB PPDU is determined based on one or more of the first indication information, the uplink bandwidth field, and the second indication information. The transceiver unit 21 is further configured to send the generated HE TB PPDU or the generated EHT TB PPDU based on an indication of the second indication information.

In the third design, the transceiver unit 21 is configured to receive a trigger frame. The trigger frame includes first indication information. An uplink bandwidth field in a common information field in the trigger frame and the first indication information jointly indicate an EHT TB PPDU bandwidth. The uplink bandwidth field indicates an HE TB PPDU bandwidth. The trigger frame further includes second indication information. The second indication information is used to indicate a frequency segment for an EHT TB PPDU and/or a frequency segment for an HE TB PPDU. A bandwidth of the EHT TB PPDU is a bandwidth jointly indicated by the first indication information and the uplink bandwidth field. A bandwidth of the HE TB PPDU is a bandwidth of the uplink bandwidth field. The processing unit 22 is configured to parse the trigger frame.

In the fourth design, the transceiver unit 21 is configured to receive a trigger frame. The trigger frame includes first indication information. The first indication information and an uplink bandwidth field in a common information field in the trigger frame jointly indicate an EHT TB PPDU bandwidth. The uplink bandwidth field indicates an HE TB PPDU bandwidth. The trigger frame further includes second indication information. The second indication information is used to indicate whether a station transmits an HE TB PPDU or an EHT TB PPDU. The processing unit 22 is configured to parse the trigger frame.

In the third and fourth designs, the processing unit 22 is further configured to generate an HE TB PPDU or an EHT TB PPDU. A bandwidth field in a universal signal field in a preamble of the EHT TB PPDU is set to a value jointly indicated by the first indication information and the uplink bandwidth field. The transceiver unit 21 is further configured to send the generated HE TB PPDU or the generated EHT TB PPDU based on an indication of the second indication information.

It should be understood that the communication apparatus 2 may correspondingly perform the foregoing method embodiments, and the foregoing operations or functions of the units in the communication apparatus 2 are separately used to implement corresponding operations of the STA in the foregoing method embodiments. For brevity, details are not described herein again.

The foregoing describes the AP and the STA in embodiments of this application. The following describes possible product forms of the AP and the STA. It should be understood that any product in any form that has a function of the AP in FIG. 12 and any product in any form that has a function of the STA in FIG. 13 fall within the protection scope of embodiments of this application. It should be further understood that the following description is merely an example, and product forms of the AP and the STA in embodiments of this application are not limited thereto.

In a possible product form, the AP and the STA in embodiments of this application may be implemented by using general bus architectures.

The AP includes a processor and a transceiver that is internally connected to and communicates with the processor.

In a design, the processor is configured to generate a trigger frame. The trigger frame includes first indication information, and an uplink bandwidth field in a common information field in the trigger frame and the first indication information jointly indicate an uplink physical layer protocol data unit PPDU total transmission bandwidth. The trigger frame further includes second indication information, where the second indication information is used to indicate distribution of a trigger based high efficiency physical layer protocol data unit HE TB PPDU and/or an extremely high throughput physical layer protocol data unit EHT TB PPDU in the uplink PPDU total transmission bandwidth. The transceiver is configured to send the trigger frame.

In a design, the processor is configured to generate a trigger frame. The trigger frame includes first indication information, and the first indication information and an uplink bandwidth field in a common information field in the trigger frame jointly indicate an uplink physical layer protocol data unit PPDU total transmission bandwidth. The trigger frame further includes second indication information, and the second indication information is used to indicate whether a station transmits an HE TB PPDU or an EHT TB PPDU. The transceiver is configured to send the trigger frame.

In a design, the processor is configured to generate a trigger frame. The trigger frame includes first indication information. The first indication information and an uplink bandwidth field in a common information field in the trigger frame jointly indicate an extremely high throughput physical layer protocol data unit EHT TB PPDU bandwidth. The uplink bandwidth field indicates an HE TB PPDU bandwidth. The trigger frame further includes second indication information. The second indication information is used to indicate a frequency segment for an EHT TB PPDU and/or a frequency segment for an HE TB PPDU. A bandwidth of the EHT TB PPDU is a bandwidth jointly indicated by the first indication information and the uplink bandwidth field, and a bandwidth of the HE TB PPDU is a bandwidth of the uplink bandwidth field. The transceiver is configured to send the trigger frame.

In a design, the processor is configured to generate a trigger frame. The trigger frame includes first indication information. The first indication information and an uplink bandwidth field in a common information field in the trigger frame jointly indicate an EHT TB PPDU bandwidth. The uplink bandwidth field indicates an HE TB PPDU bandwidth. The trigger frame further includes second indication information. The second indication information is used to indicate whether a station transmits an HE TB PPDU or an EHT TB PPDU. The transceiver is configured to send the trigger frame.

The STA includes a processor and a transceiver that is internally connected to and communicates with the processor.

In a design, the transceiver is configured to receive a trigger frame. The trigger frame includes first indication information, and an uplink bandwidth field in a common information field in the trigger frame and the first indication information jointly indicate an uplink PPDU total transmission bandwidth. The trigger frame further includes second indication information, where the second indication information is used to indicate distribution of a trigger based high efficiency physical layer protocol data unit HE TB PPDU and/or an extremely high throughput physical layer protocol data unit EHT TB PPDU in the uplink PPDU total transmission bandwidth. The processor is configured to parse the trigger frame.

In a design, the transceiver is configured to receive a trigger frame. The trigger frame includes first indication information, and the first indication information and an uplink bandwidth field in a common information field in the trigger frame jointly indicate an uplink PPDU total transmission bandwidth. The trigger frame further includes second indication information, where the second indication information is used to indicate whether a station transmits an HE TB PPDU or an EHT TB PPDU. The processor is configured to parse the trigger frame.

In a design, the transceiver is configured to receive a trigger frame. The trigger frame includes first indication information. An uplink bandwidth field in a common information field in the trigger frame and the first indication information jointly indicate an EHT TB PPDU bandwidth. The uplink bandwidth field indicates an HE TB PPDU bandwidth. The trigger frame further includes second indication information. The second indication information is used to indicate a frequency segment for an EHT TB PPDU and/or a frequency segment for an HE TB PPDU. A bandwidth of the EHT TB PPDU is a bandwidth jointly indicated by the first indication information and the uplink bandwidth field. A bandwidth of the HE TB PPDU is a bandwidth of the uplink bandwidth field. The processor is configured to parse the trigger frame.

In a design, the processor is configured to receive a trigger frame. The trigger frame includes first indication information. The first indication information and an uplink bandwidth field in a common information field in the trigger frame jointly indicate an EHT TB PPDU bandwidth. The uplink bandwidth field indicates an HE TB PPDU bandwidth. The trigger frame further includes second indication information. The second indication information is used to indicate whether a station transmits an HE TB PPDU or an EHT TB PPDU. The transceiver is configured to parse the trigger frame.

In a possible product form, the AP and STA described in embodiments of this application may be implemented by general-purpose processors.

A general-purpose processor for implementing the AP includes a processing circuit and an input/output interface that is internally connected to and communicates with the processing circuit.

In a design, the processing circuit is configured to generate a trigger frame. The trigger frame includes first indication information, and an uplink bandwidth field in a common information field in the trigger frame and the first indication information jointly indicate an uplink physical layer protocol data unit PPDU total transmission bandwidth. The trigger frame further includes second indication information, where the second indication information is used to indicate distribution of a trigger based high efficiency physical layer protocol data unit HE TB PPDU and/or an extremely high throughput physical layer protocol data unit EHT TB PPDU in the uplink PPDU total transmission bandwidth. The input/output interface is configured to send the trigger frame.

In a design, the processing circuit is configured to generate a trigger frame. The trigger frame includes first indication information, the first indication information and an uplink bandwidth field in a common information field in the trigger frame jointly indicate an uplink physical layer protocol data unit PPDU total transmission bandwidth. The trigger frame further includes second indication information, where the second indication information is used to indicate whether a station transmits an HE TB PPDU or an EHT TB PPDU. The input/output interface is configured to send the trigger frame.

In a design, the processing circuit is configured to generate a trigger frame. The trigger frame includes first indication information. The first indication information and an uplink bandwidth field in a common information field in the trigger frame jointly indicate an extremely high throughput physical layer protocol data unit EHT TB PPDU bandwidth. The uplink bandwidth field indicates an HE TB PPDU bandwidth. The trigger frame further includes second indication information. The second indication information is used to indicate a frequency segment for an EHT TB PPDU and/or a frequency segment for an HE TB PPDU. A bandwidth of the EHT TB PPDU is a bandwidth jointly indicated by the first indication information and the uplink bandwidth field, and a bandwidth of the HE TB PPDU is a bandwidth of the uplink bandwidth field. The input/output interface is configured to send the trigger frame.

In a design, the processing circuit is configured to generate a trigger frame. The trigger frame includes first indication information. The first indication information and an uplink bandwidth field in a common information field in the trigger frame jointly indicate an EHT TB PPDU bandwidth. The uplink bandwidth field indicates an HE TB PPDU bandwidth. The trigger frame further includes second indication information. The second indication information is used to indicate whether a station transmits an HE TB PPDU or an EHT TB PPDU. The input/output interface is configured to send the trigger frame.

A general-purpose processing circuit for implementing the STA includes a processing circuit and an input/output interface that is internally connected to and communicates with the processing circuit.

In a design, the input/output interface is configured to receive a trigger frame. The trigger frame includes first indication information, and an uplink bandwidth field in a common information field in the trigger frame and the first indication information jointly indicate an uplink PPDU total transmission bandwidth. The trigger frame further includes second indication information, where the second indication information is used to indicate distribution of a trigger based high efficiency physical layer protocol data unit HE TB PPDU and/or an extremely high throughput physical layer protocol data unit EHT TB PPDU in the uplink PPDU total transmission bandwidth. The processing circuit is configured to parse the trigger frame.

In a design, the input/output interface is configured to receive a trigger frame. The trigger frame includes first indication information, and the first indication information and an uplink bandwidth field in a common information field in the trigger frame jointly indicate an uplink PPDU total transmission bandwidth. The trigger frame further includes second indication information, where the second indication information is used to indicate whether a station transmits an HE TB PPDU or an EHT TB PPDU. The processing circuit is configured to parse the trigger frame.

In a design, the input/output interface is configured to receive a trigger frame. The trigger frame includes first indication information. An uplink bandwidth field in a common information field in the trigger frame and the first indication information jointly indicate an EHT TB PPDU bandwidth. The uplink bandwidth field indicates an HE TB PPDU bandwidth. The trigger frame further includes second indication information. The second indication information is used to indicate a frequency segment for an EHT TB PPDU and/or a frequency segment for an HE TB PPDU. A bandwidth of the EHT TB PPDU is a bandwidth jointly indicated by the first indication information and the uplink bandwidth field. A bandwidth of the HE TB PPDU is a bandwidth of the uplink bandwidth field. The processing circuit is configured to parse the trigger frame.

In a design, the input/output interface is configured to receive a trigger frame. The trigger frame includes first indication information. The first indication information and an uplink bandwidth field in a common information field in the trigger frame jointly indicate an EHT TB PPDU bandwidth. The uplink bandwidth field indicates an HE TB PPDU bandwidth. The trigger frame further includes second indication information. The second indication information is used to indicate whether a station transmits an HE TB PPDU or an EHT TB PPDU. The processing circuit is configured to parse the trigger frame.

It should be understood that the communication apparatuses in the foregoing various product forms have any function of the AP or STA in the method embodiments. Details are not described herein again.

An embodiment of this application further provides a computer-readable storage medium. The computer-readable storage medium stores computer program code. When the processor executes the computer program code, the electronic device performs the method in any one of the foregoing embodiments.

An embodiment of this application further provides a computer program product. When the computer program product runs on a computer, the computer is enabled to perform the method in any one of the foregoing embodiments.

An embodiment of this application further provides a communication apparatus. The apparatus may exist in a product form of a chip. A structure of the apparatus includes a processor and an interface circuit. The processor is configured to communicate with another apparatus by using a receiver circuit, so that the apparatus performs the method in any one of the foregoing embodiments.

An embodiment of this application further provides a wireless communication system including an AP and a STA. The AP and the STA may perform the method in any one of the foregoing embodiments.

Method or algorithm steps described in combination with the content disclosed in this application may be implemented by hardware, or may be implemented by a processor by executing software instructions. The software instructions may include a corresponding software module. The software module may be stored in a random access memory (RAM), a flash memory, an erasable programmable read-only memory (Erasable Programmable ROM, EPROM), an electrically erasable programmable read-only memory (Electrically EPROM, EEPROM), a register, a hard disk, a removable hard disk, a compact disc read-only memory (CD-ROM), or any other form of storage medium well-known in the art. For example, a storage medium is coupled to a processor, so that the processor can read information from the storage medium or write information into the storage medium. Certainly, the storage medium may be a component of the processor. The processor and the storage medium may be disposed in an ASIC. In addition, the ASIC may be located in a core network interface device. Certainly, the processor and the storage medium may exist in the core network interface device as discrete components.

A person skilled in the art should be aware that in the foregoing one or more examples, functions described in this application may be implemented by hardware, software, firmware, or any combination thereof. When the embodiments of this application is implemented by software, the foregoing functions may be stored in a computer-readable medium or transmitted as one or more instructions or code in the computer-readable medium. The computer-readable medium includes a computer-readable storage medium and a communication medium. The communication medium includes any medium that facilitates transmission of a computer program from one place to another. The storage medium may be any available medium accessible to a general-purpose or special-purpose computer. In the foregoing specific implementations, the objectives, technical solutions, and beneficial effects of this application are further described in detail. It should be understood that the foregoing descriptions are merely specific implementations of this application, but are not intended to limit the protection scope of this application. Any modification, equivalent replacement, improvement, or the like made based on the technical solutions of this application shall fall within the protection scope of this application.

What is claimed is:

1. A physical layer protocol data unit (PPDU) uplink bandwidth indication method, comprising:
generating, by an access point (AP), a trigger frame, wherein the trigger frame comprises an EHT/HE (extremely high throughput/high efficient) indication field, and the EHT/HE indication field is used to indicate a station (STA) to transmit an HE Trigger Based PPDU (HE TB PPDU) or an EHT TB PPDU: wherein the STA to transmit an HE TB PPDU or an EHT TB PPDU on a corresponding resource block is indicated based on the EHT/HE indication field and a resource allocation field in a user information field in the trigger frame; and
sending, by the AP, the trigger frame.

2. The method according to claim 1, wherein the STA is a STA allocated to frequency domain in which primary 160 MHz is located.

3. The method according to claim 1, wherein the EHT/HE indication field is 1 bit.

4. The method according to claim 1, wherein a STA allocated to frequency domain in which secondary 160 MHz is located transmits an EHT TB PPDU.

5. The method according to claim 1, wherein the user information field is an HE user information field, or an EHT user information field is indicated based on the EHT/HE indication field and the resource allocation field, and the resource allocation field comprises the $40^{th}$ bit of the user information field.

6. The method according to claim 1, wherein the EHT/HE indication field is located in a reserved bit in a common information field in the trigger frame.

7. The method according to claim 1, wherein the trigger frame further comprises one or more of an HE user information field and an EHT user information field, and the HE user information field and the EHT user information field have a same length.

8. A physical layer protocol data unit (PPDU) uplink bandwidth indication method, comprising:
receiving, by a station (STA), a trigger frame, wherein the trigger frame comprises an EHT/HE (extremely high throughput/high efficient) indication field, and the EHT/HE indication field is used to indicate the STA to transmit an HE Trigger Based PPDU (HE TB PPDU) or an EHT TB PPDU: wherein the STA to transmit an HE TB PPDU or an EHT TB PPDU on a corresponding resource block is indicated based on the EHT/HE indication field and a resource allocation field in a user information field in the trigger frame; and
determining, by the STA based on the EHT/HE indication field, to transmit an HE TB PPDU or an EHT TB PPDU.

9. The method according to claim 8, wherein the STA is a STA allocated to frequency domain in which primary 160 MHz is located.

10. The method according to claim 8, wherein the EHT/HE indication field is 1 bit.

11. The method according to claim 8, wherein a STA allocated to frequency domain in which secondary 160 MHz is located transmits an EHT TB PPDU.

12. The method according to claim 8, wherein the user information field is an HE user information field, or an EHT user information field is indicated based on the EHT/HE indication field and the resource allocation field, and the resource allocation field comprises the $40^{th}$ bit of the user information field.

13. The method according to claim 8, wherein the EHT/HE indication field is located in a reserved bit in a common information field in the trigger frame.

14. The method according to claim 8, wherein the trigger frame further comprises one or more of an HE user information field and an EHT user information field, and the HE user information field and the EHT user information field have a same length.

15. A communication apparatus, comprising a processor and a memory, the memory is configured to store a computer program, and the processor is configured to execute the computer program stored in the memory, to enable the communication apparatus to perform:

generating a trigger frame, wherein the trigger frame comprises an EHT/HE indication field, and the EHT/HE (extremely high throughput/high efficient) indication field is used to indicate a station (STA) to transmit an HE Trigger Based PPDU (HE TB PPDU) or an EHT TB PPDU: wherein the STA to transmit an HE TB PPDU or an EHT TB PPDU on a corresponding resource block is indicated based on the EHT/HE indication field and a resource allocation field in a user information field in the trigger frame; and sending the trigger frame.

16. The communication apparatus according to claim 15, wherein the STA is a STA allocated to frequency domain in which primary 160 MHz is located.

17. The communication apparatus according to claim 15, wherein the EHT/HE indication field is 1 bit.

18. The communication apparatus according to claim 15, wherein a STA allocated to frequency domain in which secondary 160 MHz is located transmits an EHT TB PPDU.

19. The communication apparatus according to claim 15, wherein the user information field is an HE user information field, or an EHT user information field is indicated based on the EHT/HE indication field and the resource allocation field, and the resource allocation field comprises the $40^{th}$ bit of the user information field.

20. The communication apparatus according to claim 15, wherein the EHT/HE indication field is located in a reserved bit in a common information field in the trigger frame.

* * * * *